United States Patent
You et al.

(10) Patent No.: US 12,452,812 B2
(45) Date of Patent: Oct. 21, 2025

(54) COMMUNICATION METHOD AND DEVICE OF IAB NODE HAVING PLURALITY OF TIMINGS SET THEREIN

(71) Applicant: LG ELECTRONICS INC., Seoul (KR)

(72) Inventors: Hyangsun You, Seoul (KR); Hyunsoo Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 358 days.

(21) Appl. No.: 17/797,087

(22) PCT Filed: Feb. 15, 2021

(86) PCT No.: PCT/KR2021/001876
§ 371 (c)(1),
(2) Date: Aug. 2, 2022

(87) PCT Pub. No.: WO2021/162504
PCT Pub. Date: Aug. 19, 2021

(65) Prior Publication Data
US 2023/0064157 A1    Mar. 2, 2023

(30) Foreign Application Priority Data
Feb. 11, 2020 (KR) .................. 10-2020-0016069

(51) Int. Cl.
H04J 3/06 (2006.01)
H04W 56/00 (2009.01)
H04W 88/08 (2009.01)

(52) U.S. Cl.
CPC ....... *H04W 56/003* (2013.01); *H04W 56/001* (2013.01); *H04W 88/08* (2013.01)

(58) Field of Classification Search
CPC . H04W 56/003; H04W 56/001; H04W 88/08; H04W 56/0045; H04W 72/0446;
(Continued)

(56) References Cited

U.S. PATENT DOCUMENTS 7,570,962 B2 * 8/2009 Chou .................. G01S 5/02216
370/328
8,537,724 B2 * 9/2013 Love .................. H04B 7/15528
370/293
(Continued)

FOREIGN PATENT DOCUMENTS

CN      110121191      8/2019

OTHER PUBLICATIONS

Huawei, HiSilicon "DL transmission timing alignment for IAB," 3GPP TSG RAN WG1, Meeting #97, R1-1906002, 6 pages, May 2019.
(Continued)

*Primary Examiner* — Stephen M D'Agosta
(74) *Attorney, Agent, or Firm* — BRYAN CAVE LEIGHTON PAISNER LLP

(57) ABSTRACT

Proposed is a signal transmission method performed in a wireless communication system by an integrated access and backhaul (IAB) node, the method being characterized by comprising: receiving first information about a first timing and second information about a second timing; and transmitting a first signal and a second signal to a parent node of the IAB node, wherein the first signal is transmitted on a first resource, and the second signal is transmitted on a second resource. The first resource is a time resource to which the first timing is applied, and the second resource is a time resource to which the second timing is applied.

4 Claims, 43 Drawing Sheets

Timing alignment case 1

(58) Field of Classification Search
CPC ......... H04W 84/047; H04W 56/0055; H04W 72/27; H04W 56/0015; H04W 56/0005; H04W 72/23; H04B 7/15528

See application file for complete search history.

(56) References Cited

U.S. PATENT DOCUMENTS

| | | | | |
|---|---|---|---|---|
| 8,614,975 | B2* | 12/2013 | Palanki | H04W 56/0015 370/328 |
| 8,774,230 | B2* | 7/2014 | Gheorghiu | H04W 56/0015 370/503 |
| 8,867,983 | B2* | 10/2014 | Zhu | H04B 7/155 455/13.1 |
| 9,084,246 | B2* | 7/2015 | Lee | H04B 7/155 |
| 9,136,997 | B2* | 9/2015 | Gaal | H04L 5/0048 |
| 10,772,134 | B2* | 9/2020 | Kim | H04W 74/0833 |
| 10,849,085 | B2* | 11/2020 | Abedini | H04W 56/002 |
| 11,012,964 | B2* | 5/2021 | Korhonen | H04W 56/0045 |
| 11,310,726 | B2* | 4/2022 | Ratnam | H04W 56/0045 |
| 11,399,410 | B2* | 7/2022 | Islam | H04W 72/535 |
| 11,902,926 | B2* | 2/2024 | Miao | H04W 56/0045 |
| 12,004,098 | B2* | 6/2024 | Liu | H04W 72/23 |
| 12,177,805 | B2* | 12/2024 | Korhonen | H04W 56/0015 |
| 2008/0285473 | A1* | 11/2008 | Chen | H04B 7/2656 370/252 |
| 2009/0075588 | A1* | 3/2009 | Zhu | H04B 7/155 455/18 |
| 2009/0228318 | A1* | 9/2009 | Ara | G06Q 10/06398 705/7.42 |
| 2010/0238845 | A1* | 9/2010 | Love | H04W 72/1263 370/280 |
| 2011/0249619 | A1* | 10/2011 | Yu | H04B 7/0621 370/328 |
| 2013/0107793 | A1* | 5/2013 | Gan | H04W 56/001 370/315 |
| 2017/0064731 | A1* | 3/2017 | Wang | H04W 72/54 |
| 2017/0126441 | A1* | 5/2017 | Earnshaw | H04L 27/26025 |
| 2019/0110266 | A1 | 4/2019 | Abedini et al. | |
| 2019/0349036 | A1* | 11/2019 | Wang | H04B 7/15528 |
| 2019/0349871 | A1* | 11/2019 | Ghosh | H04B 7/155 |
| 2019/0394738 | A1* | 12/2019 | Abedini | H04W 56/0015 |
| 2020/0015316 | A1 | 1/2020 | Islam et al. | |
| 2020/0053679 | A1* | 2/2020 | Bendlin | H04W 74/0833 |
| 2020/0059879 | A1* | 2/2020 | Nam | H04L 27/2666 |
| 2020/0107383 | A1* | 4/2020 | Novlan | H04W 76/15 |
| 2020/0145952 | A1* | 5/2020 | Keskitalo | H04W 56/007 |
| 2021/0243683 | A1* | 8/2021 | Harada | H04B 7/0626 |
| 2021/0251011 | A1* | 8/2021 | You | H04W 74/0833 |
| 2021/0258244 | A1* | 8/2021 | Xu | H04L 45/28 |
| 2021/0258847 | A1* | 8/2021 | Wu | H04W 24/02 |
| 2021/0315040 | A1* | 10/2021 | Wu | H04W 76/19 |
| 2021/0321297 | A1* | 10/2021 | Harada | H04W 28/0942 |
| 2021/0321350 | A1* | 10/2021 | Islam | H04W 56/001 |
| 2021/0345262 | A1* | 11/2021 | Harada | H04W 56/001 |
| 2021/0345279 | A1* | 11/2021 | Ying | H04B 7/15528 |
| 2021/0352700 | A1* | 11/2021 | Lohr | H04W 72/21 |
| 2021/0377885 | A1* | 12/2021 | Dortschy | H04W 56/0045 |
| 2021/0377936 | A1* | 12/2021 | Yuan | H04W 72/27 |
| 2021/0385776 | A1* | 12/2021 | Dahlman | H04W 56/0025 |
| 2021/0400526 | A1* | 12/2021 | Wu | H04W 40/22 |
| 2021/0400661 | A1* | 12/2021 | Harada | H04W 72/23 |
| 2022/0078789 | A1* | 3/2022 | Harada | H04W 72/0446 |
| 2022/0086881 | A1* | 3/2022 | Liu | H04L 5/0094 |
| 2022/0086884 | A1* | 3/2022 | Ronkainen | H04W 72/20 |
| 2022/0116104 | A1* | 4/2022 | Liu | H04L 5/0082 |
| 2022/0116170 | A1* | 4/2022 | Zhu | H04L 5/0051 |
| 2023/0064157 | A1* | 3/2023 | You | H04W 56/001 |
| 2023/0126621 | A1* | 4/2023 | You | H04W 72/044 |
| 2023/0247574 | A1* | 8/2023 | Ghanbarinejad | H04W 56/001 370/503 |
| 2023/0262627 | A1* | 8/2023 | Abedini | H04W 72/0446 370/329 |
| 2023/0276389 | A1* | 8/2023 | Ko | H04W 72/04 370/350 |
| 2023/0309032 | A1* | 9/2023 | Ghanbarinejad | H04W 56/0045 |
| 2024/0064671 | A1* | 2/2024 | Huang | H04W 72/0446 |

OTHER PUBLICATIONS

AT&T "TP for 38.874 on PHY Enhancements for NR IAB," 3GPP TSG RAN WG1, Meeting #95, R1-1814190, 21 pages, Nov. 2018.

Qualcomm Incorporated "Upper layer parameters to support IAB physical layer operation," 3GPP TSG-RAN WG2 Meeting #108, R2-1916504, Nov. 2019.

NTT Docomo, Inc., "Discussion on enhancements to support NR backhaul links", 3GPP TSG RAN WG1 Meeting #95, R1-1813316, Spokane, USA, Nov. 12-16, 2018.

"Physical layer design for NR IAB", Huawei, HiSilicon, 3GPP TSG RAN WG1 Meeting #95, Spokane, USA, Nov. 12-16, 2018, R1-1812198.

"Resource allocation/coordination between Parent BH and Child links", Nokia, Nokia Shanghai Bell, 3GPP TSG RAN WG1 Meeting #94bis Chengdu, China, Oct. 8-12, 2018, R1-1810675.

"Timing of IAB-node transmissions, revision of R1-1813568", Ericsson, 3GPP TS-RAN WG1 Meeting #95 Spokane, US, Nov. 12-16, 2018, R1-1814154.

"Timing synchronization across IAB topology", Qualcomm Incorporated, 3GPP TSG RAN WG3 Meeting #99bis, Sanya, China, Apr. 16-Apr. 20, 2018, R3-181947.

* cited by examiner

Timing alignment case 7

COMMUNICATION METHOD AND DEVICE OF IAB NODE HAVING PLURALITY OF TIMINGS SET THEREIN

CROSS-REFERENCE TO RELATED APPLICATIONS

This application is the National Stage filing under 35 U.S.C. 371 of International Application No. PCT/KR2021/001876, filed on Feb. 15, 2021, which claims the benefit of Korean Application No. 10-2020-0016069, filed on Feb. 11, 2020, the contents of which are all hereby incorporated by reference herein in their entirety.

BACKGROUND OF THE DISCLOSURE

Field of the Disclosure

The present disclosure relates to wireless communication.

Related Art

One potential technology aimed at enabling future cellular network deployment scenarios and applications is as support for wireless backhaul and relay links, it enables flexible and highly dense deployment of NR cells without the need to proportionally densify the transport network.

Because larger bandwidths in NR are expected to be available (e.g. mmWave spectrum) compared to LTE with massive MIMO or native deployment of multi-beam systems, opportunities are created for the development and deployment of integrated access and backhaul links. This is achieved by establishing a number of control and data channels/procedures defined to provide access or access to terminals, this allows for easier deployment of a dense network of self-backhauled NR cells in a more integrated manner. Such systems are referred to as integrated access and backhaul links (IAB).

SUMMARY

The present specification proposes a communication method of an IAB node in which a plurality of timings are set.

Advantageous Effects

According to the present specification, it is possible to support more flexible and high-efficiency communication by proposing a communication method of an IAB node based on a plurality of timings.

Effects obtained through specific examples of this specification are not limited to the foregoing effects. For example, there may be a variety of technical effects that a person having ordinary skill in the related art can understand or derive from this specification. Accordingly, specific effects of the disclosure are not limited to those explicitly indicated herein but may include various effects that may be understood or derived from technical features of the disclosure.

BRIEF DESCRIPTION OF THE DRAWINGS

The accompanying drawings below are provided to help understanding of the present disclosure, and may provide embodiments of the present disclosure together with the detailed description. However, the technical features of the present disclosure are not limited to specific drawings, and features disclosed in each drawing may be combined with each other to constitute a new embodiment. Reference numerals in each drawing may refer to structural elements.

DESCRIPTION OF EXEMPLARY EMBODIMENTS

As used herein, "A or B" may mean "only A", "only B", or "both A and B". That is, "A or B" may be interpreted as "A and/or B" herein. For example, "A, B or C" may mean "only A", "only B", "only C", or "any combination of A, B, and C".

As used herein, a slash (/) or a comma (,) may mean "and/or". For example, "A/B" may mean "A and/or B". Therefore, "A/B" may include "only A", "only B", or "both A and B". For example, "A, B, C" may mean "A, B, or C".

As used herein, "at least one of A and B" may mean "only A", "only B", or "both A and B". Further, as used herein, "at least one of A or B" or "at least one of A and/or B" may be interpreted equally as "at least one of A and B".

As used herein, "at least one of A, B, and C" may mean "only A", "only B", "only C", or "any combination of A, B, and C". Further, "at least one of A, B, or C" or "at least one of A, B, and/or C" may mean "at least one of A, B, and C".

As used herein, parentheses may mean "for example". For instance, the expression "control information (PDCCH)" may mean that a PDCCH is proposed as an example of control information. That is, control information is not limited to a PDCCH, but a PDCCH is proposed as an example of control information. Further, the expression "control information (i.e., a PDCCH)" may also mean that a PDCCH is proposed as an example of control information.

Technical features that are separately described in one drawing may be implemented separately or may be implemented simultaneously.

Figure 1:
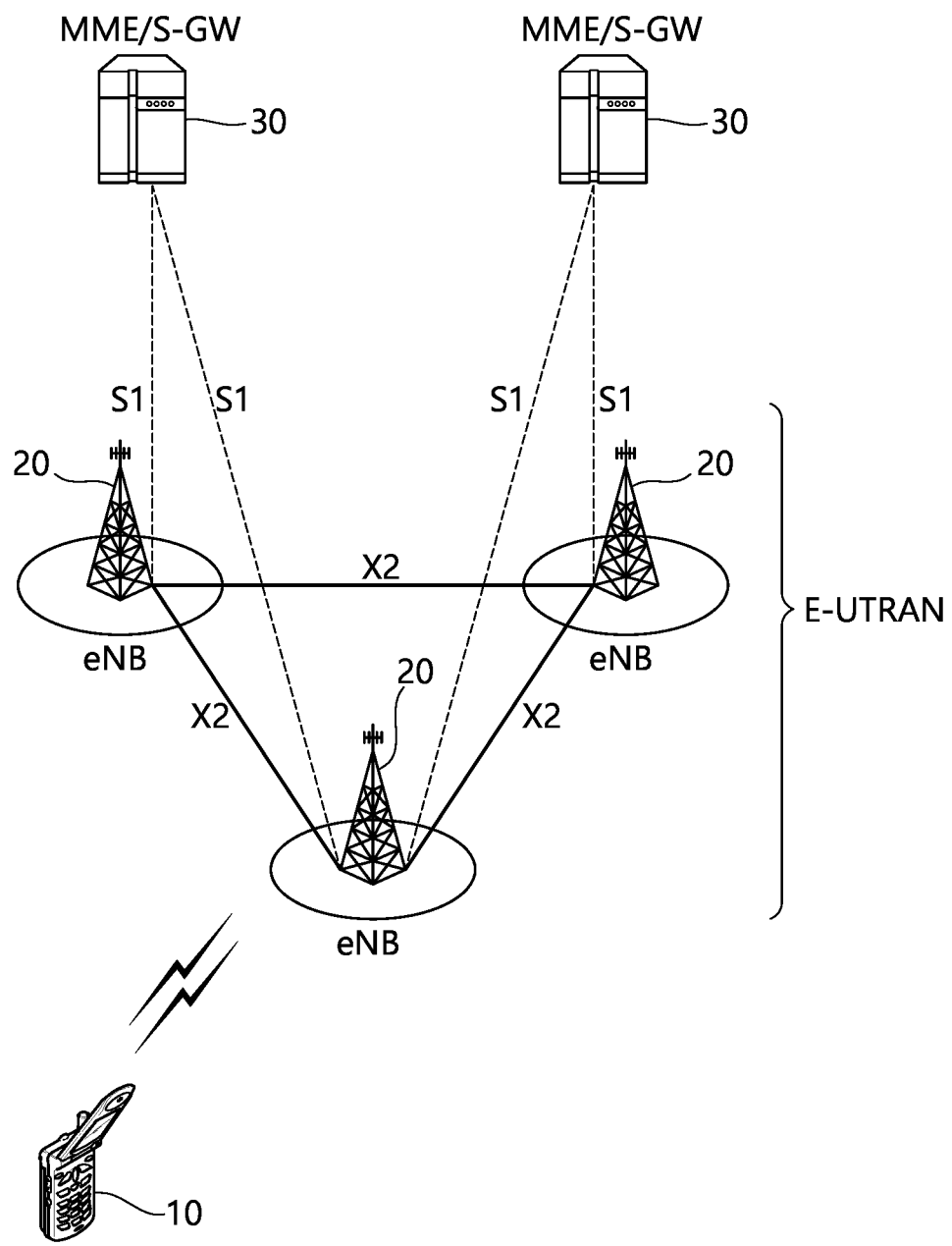
FIG. 1 shows a wireless communication system to which the present disclosure may be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
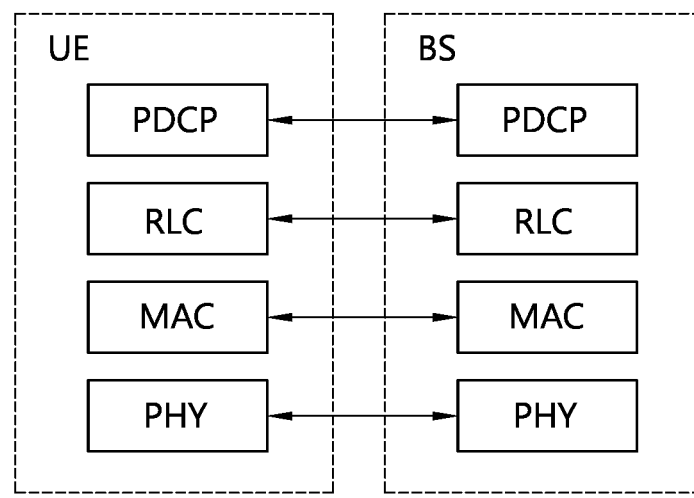
FIG. 2 is a diagram showing a wireless protocol architecture for a user plane.
Figure 3:
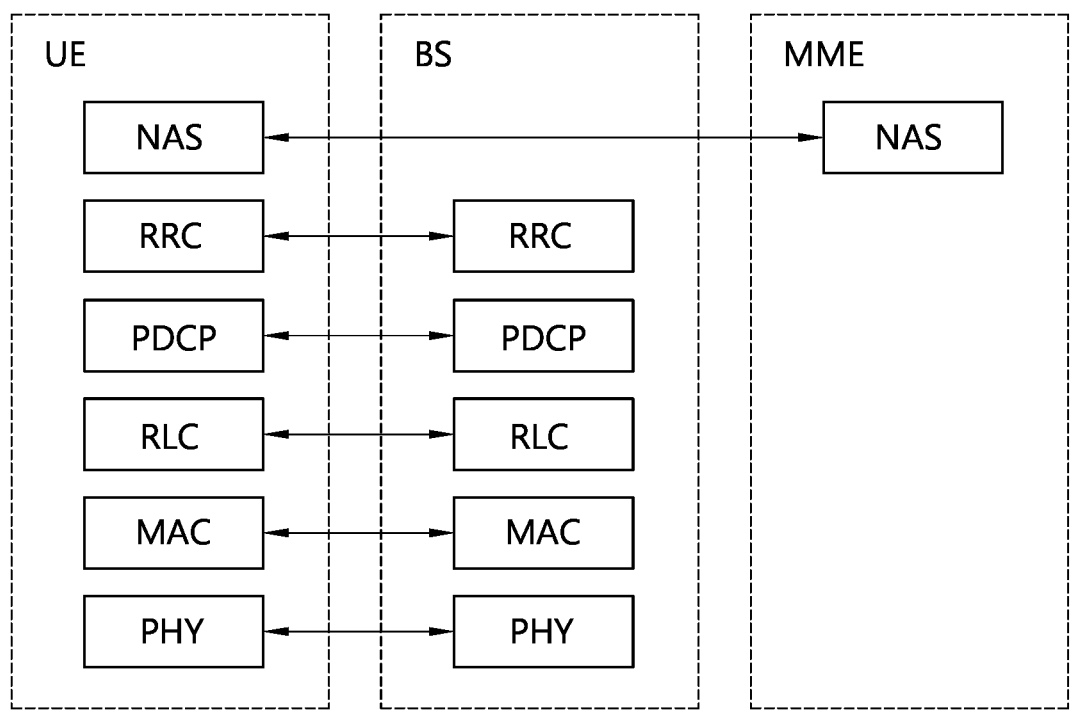
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time (e.g., slot, symbol) for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC), is discussed. This new technology may be called new radio access technology (new RAT or NR) in the present disclosure for convenience.

Figure 4:
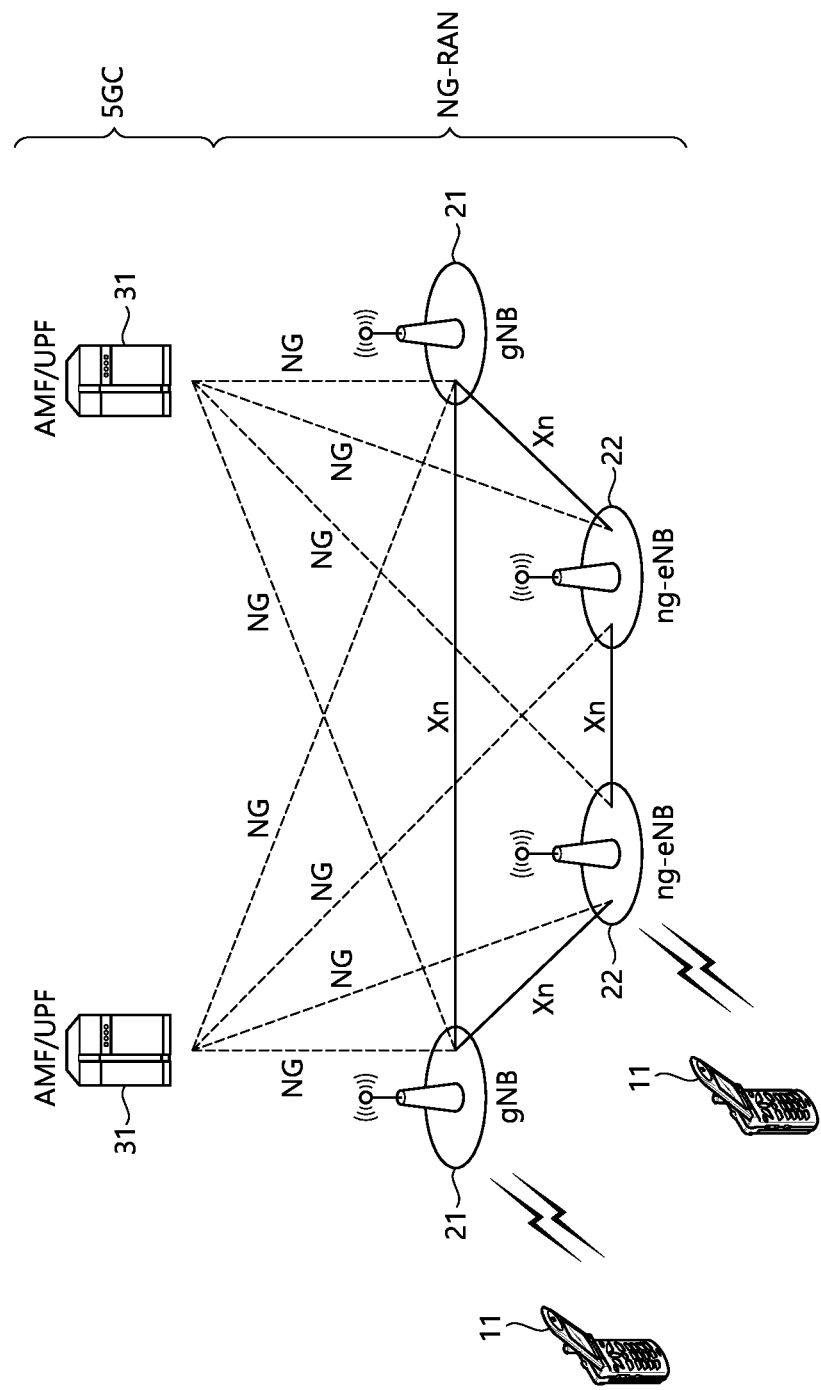
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G new radio access technology (NR) system. An entity used in a 5G NR system (hereinafter simply referred to as "NR") may absorb some or all functions of an entity (e.g., eNB, MME, S-GW) introduced in FIG. 1. An entity used in the NR system may be identified with the name "NG" to distinguish it from LTE.

Referring to FIG. 4, a wireless communication system includes one or more UEs 11, a next-generation RAN (NG-RAN), and a 5th generation core network (5GC). The NG-RAN consists of at least one NG-RAN node. The NG-RAN node is an entity corresponding to the BS 20 shown in FIG. 1. The NG-RAN node is configured with at least one gNB 21 and/or at least one ng-eNB 22. The gNB 21 provides termination of the NR user plane and control plane protocol towards the UE 11. The Ng-eNB 22 provides termination of the E-UTRA user plane and control plane protocol towards the UE 11.

5GC includes an access and mobility management function (AMF), a user plane function (UPF), and a session management function (SMF). AMF hosts functions such as NAS security, idle state mobility handling, and more. The AMF is an entity that includes the functions of the conventional MME. UPF hosts functions such as mobility anchoring and protocol data unit (PDU) processing. The UPF is an entity that includes the functions of the conventional S-GW. SMF hosts functions such as UE IP address assignment and PDU session control.

gNB and ng-eNB are interconnected via Xn interface. gNB and ng-eNB are also connected to 5GC via NG interface. More specifically, it is connected to the AMF via the NG-C interface and to the UPF via the NG-U interface.

Figure 5:
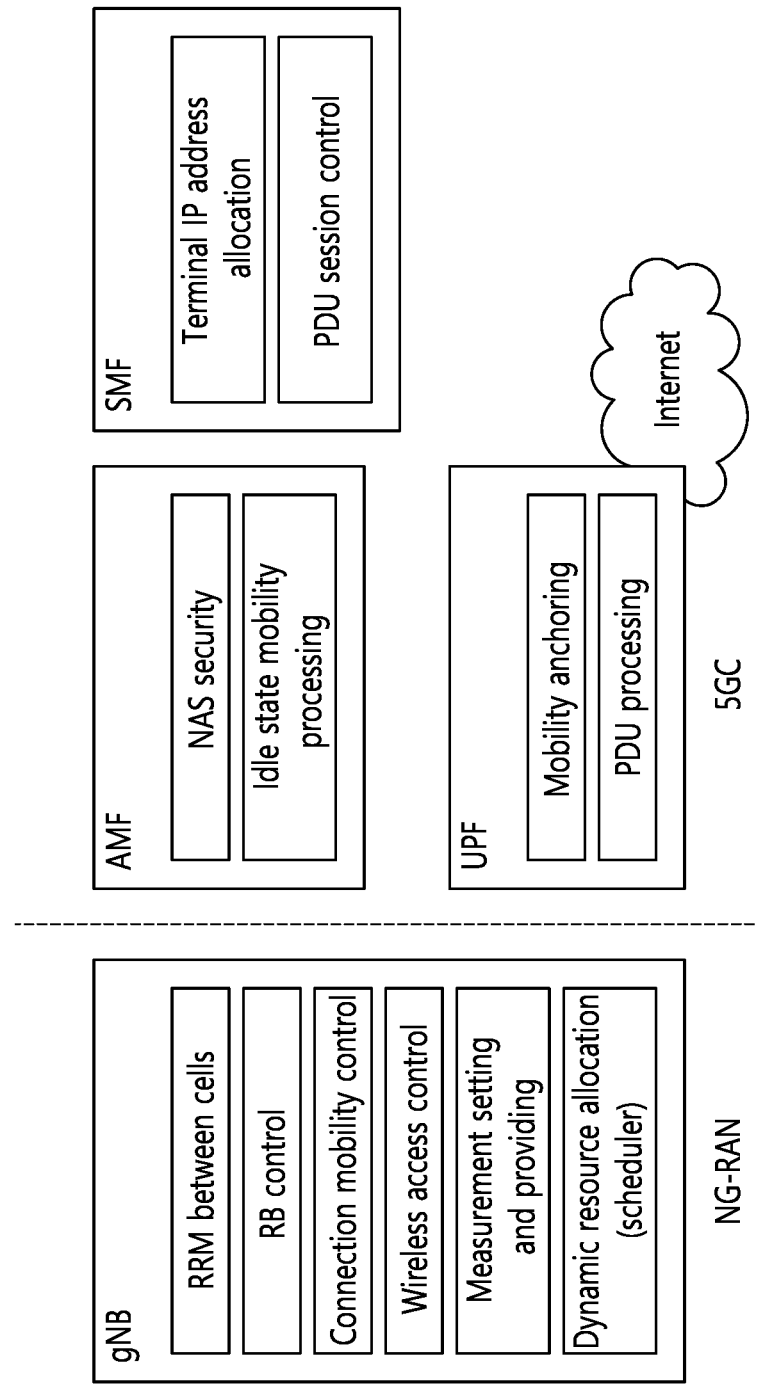
FIG. 5 illustrates a functional division between an NG-RAN and a 5GC.

FIG. 5 illustrates a functional division between an NG-RAN and a 5GC.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
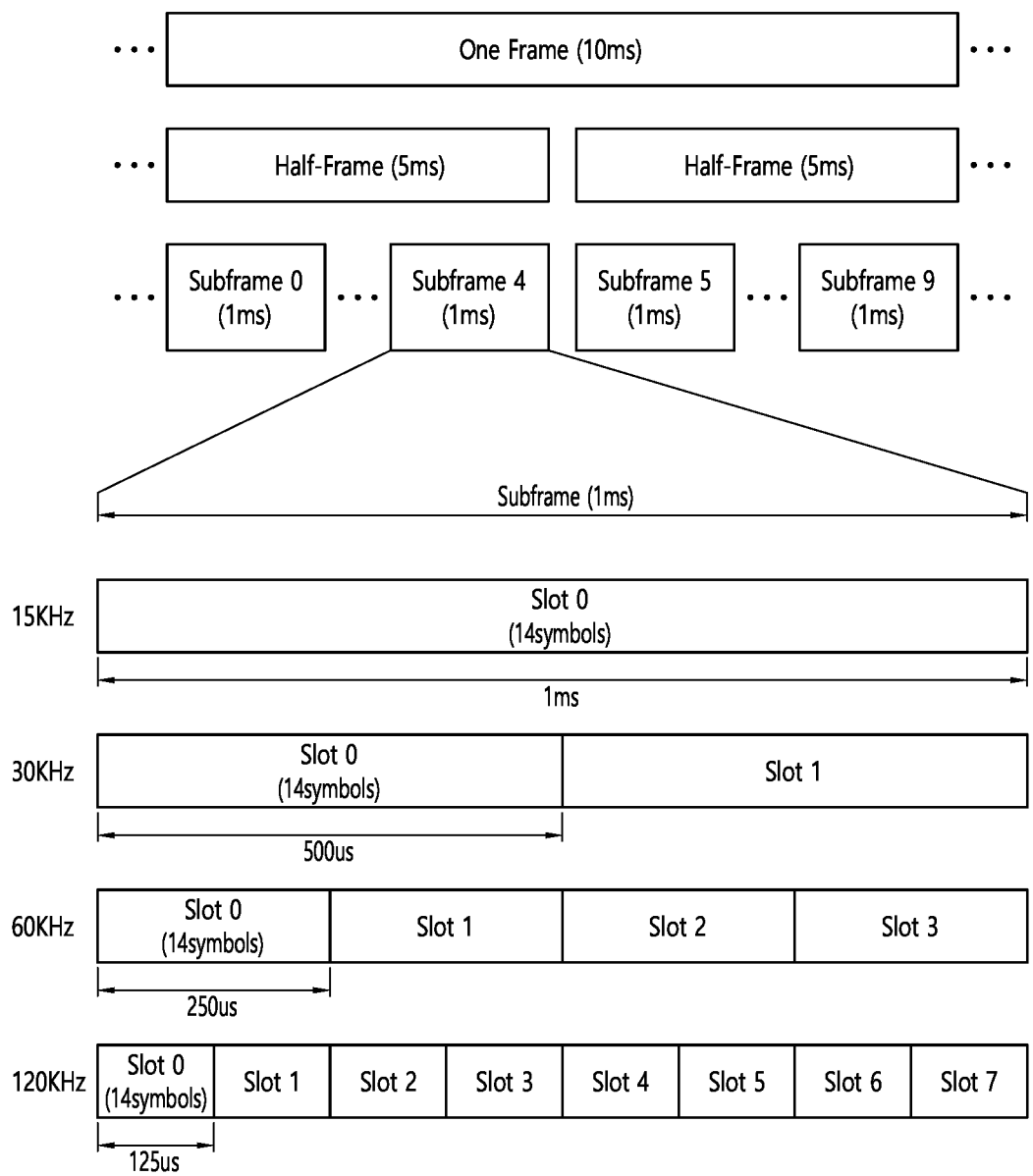
FIG. 6 illustrates a frame structure that can be applied in NR.

FIG. 6 illustrates a frame structure that can be applied in NR.

Referring to FIG. 6, a frame may be configured in 10 milliseconds (ms), and may include 10 subframes configured in 1 ms.

In NR, uplink and downlink transmission may be composed of frames. A radio frame has a length of 10 ms and may be defined as two 5 ms half-frames (HF). A half-frame may be defined as 5 1 ms subframes (Subframe, SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When the extended CP is used, each slot includes 12 symbols. Here, the symbol may include an OFDM symbol (or a CP-OFDM symbol) and an SC-FDMA symbol (or a DFT-s-OFDM symbol).

One or a plurality of slots may be included in the subframe according to subcarrier spacing.

The following table 1 illustrates a subcarrier spacing configuration μ.

TABLE 1

| μ | Δf = $2^\mu$ · 15[kHz] | Cyclic prefix |
|---|---|---|
| 0 | 15 | Normal |
| 1 | 30 | Normal |
| 2 | 60 | Normal |
|   |    | Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 3 below illustrates that the number of symbols per slot, the number of slots per frame, and the number of slots per subframe vary depending on the SCS, in case of using an extended CP.

TABLE 3

| SCS (15 · $2^\mu$) | $N^{slot}_{symb}$ | $N^{frame,u}_{slot}$ | $N^{subframe,u}_{slot}$ |
|---|---|---|---|
| 60 kHZ (μ = 2) | 12 | 40 | 4 |

NR supports multiple numerology (or subcarrier spacing (SCS)) to support various 5G services. For example, when SCS is 15 kHz, it supports a wide area in traditional cellular bands, when SCS is 30 kHz/60 kHz, it supports dense-urban, lower latency and wider carrier bandwidth, when SCS is 60 kHz or higher, it supports a bandwidth greater than 24.25 GHz to overcome phase noise.

The NR frequency band may be defined as two types of frequency ranges (FR1, FR2). The numerical value of the frequency range may be changed, for example, the frequency ranges of the two types (FR1, FR2) may be as shown in Table 4 below. For convenience of explanation, among the frequency ranges used in the NR system, FR1 may mean "sub 6 GHz range", FR2 may mean "above 6 GHz range" and may be referred to as millimeter wave (mmW).

TABLE 4

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 410 MHz to 7125 MHz as shown in Table 5 below. That is, FR1 may include a frequency band of 6 GHz (or 5850, 5900, 5925 MHz, etc.) or higher. For example, a frequency band of 6 GHz (or 5850, 5900, 5925 MHz, etc.) or higher included in FR1 may include an unlicensed band. The unlicensed band can be used for various purposes, for example, it may be used for communication for a vehicle (e.g., autonomous driving).

TABLE 5

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
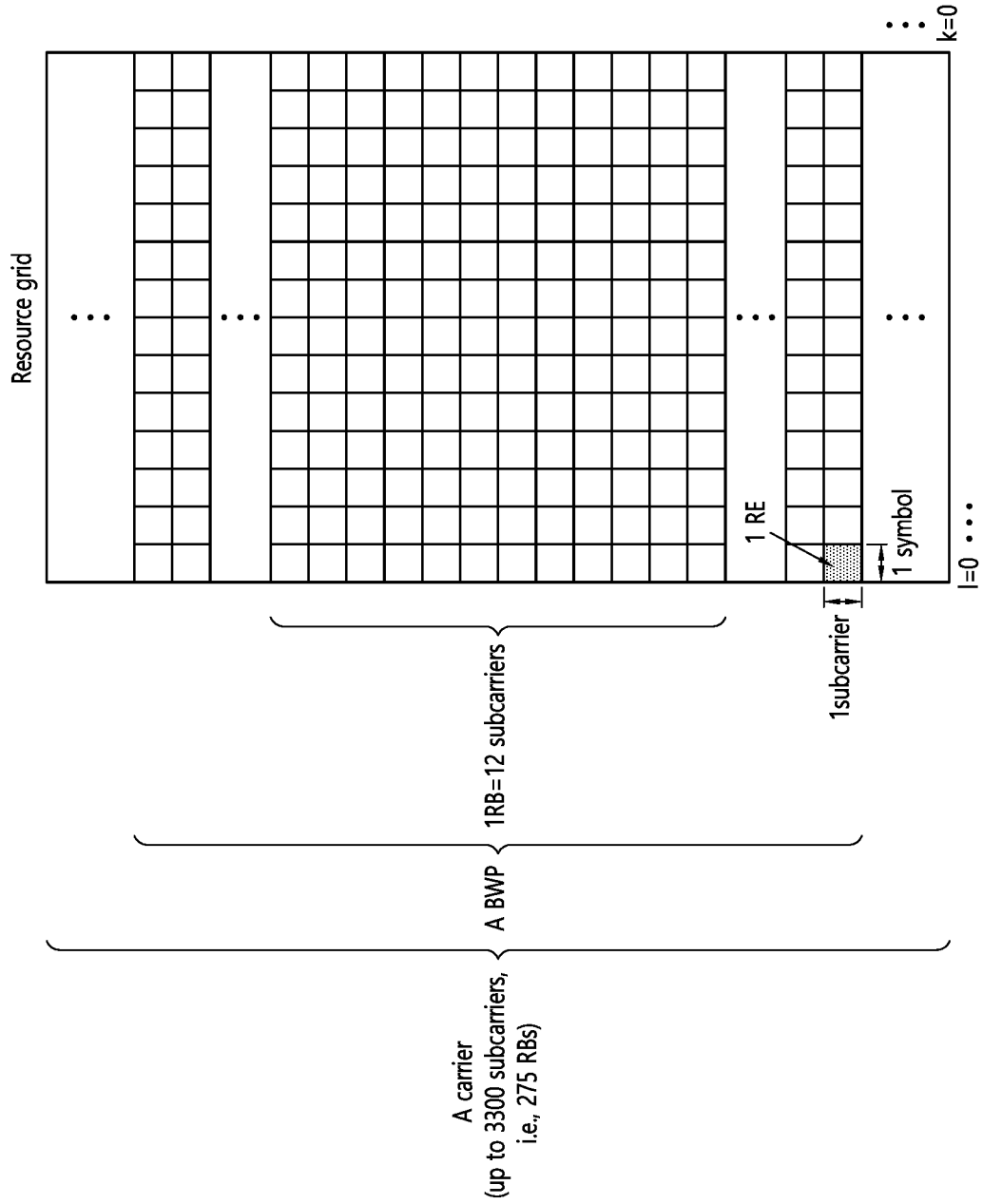
FIG. 7 shows a slot structure.

FIG. 7 shows a slot structure.

Referring to FIG. 7, a slot includes a plurality of symbols in the time domain. For example, in the case of a normal CP, one slot may include 14 symbols, but in the case of an extended CP, one slot may include 12 symbols. Alternatively, in the case of a normal CP, one slot may include 7 symbols, but in the case of an extended CP, one slot may include 6 symbols.

A carrier wave includes a plurality of subcarriers in the frequency domain. A resource block (RB) may be defined as a plurality of (eg, 12) consecutive subcarriers in the frequency domain. A bandwidth part (BWP) may be defined as a plurality of consecutive (P)RBs in the frequency domain, and may correspond to one numerology (eg, SCS, CP length, etc.). A carrier may include a maximum of N (eg, 5) BWPs. Data communication may be performed through the activated BWP. Each element may be referred to as a resource element (RE) in the resource grid, and one complex symbol may be mapped.

A physical downlink control channel (PDCCH) may include one or more control channel elements (CCEs) as illustrated in the following table 6.

TABLE 6

| Aggregation level | Number of CCEs |
|---|---|
| 1 | 1 |
| 2 | 2 |
| 4 | 4 |
| 8 | 8 |
| 16 | 16 |

Monitoring means decoding each PDCCH candidate according to a downlink control information (DCI) format. The UE monitors a set of PDCCH candidates in one or more CORESETs (described below) on the activated DL BWP of each activated serving cell for which PDCCH monitoring is configured according to a corresponding search space set.

Meanwhile, in NR, a new unit called a control resource set (CORESET) may be introduced. The UE may receive the PDCCH in CORESET.

Figure 8:
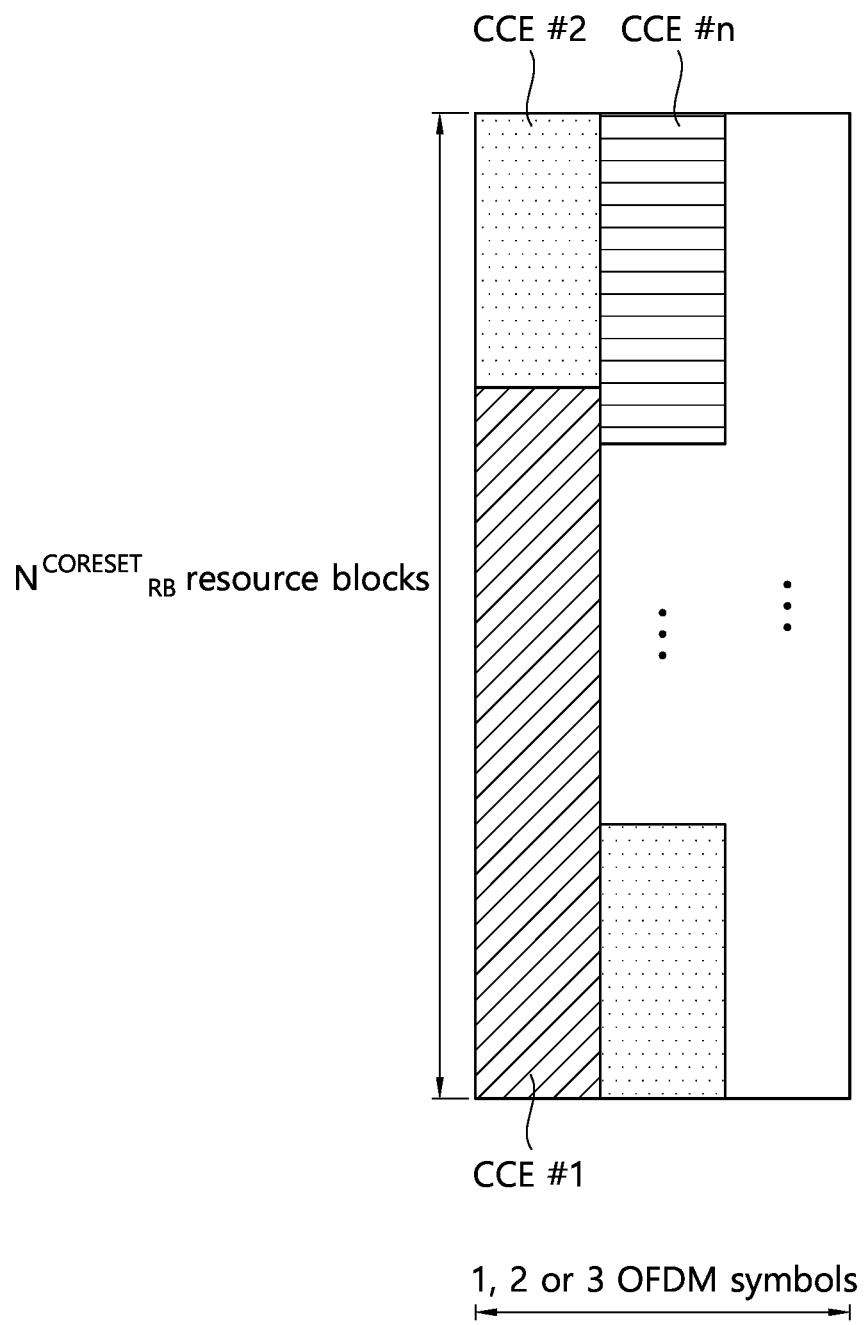
FIG. 8 illustrates CORESET.

FIG. 8 illustrates CORESET.

Referring to FIG. 8, the CORESET includes NCORESE-TRB resource blocks in the frequency domain, and NCORE-SETsymb∈{1, 2, 3} number of symbols in the time domain $N^{CORESET}_{RB}$ and $N^{CORESET}_{symb}$ may be provided by a base station via higher layer signaling. As illustrated in FIG. 8, a plurality of CCEs (or REGs) may be included in the CORESET. One CCE may be composed of a plurality of resource element groups (REGs), and one REG may include one OFDM symbol in the time domain and 12 resource elements in the frequency domain.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the UE.

Figure 9:
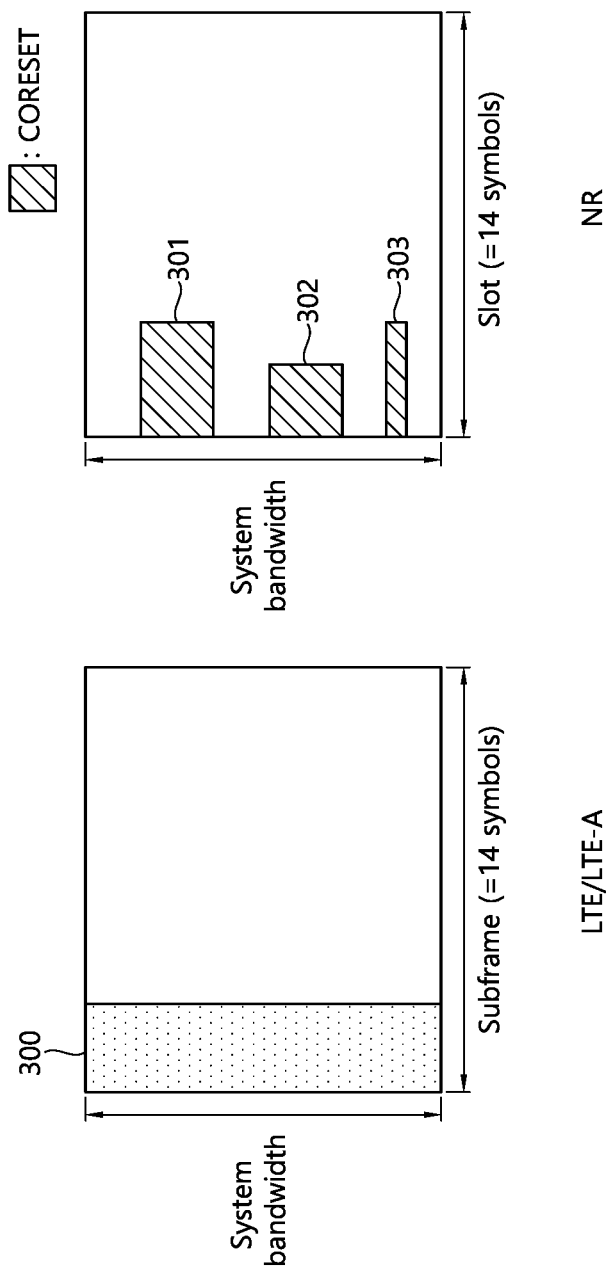
FIG. 9 is a diagram illustrating a difference between a conventional control region and CORESET in NR.

FIG. 9 is a diagram illustrating a difference between a conventional control region and CORESET in NR.

Referring to FIG. 9, the control region 300 in the conventional wireless communication system (eg, LTE/LTE-A) is configured over the entire system band used by the base station. All the UEs, excluding some (e.g., eMTC/NB-IoT UE) supporting only a narrow band, must be able to receive wireless signals of the entire system band of the BS in order to properly receive/decode control information transmitted by the BS.

On the other hand, in NR, the aforementioned CORESET was introduced. The CORESETs 301, 302, and 303 may be said to be radio resources for control information to be received by the terminal, and only a part of the system band may be used instead of the entire system band. The base station may allocate a CORESET to each terminal, and may transmit control information through the allocated CORESET. For example, in FIG. 9, the first CORESET 301 may be allocated to terminal 1, the second CORESET 302 may be allocated to the second terminal, and the third CORESET 303 may be allocated to terminal 3. In NR, the terminal may receive control information of the base station even if it does not necessarily receive the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

Meanwhile, in NR, the following techniques/features may be applied.

<Self-Contained Subframe Structure>

Figure 10:
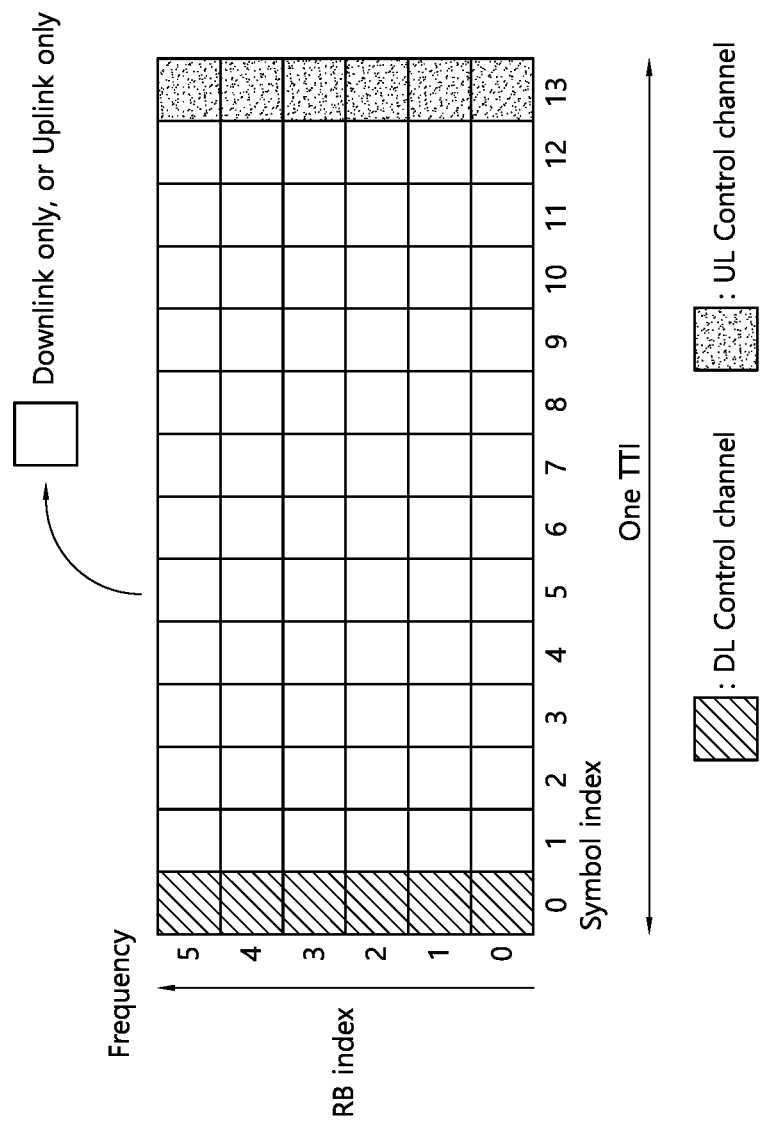
FIG. 10 illustrates an example of a frame structure for new radio access technology.

FIG. 10 illustrates an example of a frame structure for new radio access technology.

In NR, a structure in which a control channel and a data channel are time-division-multiplexed within one TTI, as shown in FIG. 10, can be considered as a frame structure in order to minimize latency.

In FIG. 10, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a UE to switch from a transmission mode to a reception mode or from the reception mode to the transmission mode may be required. To this end, some OFDM symbols at a time when DL switches to UL may be set to a guard period (GP) in the self-contained subframe structure.

Figure 11:
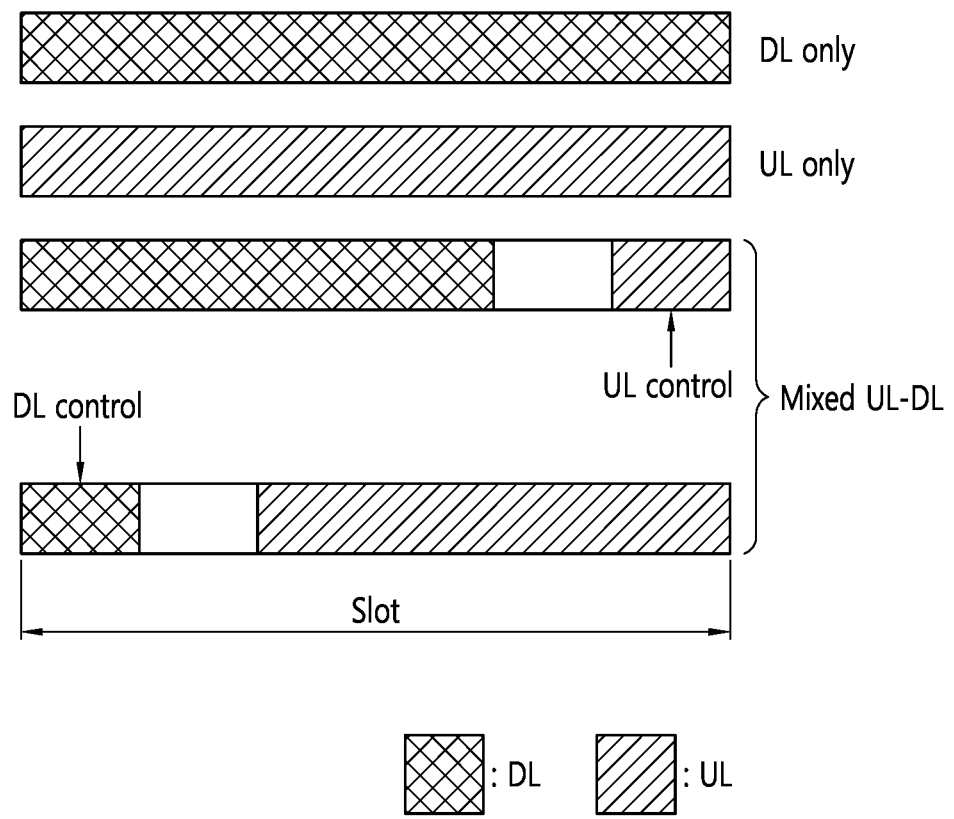
FIG. 11 is an example of a self-contained slot structure.

FIG. 11 is an example of a self-contained slot structure.

Referring to FIG. 11, one slot may have a self-contained structure in which all of a DL control channel, DL or UL data, and a UL control channel may be included. For example, the first N symbols in a slot may be used for transmitting a DL control channel (in what follows, DL control region), and the last M symbols in the slot may be used for transmitting an UL control channel (in what follows, UL control region). N and M are each an integer of 0 or larger. A resource region located between the DL and UL control regions (in what follows, a data region) may be used for transmission of DL data or UL data. As one example, one slot may correspond to one of the following configurations. Each period is listed in the time order.

1. DL only configuration
2. UL only configuration
3. Mixed UL-DL configuration
   DL region+GP (Guard Period)+UL control region
   DL control region+GP+UL region Here, the DL region may be (i) a DL data region, (ii) a DL control region+a DL data region. The UL region may be (i) a UL data region, (ii) a UL data region+UL control region.

In the DL control region, a PDCCH may be transmitted, and in the DL data region, a PDSCH may be transmitted. In the UL control region, a PUCCH may be transmitted, and in the UL data region, a PUSCH may be transmitted. In the PDCCH, Downlink Control Information (DCI), for example, DL data scheduling information or UL data scheduling information may be transmitted. In the PUCCH, Uplink Control Information (UCI), for example, ACK/NACK (Positive Acknowledgement/Negative Acknowledgement) information with respect to DL data, Channel State Information (CSI) information, or Scheduling Request (SR) may be transmitted. A GP provides a time gap during a process where a gNB and a UE transition from the transmission mode to the reception mode or a process where the gNB and UE transition from the reception mode to the transmission mode. Part of symbols belonging to the occasion in which the mode is changed from DL to UL within a subframe may be configured as the GP.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 12:
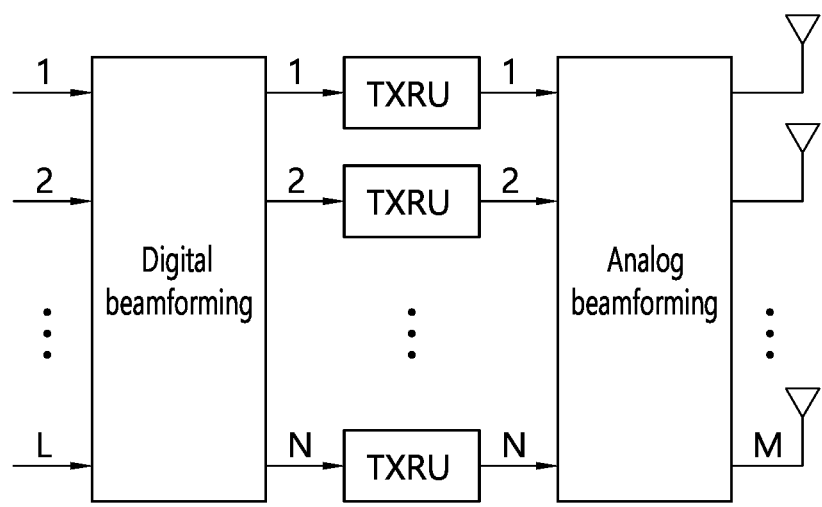
FIG. 12 is an abstract diagram of a hybrid beamforming structure from the viewpoint of the TXRU and the physical antenna.

FIG. 12 is an abstract diagram of a hybrid beamforming structure from the viewpoint of the TXRU and the physical antenna.

In FIG. 12, the number of digital beams is L, and the number of analog beams is N. Furthermore, in the NR system, a direction of supporting more efficient beamforming to a terminal located in a specific area is considered by designing a base station to change analog beamforming in units of symbols. Further, when defining N specific TXRUs and M RF antennas as one antenna panel in FIG. 12, in the NR system, a method of introducing a plurality of antenna panels to which hybrid beamforming independent of each other can be applied is being considered.

As described above, when the base station uses a plurality of analog beams, since the analog beam advantageous for signal reception may be different for each terminal, at least for a synchronization signal, system information, paging, etc., a beam sweeping operation in which a plurality of analog beams to be applied by a base station in a specific subframe is changed for each symbol so that all terminals can have a reception opportunity is being considered.

Figure 13:
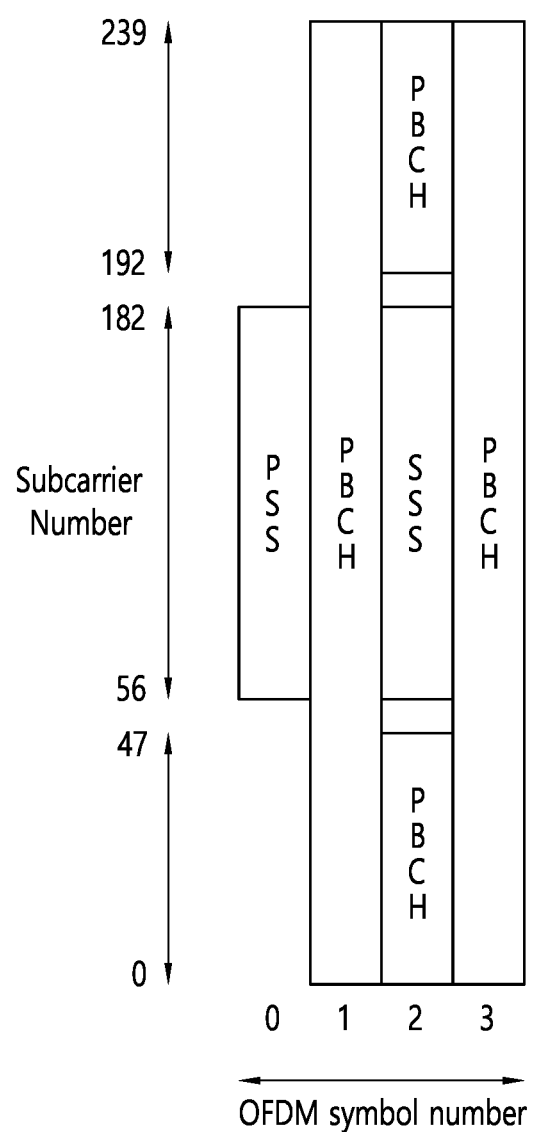
FIG. 13 shows a synchronization signal and a PBCH (SS/PBCH) block.

FIG. 13 shows a synchronization signal and a PBCH (SS/PBCH) block.

According to FIG. 13, the SS/PBCH block consists of PSS and SSS occupying 1 symbol and 127 subcarriers, respectively, and PBCH spanning 3 OFDM symbols and 240 subcarriers, but with an unused portion for SSS left in the middle on one symbol. The periodicity of the SS/PBCH block may be configured by the network, and the time position at which the SS/PBCH block may be transmitted may be determined by subcarrier spacing.

Polar coding may be used for the PBCH. The UE may assume a band-specific subcarrier interval for the SS/PBCH block unless the network sets the UE to assume different subcarrier intervals.

PBCH symbols carry their frequency-multiplexed DMRS. QPSK modulation may be used for PBCH. 1008 unique physical layer cell IDs may be given.

For a half frame with SS/PBCH blocks, first symbol indices for candidate SS/PBCH blocks are determined according to subcarrier spacing of SS/PBCH blocks, which will be described later.

Case A—Subcarrier spacing 15 kHz: The first symbols of the candidate SS/PBCH blocks have an index of {2, 8}+14*n. For carrier frequencies below 3 GHz, n=0, 1. For carrier frequencies above 3 GHz and below 6 GHz, n=0, 1, 2, 3.

Case B—Subcarrier spacing 30 kHz: The first symbols of the candidate SS/PBCH blocks have an index of {4, 8, 16, 20}+28*n. For carrier frequencies below 3 GHz, n=0. For carrier frequencies greater than 3 GHz and less than or equal to 6 GHz, n=0, 1.

Case C—Subcarrier spacing 30 kHz: The first symbols of candidate SS/PBCH blocks have an index of {2, 8}+14*n. For carrier frequencies below 3 GHz, n=0, 1. For carrier frequencies above 3 GHz and below 6 GHz, n=0, 1, 2, 3.

Case D—Subcarrier spacing 120 kHz: The first symbols of the candidate SS/PBCH blocks have an index of {4, 8, 16, 20}+28*n. For carrier frequencies above 6 GHz, n=0, 1, 2, 3, 5, 6, 7, 8, 10, 11, 12, 13, 15, 16, 17, 18.

Case E—Subcarrier spacing 240 kHz: The first symbols of the candidate SS/PBCH blocks have an index of {8, 12, 16, 20, 32, 36, 40, 44}+56*n. For carrier frequencies above 6 GHz, n=0, 1, 2, 3, 5, 6, 7, 8.

Candidate SS/PBCH blocks in a half frame are indexed in ascending order from 0 to L−1 on the time axis. The UE must determine 2 LSB bits for L=4 and 3 LSB bits for L>4 of the SS/PBCH block index per half frame from one-to-one mapping with the index of the DM-RS sequence transmitted in the PBCH. For L=64, the UE must determine 3 MSB bits of the SS/PBCH block index per half frame by the PBCH payload bits.

According to the upper layer parameter 'SSB-transmitted-SIB1', indices of SS/PBCH blocks in which the UE cannot receive other signals or channels in REs overlapping with REs corresponding to SS/PBCH blocks may be set. In addition, according to the upper layer parameter 'SSB-transmitted', in the REs overlapping the SS/PBCH blocks and REs corresponding to the SS/PBCH blocks, the index of the SS/PBCH blocks per serving cell that the UE cannot receive other signals or channels may be set. The setting by 'SSB-transmitted' may take precedence over the setting by 'SSB-transmitted-SIB1'. A periodicity of a half frame for reception of SS/PBCH blocks per serving cell may be set by a higher layer parameter 'SSB-periodicityServingCell'. If the UE does not set the periodicity of the half frame for the reception of SS/PBCH blocks, the UE must assume the periodicity of the half frame. The UE may assume that the periodicity is the same for all SS/PBCH blocks in the serving cell.

Figure 14:
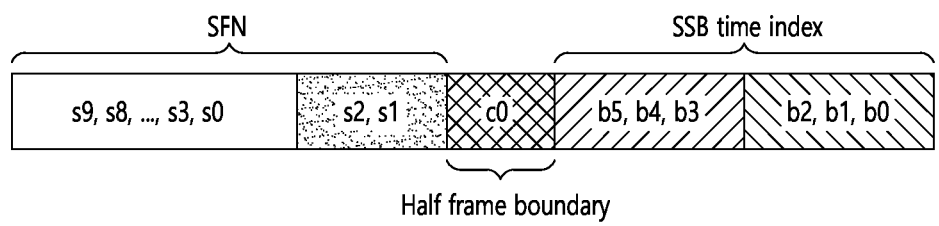
FIG. 14 is for explaining a method for a terminal to obtain timing information.

FIG. 14 is for explaining a method for a terminal to obtain timing information.

First, the UE may obtain 6-bit SFN information through the MIB (Master Information Block) received in the PBCH. In addition, SFN 4 bits can be obtained in the PBCH transport block.

Second, the UE may obtain a 1-bit half frame indicator as part of the PBCH payload. Below 3 GHz, the half frame indicator may be implicitly signaled as part of the PBCH DMRS for Lmax=4.

Finally, the UE may obtain the SS/PBCH block index by the DMRS sequence and the PBCH payload. That is, LSB 3 bits of the SS block index can be obtained by the DMRS sequence for a period of 5 ms. Also, the MSB 3 bits of the timing information are explicitly carried within the PBCH payload (for >6 GHz).

In the initial cell selection, the UE may assume that a half frame with SS/PBCH blocks occurs with a periodicity of 2 frames. Upon detecting the SS/PBCH block, the UE determines that a control resource set for the Type0-PDCCH common search space exists if $k_{SSB} \leq 23$ for FR1 and $k_{SSB} \leq 11$ for FR2. The UE determines that there is no control resource set for the Type0-PDCCH common search space if $k_{SSB} > 23$ for FR1 and $k_{SSB} > 11$ for FR2.

For a serving cell without transmission of SS/PBCH blocks, the UE acquires time and frequency synchronization of the serving cell based on reception of the SS/PBCH blocks on the PSCell or the primary cell of the cell group for the serving cell.

Hereinafter, acquisition of system information will be described.

System information (SI) is divided into a master information block (MIB) and a plurality of system information blocks (SIBs) where:
- the MIB is transmitted always on a BCH according to a period of 80 ms, is repeated within 80 ms, and includes parameters necessary to obtain system information block type1 (SIB1) from a cell;
- SIB1 is periodically and repeatedly transmitted on a DL-SCH. SIB1 includes information on availability and scheduling (e.g., periodicity or SI window size) of other SIBs. Further, SIB1 indicates whether the SIBs (i.e., the other SIBs) are periodically broadcast or are provided by request. When the other SIBs are provided by request, SIB1 includes information for a UE to request SI;
- SIBs other than SIB1 are carried via system information (SI) messages transmitted on the DL-SCH. Each SI message is transmitted within a time-domain window (referred to as an SI window) periodically occurring;
- For a PSCell and SCells, an RAN provides required SI by dedicated signaling.

Nevertheless, a UE needs to acquire an MIB of the PSCell in order to obtain the SFN timing of a SCH (which may be different from an MCG). When relevant SI for a SCell is changed, the RAN releases and adds the related SCell. For the PSCell, SI can be changed only by reconfiguration with synchronization (sync).

Figure 15:
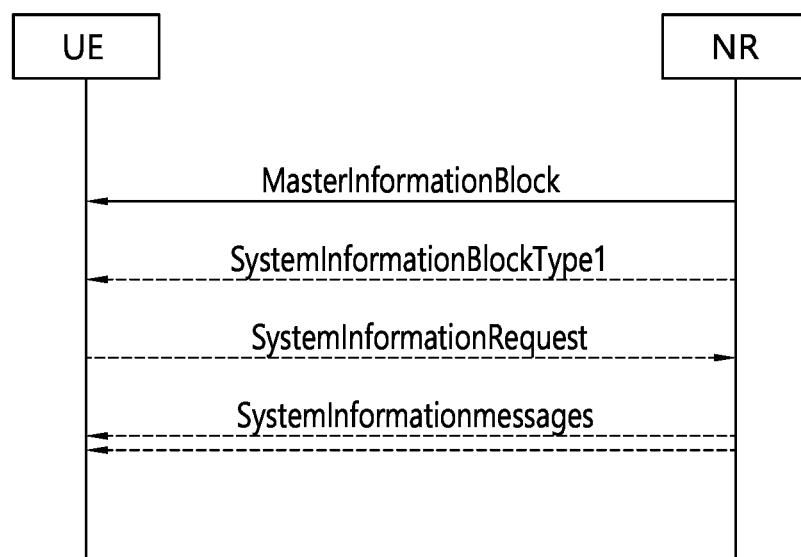
FIG. 15 illustrates an example of a system information acquisition process of a UE.

FIG. 15 illustrates an example of a system information acquisition process of a UE.

Referring to FIG. 15, the UE may receive an MIB from a network and may then receive SIB 1. Subsequently, the UE may transmit a system information request to the network and may receive a system information message from the network in response.

The UE may apply a system information acquisition procedure for acquiring access stratum (AS) and non-access stratum (NAS) information.

In RRC_IDLE and RRC_INACTIVE states, the UE needs to ensure valid versions of (at least) the MIB, SIB1, and system information block type X (according to relevant RAT support for mobility controlled by the UE).

In an RRC_CONNECTED state, the UE needs to ensure valid versions of the MIB, SIB1, and system information block type X (according to mobility support for relevant RAT).

The UE needs to store relevant SI obtained from a currently camping/serving cell. The version of the SI obtained and stored by the UE is valid only for a certain period of time. The UE may use this version of the stored SI, for example, after cell reselection, after return from out of coverage, or after indication of a system information change.

Hereinafter, random access will be described.

A UE's random access procedure may be summarized in Table 6.

TABLE 6

| | Type of signal | Operation/obtained information |
|---|---|---|
| Step 1 | Uplink PRACH preamble | To obtain initial beam Random election of RA-preamble ID |
| Step 2 | Random access response on DL-SCH | Timing alignment information RA-preamble ID Initial uplink grant, temporary C-RNTI |
| Step 3 | Uplink transmission on UL-SCH | RRC connection request UE identifier |
| Step 4 | Downlink contention resolution | C-RNTI on PDCCH for initial access C-RNTI on PDCCH for RRC_CONNECTED UE |

Figure 16:
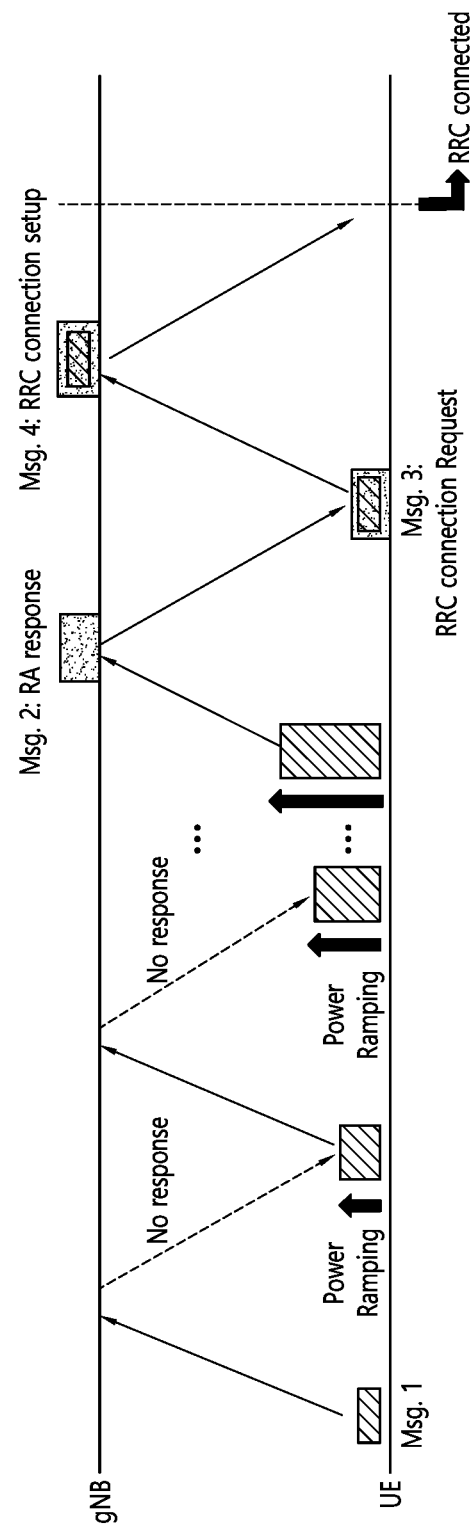
FIG. 16 illustrates a random access procedure.

FIG. 16 illustrates a random access procedure.

Referring to FIG. 16, first, a UE may transmit a PRACH preamble as Msg 1 of the random access procedure via an uplink.

Two random access preamble sequences having different lengths are supported. A long sequence having a length of 839 is applied to a subcarrier spacing of 1.25 kHz and 5 kHz, and a short sequence having a length of 139 is applied to a subcarrier spacing of 15 kHz, 30 kHz, 60 kHz, and 120 kHz. The long sequence supports an unrestricted set and restricted sets of type A and type B, while the short sequence may support only an unrestricted set.

A plurality of RACH preamble formats is defined by one or more RACH OFDM symbols, different cyclic prefixes (CPs), and a guard time. A PRACH preamble setting to be used is provided to the UE as system information.

When there is no response to Msg 1, the UE may retransmit the power-ramped PRACH preamble within a specified number of times. The UE calculates PRACH transmission power for retransmission of the preamble based on the most recent estimated path loss and a power ramping counter. When the UE performs beam switching, the power ramping counter does not change.

Figure 17:
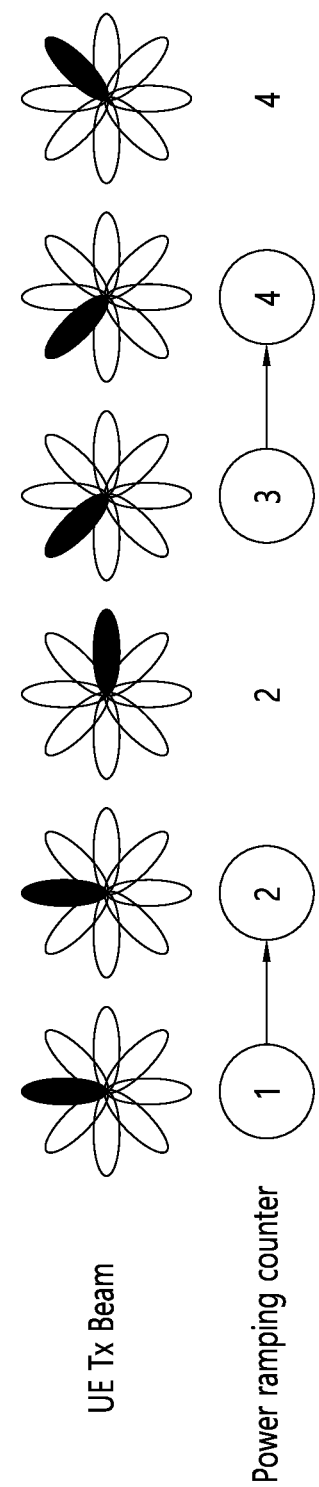
FIG. 17 illustrates a power ramping counter.

FIG. 17 illustrates a power ramping counter.

A UE may perform power ramping for retransmission of a random access preamble based on a power ramping counter. Here, as described above, when the UE performs beam switching in PRACH retransmission, the power ramping counter does not change.

Referring to FIG. 17, when the UE retransmits the random access preamble for the same beam, the UE increases the power ramping counter by 1, for example, the power ramping counter is increased from 1 to 2 and from 3 to 4. However, when the beam is changed, the power ramping counter does not change in PRACH retransmission.

Figure 18:
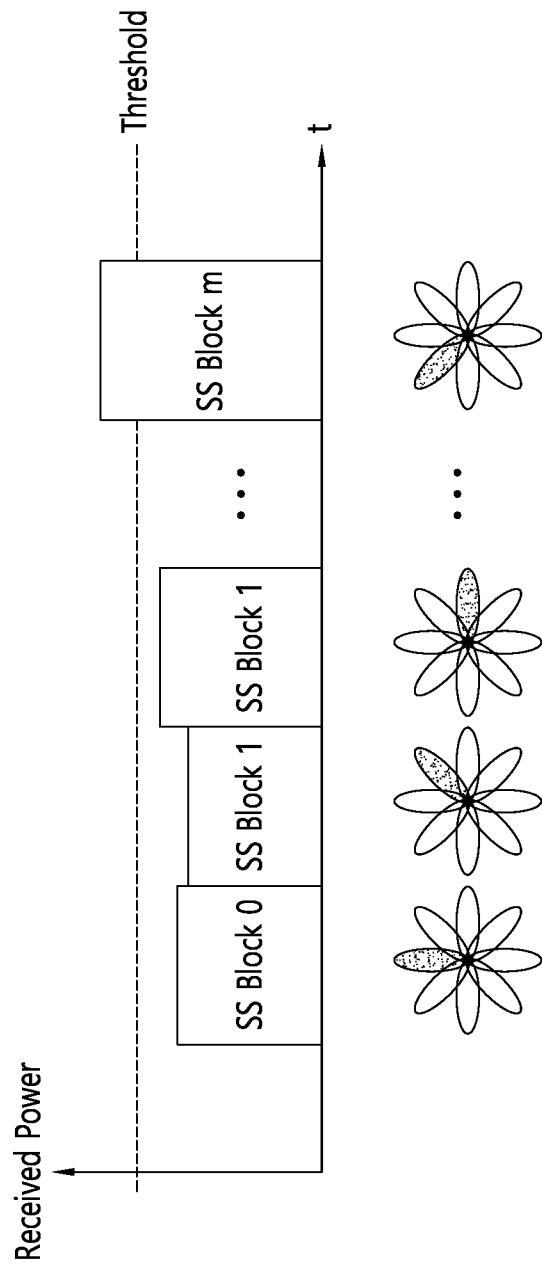
FIG. 18 illustrates the concept of the threshold of an SS block in a relationship with an RACH resource.

FIG. 18 illustrates the concept of the threshold of an SS block in a relationship with an RACH resource.

A UE knows the relationship between SS blocks and RACH resources through system information. The threshold of an SS block in a relationship with an RACH resource is based on RSRP and a network configuration. Transmission or retransmission of a RACH preamble is based on an SS block satisfying the threshold. Therefore, in the example of FIG. 18, since SS block m exceeds the threshold of received power, the RACH preamble is transmitted or retransmitted based on SS block m.

Subsequently, when the UE receives a random access response on a DL-SCH, the DL-SCH may provide timing alignment information, an RA-preamble ID, an initial uplink grant, and a temporary C-RNTI.

Based on the information, the UE may perform uplink transmission of Msg3 of the random access procedure on a UL-SCH. Msg3 may include an RRC connection request and a UE identifier.

In response, a network may transmit Msg4, which can be considered as a contention resolution message, via a downlink. Upon receiving this message, the UE can enter the RRC-connected state.

<Bandwidth Part (BWP)>

In the NR system, up to 400 megahertz (MHz) per component carrier (CC) may be supported. If the terminal operating in such a wideband CC always operates with the RF for the entire CC turned on, the terminal battery consumption may increase. Alternatively, when considering several use cases (eg, eMBB, URLLC, mMTC, etc.) operating within one broadband CC, different numerology (eg, subcarrier spacing) for each frequency band within the CC-carrier spacing: SCS)) may be supported. Alternatively, the capability for the maximum bandwidth may be different for each terminal. In consideration of this, the base station may instruct the terminal to operate only in a partial bandwidth rather than the full bandwidth of the broadband CC, for convenience, the partial bandwidth is defined as a bandwidth part (BWP). The BWP may be composed of continuous resource blocks (RBs) on the frequency axis, it may correspond to one numerology (e.g., subcarrier interval, cyclic prefix (CP) length, slot/mini-slot duration, etc.).

On the other hand, the base station may set a plurality of BWPs even within one CC configured for the terminal. For example, in the PDCCH monitoring slot, a BWP occupying a relatively small frequency region is set, the PDSCH indicated by the PDCCH may be scheduled on a larger BWP. Alternatively, when terminals are concentrated in a specific BWP, some terminals may be set to other BWPs for load balancing. Alternatively, in consideration of frequency domain inter-cell interference cancellation between neighboring cells, etc., it is possible to exclude a part of the entire bandwidth and set both BWPs in the same slot. That is, the base station may set at least one DL/UL BWP to a terminal associated with a wideband CC, it is possible to activate (activation) at least one DL/UL BWP (by L1 signaling or MAC CE or RRC signaling, etc.) among the DL/UL BWP(s) set at a specific time, switching to another configured DL/UL BWP may be indicated (by L1 signaling or MAC CE or RRC signaling, etc.), when the timer value expires based on the timer, it may be switched to a predetermined DL/UL BWP. In this case, the activated DL/UL BWP is defined as an active DL/UL BWP. However, in a situation such as the terminal is in the process of initial access or before the RRC connection is set up, it may not receive the configuration for the DL/UL BWP, in this situation, the DL/UL BWP assumed by the UE is defined as an initial active DL/UL BWP.

<DRX (Discontinuous Reception)>

Discontinuous Reception (DRX) refers to an operation mode in which a UE (User Equipment) reduces battery consumption so that the UE can discontinuously receive a downlink channel That is, the terminal configured for DRX can reduce power consumption by discontinuously receiving the DL signal.

The DRX operation is performed within a DRX cycle indicating a time interval in which On Duration is periodically repeated. The DRX cycle includes an on-period and a sleep period (Sleep Duration) (or a chance of DRX). The on-period indicates a time interval during which the UE monitors the PDCCH to receive the PDCCH.

DRX may be performed in RRC (Radio Resource Control)_IDLE state (or mode), RRC_INACTIVE state (or mode), or RRC_CONNECTED state (or mode). In RRC_IDLE state and RRC_INACTIVE state, DRX may be used to receive paging signal discontinuously.

RRC_IDLE state: a state in which a radio connection (RRC connection) is not established between the base station and the terminal.

RRC_INACTIVE state: A wireless connection (RRC connection) is established between the base station and the terminal, but the wireless connection is inactive.

RRC_CONNECTED state: a state in which a radio connection (RRC connection) is established between the base station and the terminal.

DRX can be basically divided into idle mode DRX, connected DRX (C-DRX), and extended DRX.

DRX applied in the IDLE state may be named idle mode DRX, and DRX applied in the CONNECTED state may be named connected mode DRX (C-DRX).

Extended/Enhanced DRX (eDRX) is a mechanism that can extend the cycles of idle mode DRX and C-DRX, and Extended/Enhanced DRX (eDRX) can be mainly used for (massive) IoT applications. In idle mode DRX, whether to allow eDRX may be configured based on system information (eg, SIB1). SIB1 may include an eDRX-allowed parameter. The eDRX-allowed parameter is a parameter indicating whether idle mode extended DRX is allowed.

<Idle Mode DRX>

In the idle mode, the terminal may use DRX to reduce power consumption. One paging occasion (PO) is Physical Downlink Control Channel (PDCCH) (for which paging message for NB-IoT is addressed by) Paging-Radio Network Temporary Identifier (P-RNTI) or is a subframe that can be transmitted through MTC PDCCH (MPDCCH) or narrowband PDCCH (NPDCCH).

In P-RNTI transmitted through MPDCCH, PO may indicate a start subframe of MPDCCH repetition. In the case of P-RNTI transmitted over NPDCCH, if the subframe determined by the PO is not a valid NB-IoT downlink subframe, PO may indicate a start subframe of NPDCCH repetition. Therefore, the first valid NB-IoT downlink subframe after PO is the start subframe of NPDCCH repetition.

One paging frame (PF) is one radio frame that may include one or a plurality of paging opportunities. When DRX is used, the UE only needs to monitor one PO per DRX cycle. One paging narrow band (PNB) is one narrow band in which the terminal performs paging message reception. PF, PO, and PNB may be determined based on DRX parameters provided in system information.

Figure 19:
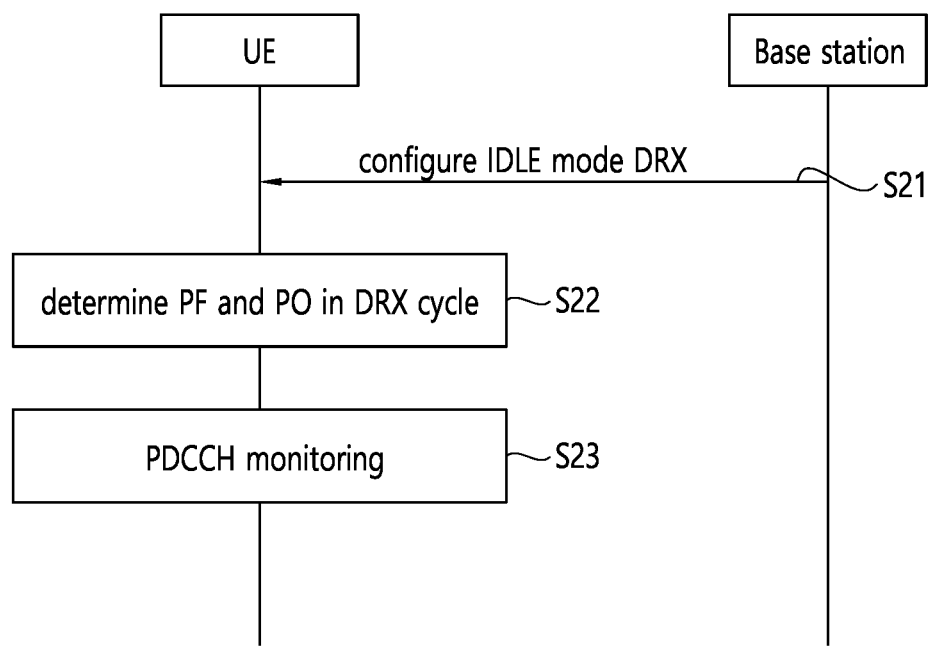
FIG. 19 is a flowchart illustrating an example of performing an idle mode DRX operation.

FIG. 19 is a flowchart illustrating an example of performing an idle mode DRX operation.

According to FIG. 19, the terminal may receive idle mode DRX configuration information from the base station through higher layer signaling (eg, system information) (S21).

The UE may determine a Paging Frame (PF) and a Paging Occasion (PO) to monitor the PDCCH in the paging DRX cycle based on the idle mode DRX configuration information (S22). In this case, the DRX cycle may include an on-period and a sleep period (or an opportunity of DRX).

The UE may monitor the PDCCH at the PO of the determined PF (S23). Here, for example, the UE monitors only one subframe (PO) per paging DRX cycle. In addition, when the terminal receives the PDCCH scrambled by the P-RNTI during the on-period (ie, when paging is detected), the terminal may transition to the connected mode and transmit/receive data to/from the base station.

<Connected Mode DRX (C-DRX)>

C-DRX means DRX applied in the RRC connection state. The DRX cycle of C-DRX may consist of a short DRX cycle and/or a long DRX cycle. Here, a short DRX cycle may correspond to an option.

When C-DRX is configured, the UE may perform PDCCH monitoring for the on-period. If the PDCCH is successfully detected during PDCCH monitoring, the UE may operate (or run) an inactive timer and maintain an awake state. Conversely, if the PDCCH is not successfully detected during PDCCH monitoring, the UE may enter the sleep state after the on-period ends.

When C-DRX is configured, a PDCCH reception opportunity (e.g., a slot having a PDCCH search space) may be configured non-contiguously based on the C-DRX configuration. In contrast, if C-DRX is not configured, a PDCCH reception opportunity (e.g., a slot having a PDCCH search space) may be continuously configured in the present disclosure.

On the other hand, PDCCH monitoring may be limited to a time interval set as a measurement gap (gap) regardless of the C-DRX configuration.

Figure 20:
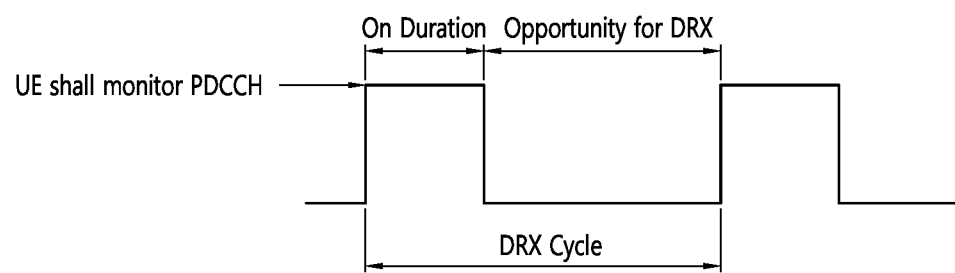
FIG. 20 illustrates a DRX cycle.

FIG. 20 illustrates a DRX cycle.

Referring to FIG. 20, the DRX cycle consists of 'On Duration' and 'Opportunity for DRX (opportunity for DRX)'. The DRX cycle defines a time interval in which the 'on-period' is periodically repeated. The 'on-interval' indicates a time period that the UE monitors to receive the PDCCH. When DRX is configured, the UE performs PDCCH monitoring during the 'on-period'. If there is a PDCCH successfully detected during PDCCH monitoring, the UE operates an inactivity timer and maintains an awake state. On the other hand, if there is no PDCCH successfully detected during PDCCH monitoring, the UE enters a sleep state after the 'on-period' ends. Therefore, when DRX is configured, PDCCH monitoring/reception may be discontinuously performed in the time domain in performing the procedures and/or methods described/proposed above. For example, when DRX is configured, in the present disclosure, a PDCCH reception opportunity (e.g., a slot having a PDCCH search space) may be configured discontinuously according to the DRX configuration. On the other hand, when DRX is not configured, PDCCH monitoring/reception may be continuously performed in the time domain in performing the procedures and/or methods described/proposed above. For example, when DRX is not configured, PDCCH reception opportunities (e.g., a slot having a PDCCH search space) in the present disclosure may be continuously configured. Meanwhile, regardless of whether DRX is configured or not, PDCCH monitoring may be limited in a time interval configured as a measurement gap.

Table 8 shows the process of the UE related to DRX (RRC_CONNECTED state). Referring to Table 8, DRX configuration information is received through higher layer (e.g., RRC) signaling, and whether DRX ON/OFF is controlled by a DRX command of the MAC layer. When DRX is configured, PDCCH monitoring may be discontinuously performed in performing the procedures and/or methods described/proposed in the present disclosure.

TABLE 8

| | Type of signals | UE procedure |
|---|---|---|
| Step 1 | RRC signaling (MAC-CellGroupConfig) | Receive DRX setting information |
| Step 2 | MAC CE ((Long) DRX command MAC CE) | Receive DRX command |
| Step 3 | — | PDCCH monitoring during on-duration of DRX cycle |

The MAC-CellGroupConfig may include configuration information required to set a MAC (Medium Access Control) parameter for a cell group. MAC-CellGroupConfig may also include configuration information related to DRX. For example, MAC-CellGroupConfig may include information as follows to define DRX.

Value of drx-OnDurationTimer: Defines the length of the start section of the DRX cycle Value of drx-InactivityTimer: Defines the length of the time interval in which the UE remains awake after the PDCCH opportunity in which the PDCCH indicating the initial UL or DL data is detected Value of drx-HARQ-RTT-TimerDL: Defines the length of the maximum time interval from the reception of the initial DL transmission until the reception of the DL retransmission.

Value of drx-HARQ-RTT-TimerDL: Defines the length of the maximum time interval after the grant for UL initial transmission is received until the grant for UL retransmission is received.

drx-LongCycleStartOffset: Defines the time length and start time of the DRX cycle drx-ShortCycle (optional): Defines the time length of short DRX cycle Here, if any one of drx-OnDurationTimer, drx-InactivityTimer, drx-HARQ-RTT-TimerDL, and drx-HARQ-RTT-TimerDL is in operation, the UE maintains the awake state and performs PDCCH monitoring at every PDCCH opportunity.

Hereinafter, an integrated access and backhaul link (IAB) will be described. Meanwhile, for convenience of description, a proposed method will be described below based on a new RAT (NR) system. However, the range of the system to which the proposed method is applied is expandable to other systems such as 3GPP LTE/LTE-A systems in addition to the NR system.

One of the potential technologies aimed at enabling future cellular network deployment scenarios and applications enables flexible and highly dense deployment of NR cells without the need to proportionally densify the transport network as support for wireless backhaul and relay links.

Because larger bandwidth in NR compared to LTE is expected to be available (e.g. mmWave spectrum) with the native deployment of massive MIMO or multi-beam systems, opportunities are created for the development and deployment of integrated access and backhaul links. This is done by establishing a number of control and data channels/procedures defined to provide access or access to terminals, this allows for easier deployment of a dense network of self-backhauled NRcells in a more integrated manner. Such systems are referred to as integrated access and backhaul links (IAB).

The present disclosure defines the following.

AC (x): an access link (access link) between the node (x) and the terminal (s).

BH (xy): a backhaul link between the node (x) and the node (y).

In this case, the node may mean a donor gNB (DgNB) or a relay node (RN). Here, the DgNB or the donor node may be a gNB that provides a function to support backhaul to IAB nodes.

In addition, in the present disclosure, for convenience of explanation, when relay node 1 and relay node 2 exist, when relay node 1 is connected to relay node 2 through a backhaul link and relays data transmitted/received to relay node 2, relay node 1 is called a parent node of relay node 2, relay node 2 is called a child node of relay node 1.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 21:
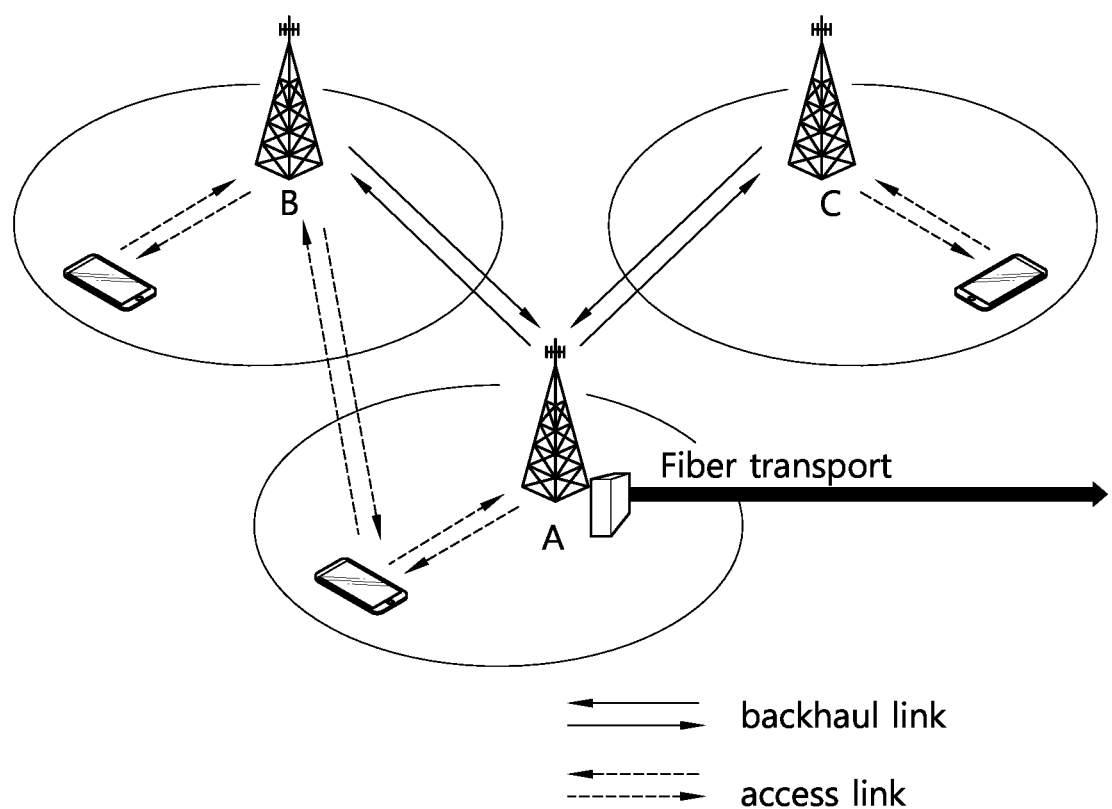
FIG. 21 schematically illustrates an example for a network with integrated access and backhaul links (IAB).

FIG. 21 schematically illustrates an example for a network with integrated access and backhaul links (IAB).

According to FIG. 21, relay nodes (rTRPs) may multiplex access and backhaul links in the time, frequency, or space domain (i.e., beam-based operation).

The operation of the different links may operate on the same frequency or on different frequencies (may also be referred to as 'in-band' or 'out-band' relays, respectively). Although efficient support of out-of-band relays is important for some NR deployment scenarios, it is very important to understand the requirements of in-band operation, which implies tight interworking with access links operating on the same frequency to accommodate duplex restrictions and avoid/mitigate interference.

Furthermore, in operating the NR system in the millimeter wave spectrum, due to the larger time scale required for completion of the procedure compared to short blocking, there are some unique challenges, including experiencing severe short-term blocking that cannot be easily mitigated with current RRC-based handover mechanisms. Overcoming short blocking in mmWave systems may require a fast RAN-based mechanism for switching between rTRPs that does not necessarily require the inclusion of a core network. The aforementioned need for mitigation of short blocking for NR operation in the millimeter wave spectrum, together with the need for easier deployment of self-backhauled NR cells, creates a need for the development of an integrated framework that allows for fast switching of access and backhaul links. Over-the-air (OTA) coordination between rTRPs may also be considered to mitigate interference and support end-to-end path selection and optimization.

The following requirements and aspects shall be addressed by the IAB for NR.

Efficient and flexible operation for in-band and out-of-band relaying in indoor and outdoor scenarios
 Multi-hop and redundant connections
 End-to-end path selection and optimization
 Support of backhaul links with high spectral efficiency
 Support of legacy NR terminals Legacy NR is designed to support half-duplex devices. As such, it may be worthwhile to be supported and targeted for half-duplex in IAB scenarios. Furthermore, IAB devices having a full duplex may also be considered.

Figure 22:
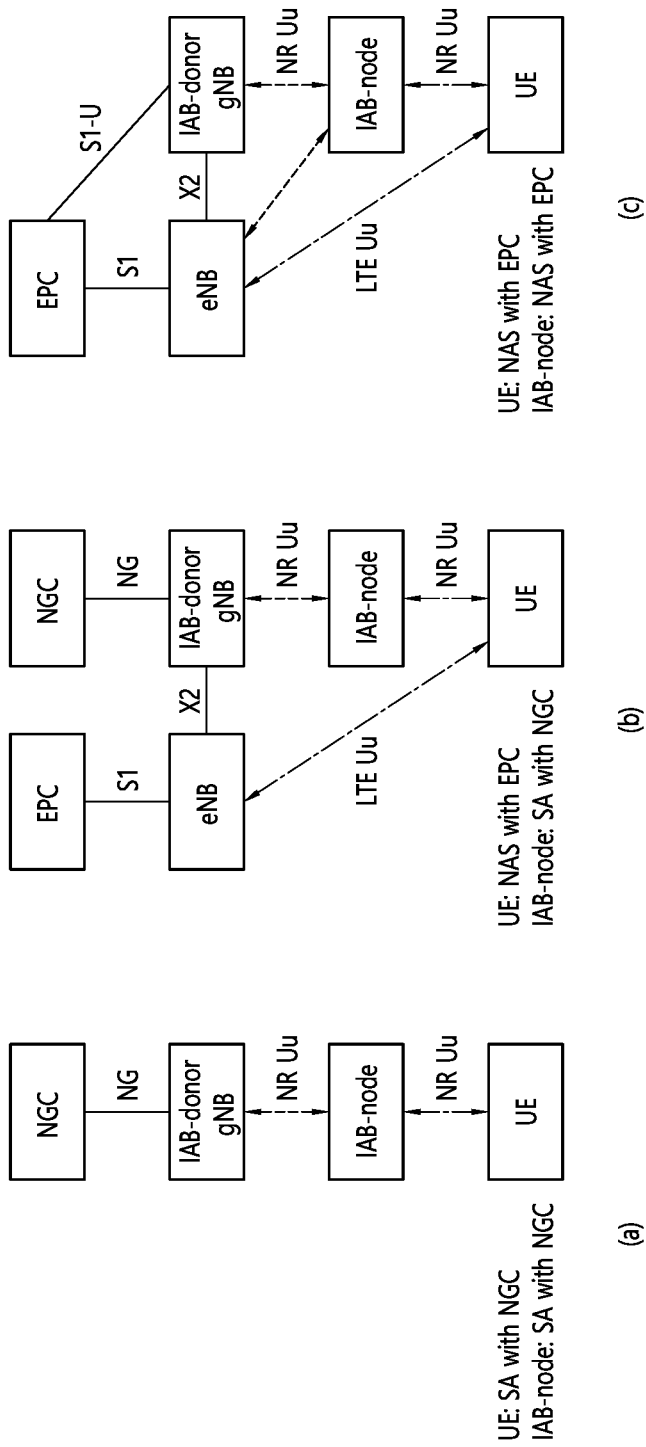
FIG. 22 shows an example of the operation of the IAB system in a standalone (SA) mode and a non-standalone (NSA) mode.

FIG. 22 shows an example of the operation of the IAB system in a standalone (SA) mode and a non-standalone (NSA) mode. Specifically, FIG. 22 (*a*) shows an example of the operation of the terminal and IAB node considering NGC in SA mode, FIG. 22 (*b*) shows an example of the operation of the IAB node considering NGC in SA mode and the terminal considering EPC in NSA mode, FIG. 22 (*c*) shows an example of the operation of the terminal and the IAB node considering EPC in the NSA mode.

The IAB node may operate in SA mode or NSA mode. When operating in NSA mode, the IAB node uses only the NR link for backhauling. A terminal connected to the IAB node may select an operation mode different from that of the IAB node. The terminal may further connect to a different type of core network than the connected IAB node. In this case, (e) DECOR ((enhanced) dedicated core network) or slicing may be used for CN selection. An IAB node operating in NSA mode may be connected to the same or different eNB(s). Terminals operating in the NSA mode may be connected to the same or different eNB from the IAB node to which they are connected. FIG. 22 shows an example in consideration of NGC in SA mode and an example in consideration of EPC in NSA mode.

In the IAB scenario, if each relay node (RN) does not have the scheduling capability, the donor gNB (DgNB) must schedule the entire links between the DgNB, related relay nodes and terminals. In other words, the DgNB should make a scheduling decision for all links by collecting traffic information from all related relay nodes, and then inform each relay node of the scheduling information.

On the other hand, distributed scheduling can be performed when each relay node has scheduling capability. Then, immediate scheduling of the uplink scheduling request of the terminal is possible, and the backhaul/access link can be used more flexibly by reflecting the surrounding traffic conditions.

Figure 23:
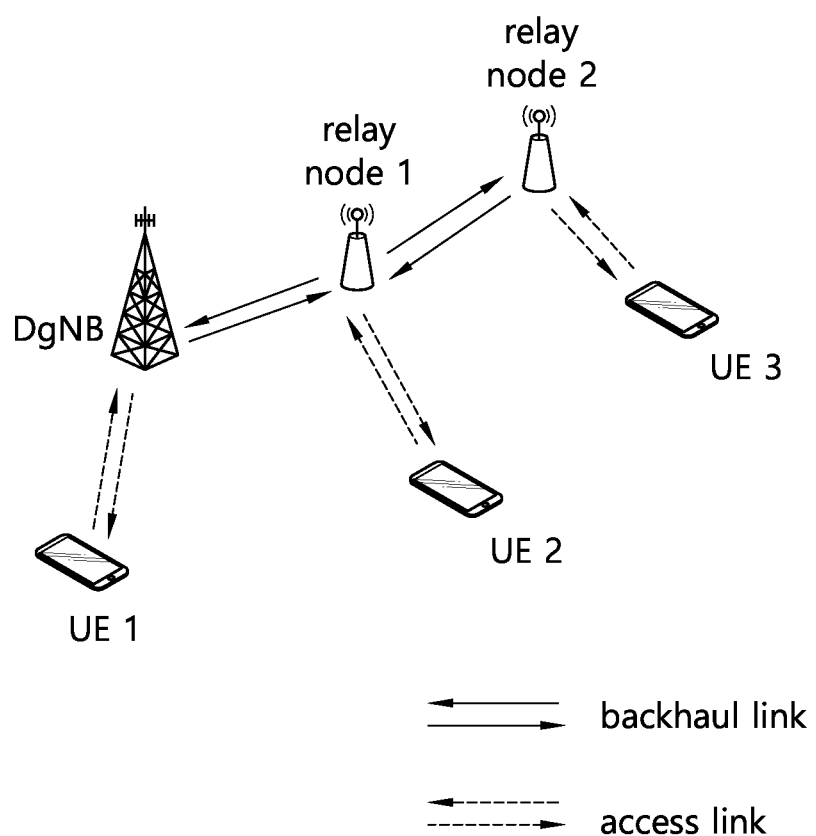
FIG. 23 schematically shows an example of the configuration of access and backhaul links.

FIG. 23 schematically shows an example of the configuration of access and backhaul links.

FIG. 23 shows an example in which a backhaul link and an access link are configured when DgNB and IAB relay nodes (RNs) exist. RN(b) and RN(e) are connecting the backhaul link, RN(c) connects a backhaul link to RN(b), RN(d) connects a backhaul link to RN(c).

Referring to FIG. 23, the DgNB not only receives the scheduling request of UE1, but also receives the scheduling request of UE2 and UE3. Then, the DgNB makes a scheduling decision of two backhaul links and three access links, and informs the scheduling results. Thus, such centralized scheduling involves scheduling delays and introduces latency issues.

On the other hand, distributed scheduling can be performed if each relay node has a scheduling capability. Then, immediate scheduling of the uplink scheduling request of the terminal can be performed, and the backhaul/access links can be used more flexibly by reflecting the surrounding traffic conditions.

Figure 24:
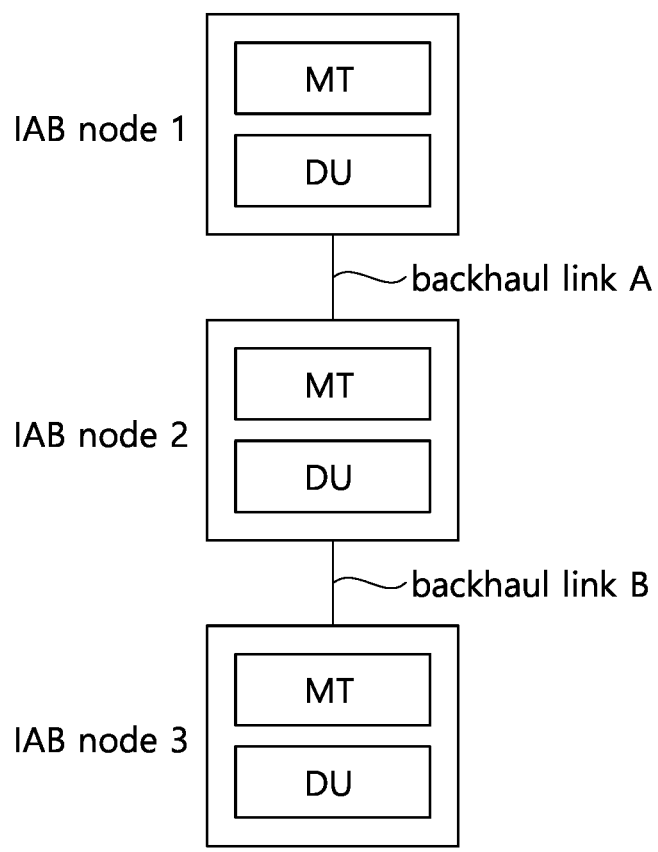
FIG. 24 is for explaining links and relationships between IAB nodes.

FIG. 24 is for explaining links and relationships between IAB nodes.

Referring to FIG. 24, IAB node 1 is connected to IAB node 2 and backhaul link A, for backhaul link A, IAB node 1 is the parent node of IAB node 2, IAB node 2 is a child node of IAB node 1. In addition, IAB node 2 is connected to IAB node 3 and backhaul link B, for backhaul link B, IAB node 2 is the parent node of IAB node 3, IAB Node 3 is a child node of IAB Node 2.

Here, each of the IAB nodes may perform two functions. One is mobile termination (MT), which maintains a wireless backhaul connection to an upper IAB node or a donor node, the other is a distributed unit (DU), which provides access connection with terminals or connection with MT of a lower IAB node.

For example, from the perspective of IAB Node 2, the DU of IAB Node 2 has a functional backhaul link B with the MT of IAB Node 3, at the same time, the MT of the IAB node 2 has a functional backhaul link A with the DU of the IAB node 1. Here, the child link of the DU of the IAB node 2 may mean a backhaul link B between the IAB node 2 and the IAB node 3. Also, here, the parent link of the MT of the IAB node 2 may refer to the backhaul link A between the IAB node 2 and the IAB node 1.

Hereinafter, the initial access (initial access) of the IAB node will be described.

In order to initially establish a connection with a parent node or a donor node, the IAB node may follow the same procedure as the terminal's initial access procedure including cell search, system information acquisition, and random access. SSB/CSI-RS based RRM measurement is the starting point of IAB node discovery and measurement.

The discovery procedure between IAB nodes applying half-duplex restriction and multi-hop topology should be considered, including how to avoid SSB configuration conflicts between IAB nodes and the feasibility of CSI-RS-based IAB node discovery. Considering the cell ID used by a given IAB node, the following two cases may be considered.

Case 1: Donor node and IAB node share the same cell ID
Case 2: Donor node and IAB node maintain separate cell IDs Furthermore, a mechanism for multiplexing of RACH transmission from terminals and RACH transmission from IAB nodes should be further considered.

In the case of SA (standalone) deployment, in order to initially establish a connection with a parent IAB node or an IAB donor, the initial IAB node discovery (stage 1) by the MT follows the same initial access procedure as the terminal, including cell search, system information acquisition, and random access based on the same SSB available to the access terminals.

In the case of non-standalone (NSA) deployment (from the point of view of access/access terminal), the IAB node MT follows the aforementioned Stage 1 initial access in SA deployment (from the point of view of access terminal) when performing initial access on the NR carrier. The SSB/RMSI period assumed by the MTs for the initial connection may be longer than the 20 ms assumed for the rel-15 terminals of the NR, and one of the candidate values 20 ms, 40 ms, 80 ms, and 160 ms is selected.

Here, this means that candidate parent IAB nodes/donors must support both NSA functionality for UE and SA functionality for MT on the NR carrier.

When the IAB node MT performs the initial connection on the LTE carrier, stage 2 solutions can be used with parent selection of the IAB node by the MT on the NR carrier.

Hereinafter, backhaul link measurement will be described.

Measurements for multiple backhaul links for link management and path selection should be considered. To support half-duplex limiting in terms of a given IAB node, IAB supports detection and measurement of candidate backhaul links (after initial connection) using resources orthogonal to the resources used by access terminals for cell detection and measurement. In this regard, the following may be further considered.

TDM of a plurality of SSBs (for example, it may follow hop order, cell ID, etc.)
SSB muting across IAB nodes
Multiplexing of SSB for access terminals and IAB nodes within or across half-frames
Additional IAB node discovery signal to be TDMed with SSB transmission (eg, CSI-RS)
Use of off-raster SSB Different transmission period for backhaul link detection and measurement compared to the period used by access terminals Coordination mechanisms for different solutions should be further considered, including coordination mechanisms for measurement time and reference signal (RS) transmission for IAB nodes.

Improvement of SMTC and CSI-RS configuration to support RRM measurement for IAB nodes may be considered.

For the purpose of backhaul link RSRP/RSRQ RRM measurement, IAB supports SSB-based and CSI-RS-based solutions.

After the IAB node DU is activated, for the purpose of inter IAB node and donor detection (stage 2), the IAB inter-node discovery procedure needs to consider the half-duplex limit for the IAB node and multi-hop topology. The following solution is supported: SSB based solution—use of SSBs orthogonal (TDM and/or FDM) to SSBs used for access terminals.

Hereinafter, backhaul link management will be described.

The IAB node supports a mechanism for detecting/recovering backhaul link failures. Enhancements to beam failure recovery (BFR) and radio link failure (RLF) procedures are advantageous and should be supported for NR IAB as follows.

Improvement of support for interaction (interaction) between beam failure recovery success indication and RLF.
Improvement of current beam management procedures for faster beam switching/coordination/recovery to avoid backhaul link outage should be considered for IAB nodes.

Further, for example, the request for an additional backhaul link condition notification mechanism from the parent IAB node to the child IAB node, such as when the backhaul link of the parent IAB node fails, and the need for the operation of the corresponding IAB node are discussed. Solutions to avoid RLF in child IAB node due to parent backhaul link failure should be supported.

Hereinafter, a mechanism for changing a path or transmitting/receiving in a plurality of backhaul links will be described.

A mechanism (e.g., multi-TRP operation and intra-frequency dual connectivity) for efficient re-route or transmit/receive simultaneously in multiple backhaul links should be considered.

Hereinafter, the scheduling of the backhaul and access link will be described.

Downlink IAB node transmission (i.e., transmission from the IAB node on the backhaul link to the child IAB node served by the IAB node and transmission to the terminals served by the IAB node on the access link) must be scheduled by the IAB node itself. Uplink IAB transmission (transmission from the IAB node to its parent node or donor node on the backhaul link) must be scheduled by the parent node or donor node.

The following describes multiplexing of access and backhaul links.

IAB supports TDM, FDM and SDM between access and backhaul links at the IAB node according to half-duplex restrictions. A mechanism for efficient TDM/FDM (frequency division multiplexing)/SDM (spatial division multiplexing) multiplexing of access/backhaul traffic across multiple hops taking into account IAB node half-duplex restrictions should be considered. The following solutions for different multiplexing options can be further considered.

A mechanism for orthogonal partitioning of time slots or frequency resources between access and backhaul links across one or more hops Utilization of different DL/UL slot settings for access and backhaul links DL and UL power control enhancement and timing requirements to allow intra-panel FDM and SDM of backhaul and access link Interference management including cross-link interference Hereinafter, resource coordination will be described.

Mechanisms for scheduling coordination, resource allocation and path selection across the IAB node/donor node and multiple backhaul hops should be considered. The coordination of resources (frequency, time in terms of slot/slot format, etc.) between semi-static IAB nodes (on the time scale of RRC signaling) should be supported. The following aspects may be further considered.

Distributed or centralized coordination mechanism

Resource granularity of the required signal (eg, TDD configuration pattern)

Exchange of L1 (layer-1) and/or L3 (layer-3) measurements between IAB nodes

Exchange of topology-related information (e.g. hop order) affecting backhaul link physical layer design Coordination of resources (frequency, time in terms of slot/slot format, etc.) faster than semi-static coordination Hereinafter, IAB node synchronization and timing alignment will be described.

Feasibility of over-the-air (OTA) synchronization and the impact of timing misalignment on IAB performance (e.g., the number of supportable hops) should be considered. Assuming a timing requirement of 3 us or less in IAB nodes within overlapping coverage, TA-based OTA synchronization can support multi-hop IAB networks (up to 5 hops) for FR 2. TA based OTA synchronization may not be sufficient to support multiple hops in FRE The next level of alignment between IAB nodes/IAB donors or within IAB nodes is discussed.

Slot-level sorting

Symbol-level alignment do not sort

A mechanism for timing alignment in a multi-hop IAB network is discussed. IAB supports TA-based synchronization between IAB nodes including multiple backhaul hops. Improvements to existing timing alignment mechanisms are discussed, including TAs required for IAB nodes to support different transmission timing alignment cases.

The following transmission timing alignment case across IAB nodes and IAB donors is discussed.

Case 1: Alignment of DL transmission timings across IAB nodes and IAB donors: If downlink transmission and uplink reception are not well aligned in the parent node, the child node needs additional information on the alignment to properly set its downlink transmission timing for OTA-based timing and synchronization.

Case 2: Downlink and uplink transmission timings are aligned for one IAB node.

Case 3: Downlink and uplink reception timings are aligned for one IAB node.

Case 4: For one IAB node, in case of transmission using case 2 when receiving using case 3.

Case 5: Case 4 for backhaul link timing and Case 1 for access link timing for one IAB node in different time slots.

Case 6: The sum of the downlink transmission timing of Case 1 and the uplink transmission timing of Case 2: The downlink transmission timing of all IAB nodes is aligned with the downlink timing of the parent IAB node or the donor; The uplink transmission timing of the IAB node may be aligned with the downlink transmission timing of the IAB node.

Case 7: The sum of the downlink transmission timing of Case 1 and the uplink reception timing of Case 3: The downlink transmission timing of all IAB nodes is aligned with the downlink timing of the parent IAB node or the donor; The uplink reception timing of the IAB node may be aligned with the downlink reception timing of the IAB node; If downlink transmission and uplink reception are not well aligned in the parent node, the child node needs additional information on the alignment to properly set its downlink transmission timing for OTA-based timing and synchronization.

Impact of different cases on TDM/FDM/SDM multiplexing of parent and child links, potential impact of incomplete timing adjustment, overhead of required downlink/uplink switching gap, cross-link interference, feasibility when an IAB node is connected with one or multiple parent nodes, and effect of access terminals (particularly compatibility with rel-15 terminals) are discussed.

Case 1 is supported for both access and backhaul link transmission timing alignment.

Cases 2-5 are not supported for IAB.

The use of case 6 for IAB nodes, if supported, should be under the control of the parent or network. To enable alignment of downlink transmission between IAB nodes, examples of the following solutions have been identified.

Alternative 1: IAB nodes may have to perform parallel (always time multiplexed) Case 1 and Case 6 uplink transmissions.

Alternative 2: Signaling between the parent and the iab node about the time difference of the downlink transmission and uplink reception timing at the parent node to correct potential misalignment of the downlink transmission timing at the child node: The child IAB node compares the corresponding difference in its downlink transmission timing and backhaul reception timing; If the signaled difference of the parent node is greater than that measured at the child node, if the transmission timing is smaller, the child node advances its transmission timing.

Here, Alternative 1 and Alternative 2 may have to maintain separate reception timing in the parent node for case 6 uplink transmission from other child nodes.

By introducing TDM between the child IAB node/rel-16 terminals supporting the effective negative TA and the new TA value and the child IAB node/terminal that does not support the new TA value, Case 7 is compatible for rel-15 terminals. To enable alignment between downlink and uplink reception within an IAB node, examples of the following solutions have been identified.

Alternative 1: Introduce negative initial time alignment (TA) to be applied to the child node of the IAB node to which the case 7 timing is applied.

Alternative 2: In the IAB node, apply a positive TA that enables symbol alignment rather than slot alignment between downlink reception and uplink reception.

Alternative 3: Signaling of the relative offset of the most recent TA value, to be applied to the child node of the IAB node to which the case 7 timing is applied to achieve an efficient negative TA.

In addition to OTA synchronization, other techniques such as GNSS and PTP may be used to obtain synchronization between IAB nodes.

In the following, cross-link interference measurement and management will be described.

The impact of cross-link interference (CLI) on access and backhaul links (including spanning multiple hops) must be considered. Furthermore, interference measurement and management solutions should be considered.

Hereinafter, a CLI mitigation technique will be described.

CLI mitigation techniques including advanced receiver and transmitter coordination should be considered and prioritized in terms of complexity and performance CLI mitigation technology shall be able to manage the following IAB-to-node interference scenarios.

Case 1: The victim IAB node receives in downlink through its MT, and the interfering IAB node transmits in uplink through its MT.

Case 2: The victim IAB node receives downlink through its MT, and the interfering IAB node transmits downlink through its DU.

Case 3: The victim IAB node receives uplink through its DU, and the interfering IAB node transmits uplink through its MT.

Case 4: The victim IAB node receives in uplink through its DU, and the interfering IAB node transmits in downlink through its DU.

In the case of FDM/SDM reception between access and backhaul links at a given IAB node, the interference experienced at the IAB node should be further considered.

Hereinafter, spectral efficiency enhancement will be described.

Support of 1024 quadrature amplitude modulation (QAM) for the backhaul link should be considered.

Hereinafter, the proposal of the present disclosure will be described in more detail.

The following drawings were created to explain a specific example of the present specification. Since the names of specific devices described in the drawings or the names of specific signals/messages/fields are presented by way of example, the technical features of the present specification are not limited to the specific names used in the following drawings. In addition, the methods/configurations proposed in this specification may be combined in various ways.

Figure 25:
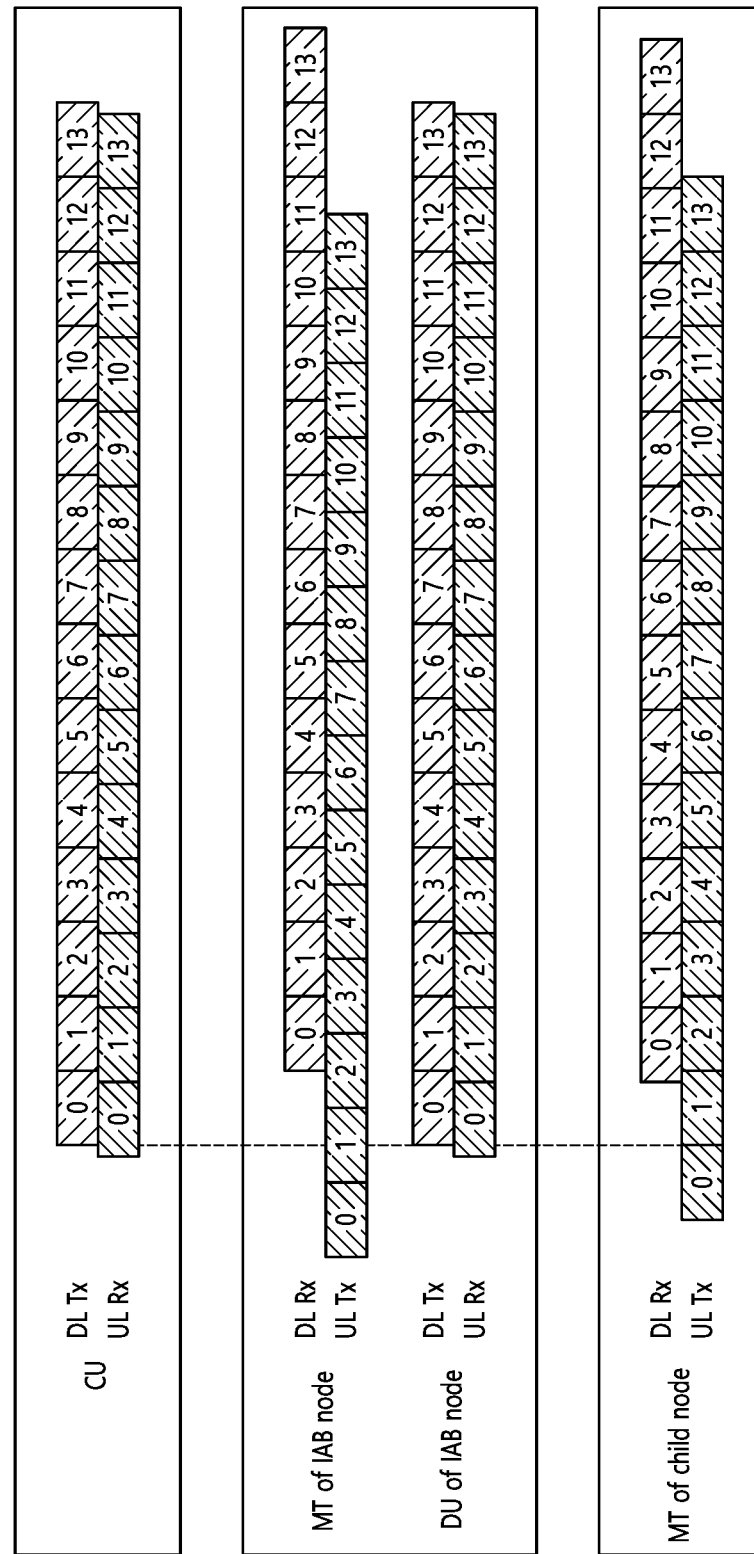
FIG. 25 shows timing alignment case 1.
Figure 26:
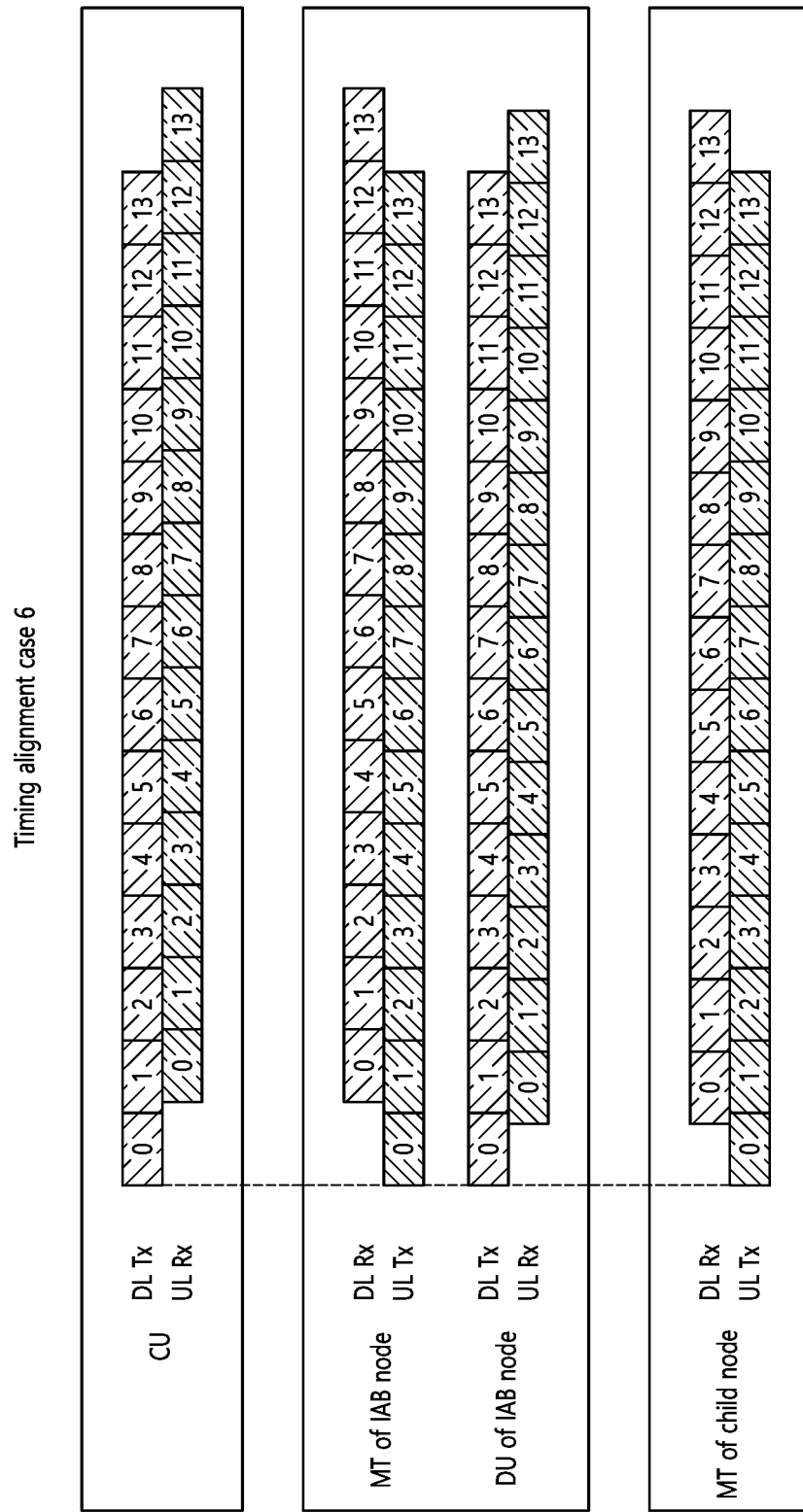
FIG. 26 shows timing alignment case 6.
Figure 27:
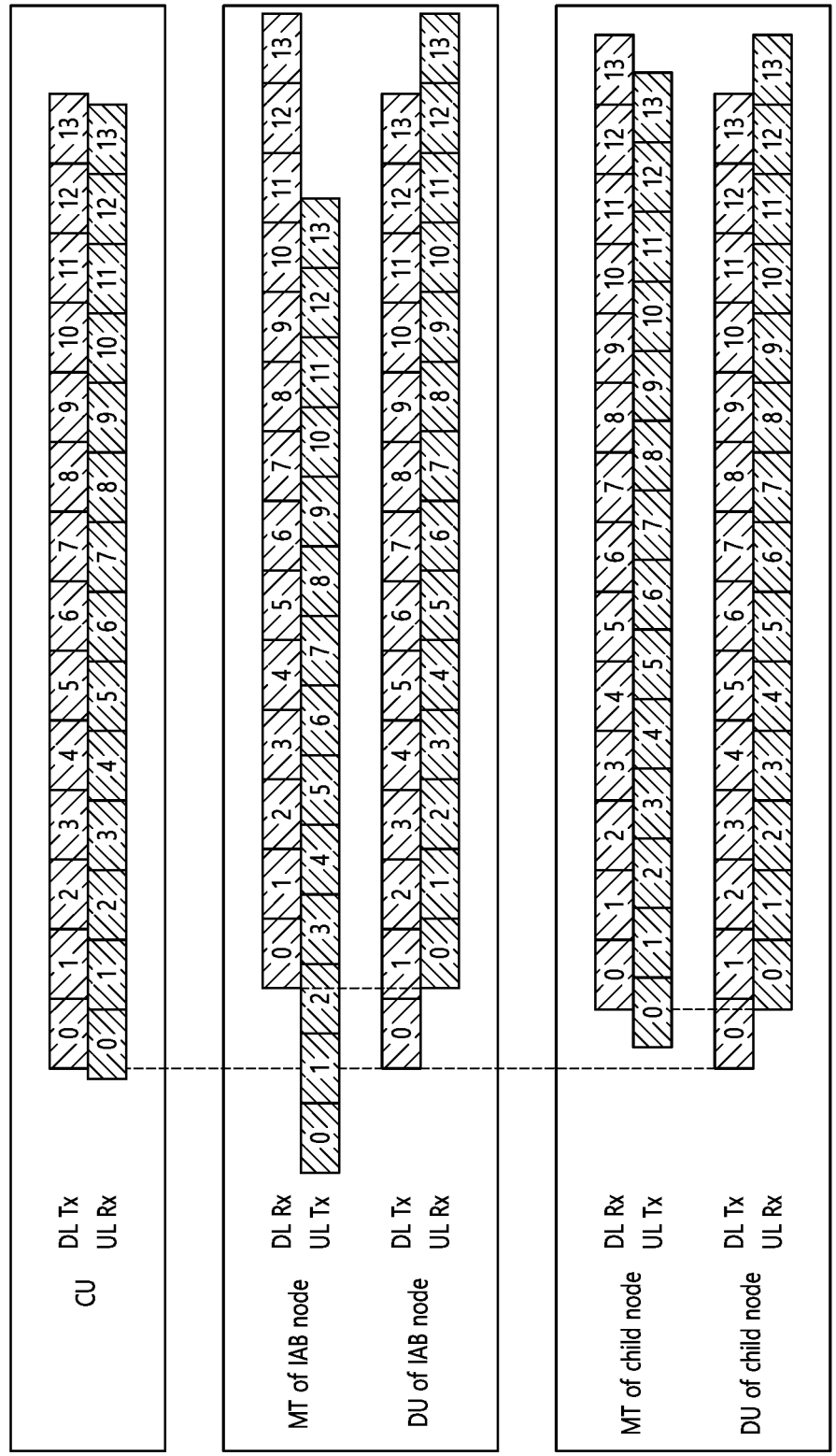
FIG. 27 shows timing alignment case 7.

With reference to FIGS. 25 to 27, the following three examples of alignment of transmission/reception timing of an IAB node that can be considered in an IAB environment will be described. FIG. 25 shows timing alignment case 1. FIG. 26 shows timing alignment case 6. FIG. 27 shows timing alignment case 7.

Timing alignment case 1: DL transmission timing alignment across IAB nodes and IAB donors. This is a method in which downlink transmission timings of DUs between IAB nodes are aligned.

Referring to Timing Alignment Case 1, if downlink transmission and uplink reception are not well aligned in the parent node, the child node needs additional information on the alignment to properly set its downlink transmission timing for OTA-based timing and synchronization. MT transmission timing may be expressed as (MT reception timing-TA (timing advance)), the DU transmission timing may be expressed as (MT reception timing-TA/2-TΔ). Here, the TΔ value can be obtained from the parent node.

Timing alignment case 6: The DL transmission timing for all IAB nodes is aligned with the DL timing of the parent IAB node or donor. The UL transmission timing of the IAB node may be aligned with the DL transmission timing of the IAB node.

Referring to the timing alignment case 6, the uplink transmission timing for the MT of the IAB node and the downlink transmission timing for the DU of the IAB node are aligned. Since the uplink transmission timing of the MT of the IAB node is fixed, the uplink reception timing of the DU of the parent node receiving this is delayed by a propagation delay between the DU of the parent node and the MT of the IAB node compared to the uplink transmission timing of the MT of the IAB node. When the IAB node uses the timing alignment case 6, since the uplink reception timing of the parent node is different from that of the existing one, if the IAB node wants to use the timing alignment case 6, the parent node also needs to know that information.

Timing alignment case 7: The downlink transmission timings of all IAB nodes are aligned with the downlink timings of the parent IAB node or the donor. The uplink reception timing of the IAB node may be aligned with the downlink reception timing of the IAB node.

Referring to Timing Alignment Case 7, if downlink transmission and uplink reception are not well aligned in the parent node, additional information about the alignment is needed to properly configure the child node's own downlink transmission timing for OTA-based timing and synchronization. This is a scheme in which the MT downlink reception timing of the IAB node and the DU uplink reception timing of the IAB node are aligned. The transmission/reception timing from the MT perspective is the same as that of the existing IAB node or Rel-16 IAB node, the uplink reception timing of the DU of the IAB node may be aligned with the downlink reception timing of the MT of the IAB node. The IAB node may adjust the TA of the MTs of the child node so that the MTs of the child node transmit an uplink signal according to its uplink reception timing. Therefore, this timing alignment method may not reveal a difference in the operation of the IAB node's specification when compared to the timing alignment case 1. Accordingly, timing alignment case 7 described herein may be replaced/interpreted as timing alignment case 1.

Meanwhile, in the present specification, timing alignment may mean slot-unit alignment or symbol-unit alignment.

In addition, a plurality of timing alignment cases may be set/applied for one IAB node. Here, a plurality of timing alignment instances set/applied may be changed/switched by the time resource of the IAB node. That is, in the first time resource, the first timing alignment case is set/applied for the IAB node, in the second time resource, a second timing alignment case may be set/applied for the IAB node. Here, the first time resource and the second time resource may be divided by location in a time domain, it may be divided into a type of multiplexing configured for the IAB node (multiplexing type). On the other hand, the change/switching according to the time resource of the above-described timing alignment cases may be performed based on a dynamic indication, it may also be performed based on semi-static instructions.

The content proposed in this specification describes the content assuming an in-band environment, it can also be applied in an out-band environment. In addition, the content proposed in this specification is described in consideration of an environment in which a donor gNB (donor gNB: DgNB), a relay node (RN), and a UE perform a half-duplex operation, the DgNB, the RN, and/or the UE may be applied in an environment in which a full-duplex operation is performed.

The IAB node operates with a specific transmit/receive timing at a specific time, but may use a different transmit/receive timing according to time/situation. In the present specification, an operation in which the IAB node applies different transmission/reception timing according to time/situation is proposed.

First, a DU operation of an IAB node having a plurality of reception timings will be described below.

For a DU (a DU of a donor node or an IAB node), MTs/terminals of a plurality of child nodes may be connected. In this case, links to MTs/terminals of different child nodes may be divided into different child links. In the case of the existing DU, the uplink reception timing is fixed to a specific timing, uplink reception timings for all child links may be set to be aligned. To this end, the DU may set a timing advance (TA) to the MT/terminal of its child node so that uplink reception timings for a plurality of child links can be aligned.

On the other hand, in the case of an enhanced IAB node, all child links may not have the same uplink reception timing. An example of a specific situation in which the uplink reception timing may be different for each child link is as follows.

(Example 1) When the child node applies the timing alignment case 6 (transmission timing alignment), the uplink transmission timing of the MT of the child node may be aligned with the downlink transmission timing of the DU of the child node. In this case, the uplink reception timing of the DU of the IAB node may be determined according to a propagation delay between the DU of the IAB node and the child node. Accordingly, the uplink reception timing of the DU of the IAB node may be different between uplink signals transmitted by MTs of child nodes having different propagation delays.

(Example 2) When timing alignment cases applied between child nodes are different, the uplink reception timing of the DU of the IAB node may be different according to the MT of the child node. For example, if child node 1 uses timing alignment case 1 and child node 2 uses timing alignment case 6, child node 1 determines the uplink transmission timing based on the configured TA, child node 2 may determine the uplink transmission timing according to its own downlink transmission timing. Therefore, the uplink reception timing of the DU of the IAB node may be different between the uplink signal transmitted by the MT of the child node 1 and the MT of the child node 2.

(Example 3) The uplink reception timing of the DU of the IAB node may be different according to the capability of the child node. For example, when the DU of the IAB node wants to align its uplink reception timing so that the timing alignment case 7 can be applied, the MT of the child node 1, which is the improved IAB node, may determine the uplink transmission timing by adjusting the TA value according to the corresponding uplink reception timing. In this case, the TA value becomes negative, so that the uplink transmission timing of the MT of the child node 1 may be later than the downlink reception timing. Another child link of the DU of the IAB node may be connected to an access UE or an MT of child node 2, which is a legacy IAB node. At this time, since the access terminal or the child node 2 MT does not have the ability to set a negative TA value, the uplink transmission timing may always have to exist before the downlink reception timing. In this case, the uplink reception timing of the DU of the IAB node may be different between the uplink signal transmitted by the MT of the child node 1 and the uplink signal transmitted by the MT of the access terminal or child node 2.

As described above, in this specification, when the uplink reception timing may be different for each child link of the DU of the IAB node, the operation of the IAB node is proposed. In this specification, the MT of the child node may refer to an access terminal.

Figure 28:
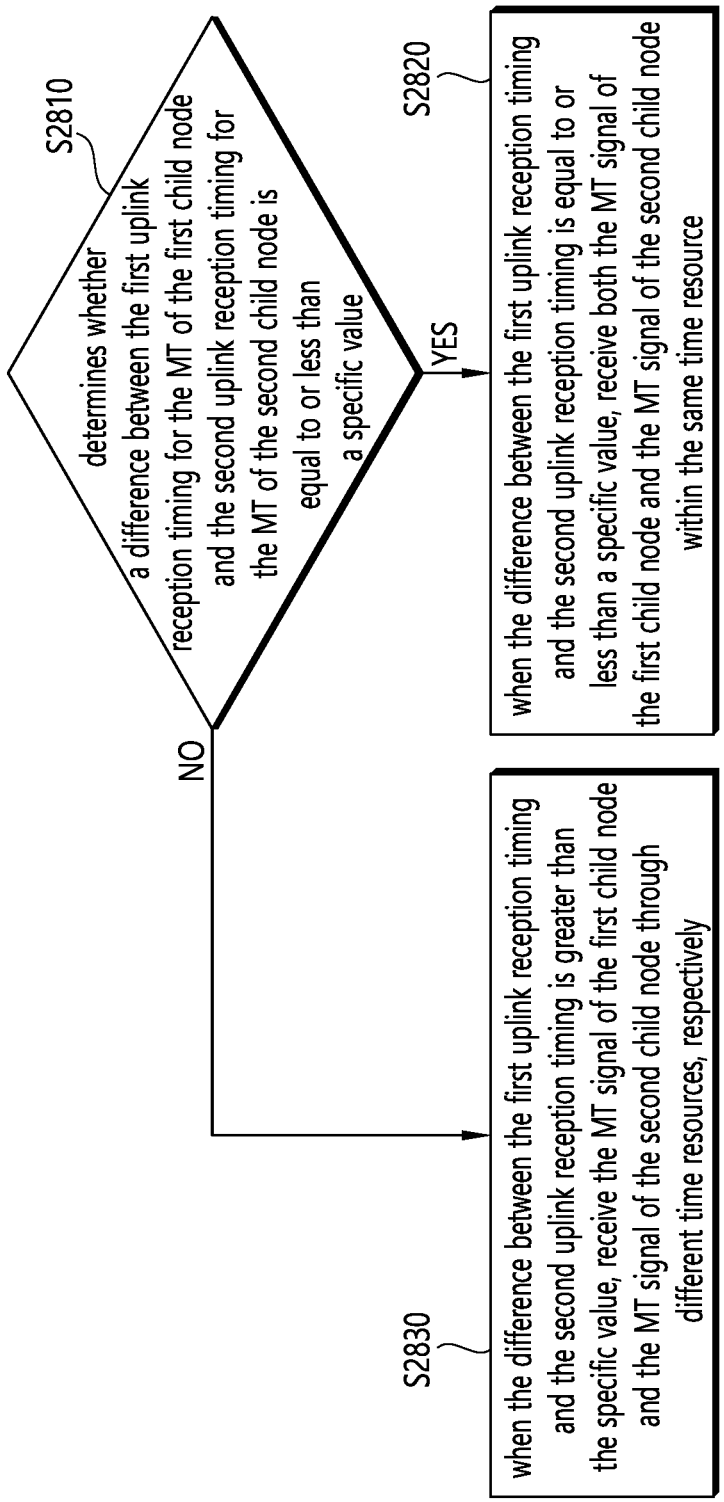
FIG. 28 illustrates an example of the operation of the IAB node when the uplink reception timing may be different for each child link of the DU of the IAB node.

FIG. 28 illustrates an example of the operation of the IAB node when the uplink reception timing may be different for each child link of the DU of the IAB node. The example of FIG. 28 assumes that the MTs of a plurality of child nodes are connected to the IAB node, for example, the MT of the first child node and the MT of the second child node.

Referring to FIG. 28, the IAB node determines whether a difference between the first uplink reception timing for the MT of the first child node and the second uplink reception timing for the MT of the second child node is equal to or less than a specific value (S2810).

As a result of the determination, when the difference between the first uplink reception timing and the second uplink reception timing is equal to or less than a specific value, the IAB node receives both the MT signal of the first child node and the MT signal of the second child node within the same time resource (S2820). Here, the IAB node may manage the MT of the first child node and the MT of the second child node as an MT group of the same child node.

On the other hand, as a result of the determination, when the difference between the first uplink reception timing and the second uplink reception timing is greater than the specific value, the IAB node receives the MT signal of the first child node and the MT signal of the second child node through different time resources, respectively (S2830). For example, when there is a time domain multiplexing (TDM) resource and a second time resource, the IAB node receives the signal of the MT of the first child node in the first time resource, it may receive the signal of the MT of the second child node in the second time resource. Here, the IAB node may manage the MT of the first child node and the MT of the second child node as MT groups of different child nodes. For example, the MT of the first child node is managed as belonging to the first group, the MT of the second child node may be managed as belonging to the second group. Also, here, the IAB node may set an independent TA (timing advance) value for each group (i.e., the MT group of the child node).

Also, here, the specific value may be set by the network (e.g., the donor node of the IAB node is set through an RRC message or DCI) or a predetermined value.

Hereinafter, the proposal of the present specification will be described in more detail.

The DU of the IAB node may receive uplink signals transmitted by child links having the same/similar uplink reception timing through the same time resource. In this case, when the uplink reception timings between uplink signals transmitted by different child links are greatly different from each other, the IAB node may not successfully receive all of the uplink signals.

Figure 29:
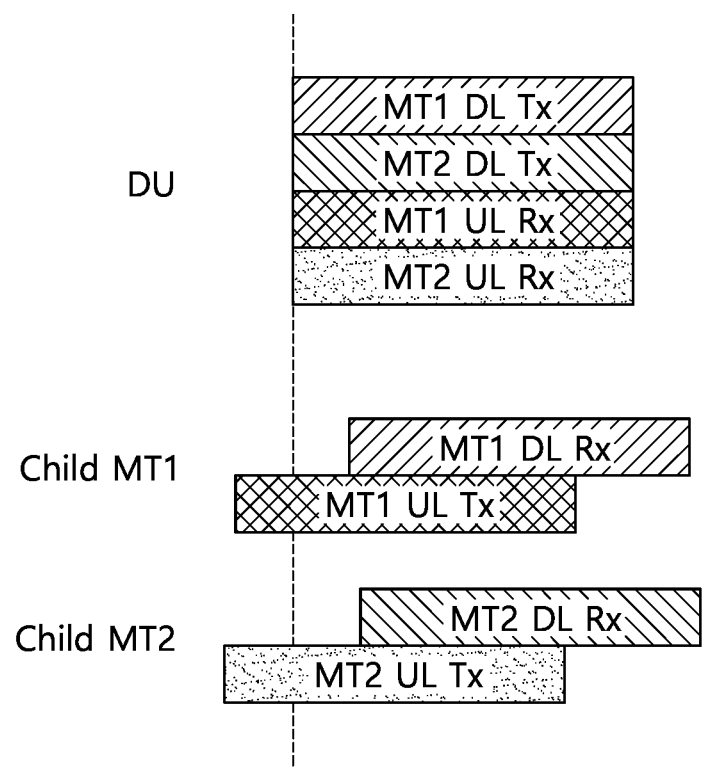
FIG. 29 shows an example of a timing difference between an IAB node and a plurality of child links.
Figure 30:
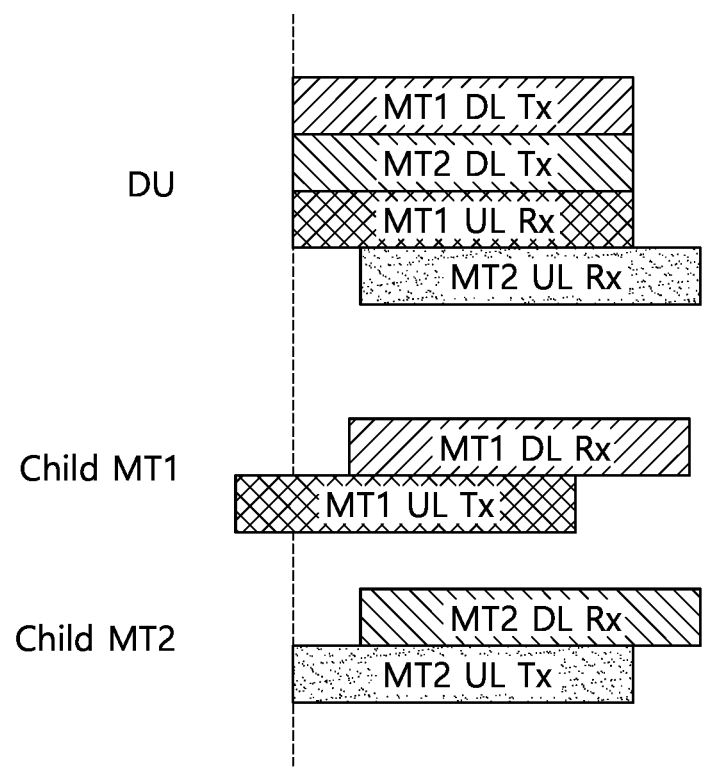
FIG. 30 illustrates another example of a timing difference between an IAB node and a plurality of child links.

FIG. 29 shows an example of a timing difference between an IAB node and a plurality of child links. FIG. 30 illustrates another example of a timing difference between an IAB node and a plurality of child links.

FIGS. 29 and 30 assume that the DU of the IAB node is connected to the MT of the first child node and the MT of the second child node through a child link. In FIGS. 29 and 30, the MT of the first child node is denoted as child MT1, the MT of the second child node is denoted as child MT2, and the DU of the IAB node is denoted as DU.

Referring to FIG. 29, if the uplink reception timings of the MT of the first child node and the MT of the second child node coincide with each other or the difference between the uplink reception timings is equal to or less than a specific value, the IAB node DU may receive both uplink signals. On the other hand, referring to FIG. 30, if the difference between the uplink reception timings of the MT of the first child node and the MT of the second child node is greater than a specific value, the IAB node DU may not receive both uplink signals.

Accordingly, the IAB node DU simultaneously receives the uplink signals of the child links in which the uplink reception timing coincides with each other or the difference in the uplink reception timing is equal to or less than a specific value, it may be desirable to receive uplink signals of child links in which the difference in uplink reception timing is greater than a specific value through different time resources.

Hereinafter, an MT operation of an IAB node having a plurality of transmission timings will be described. Here, the MT operation of the IAB node having a plurality of transmission timings includes an MT operation in which a plurality of transmission timings are applied to one serving cell.

The IAB node may use a DU/MT transmit/receive timing alignment scheme different from that of the legacy IAB node. As an example, while the legacy IAB node performed timing alignment using timing alignment case 1, the enhanced IAB node may perform timing alignment using timing alignment cases 6 or 7.

In order for the IAB node to apply the timing alignment case 6 or 7, it is set to apply the corresponding timing alignment case from the DU/CU (centralized unit) of the parent node, if necessary, additional information for applying the corresponding timing alignment case may need to be set. In this case, when the IAB node determines that the parent node's initial access to the DU or RRC setting is invalid, this may have to operate assuming a default timing alignment case. Here, as an example, this default timing alignment case may be timing alignment case 1. In this case, the uplink transmission timing at which the MT of the IAB node performs uplink transmission to the DU of the parent node may be applied differently depending on circumstances.

As described above in the DU operation of the IAB node having a plurality of reception timings, all child links may not have the same uplink reception timing from the viewpoint of the DU of the parent node. The DU of the IAB node may receive uplink signals transmitted by child links having the same/similar uplink reception timing through the same time resource. On the other hand, when there is a large difference in uplink reception timing between uplink signals transmitted by different child links, it may not be possible to successfully receive all of the uplink signals.

Accordingly, the DU of the IAB node simultaneously receives the uplink signals of the child links whose uplink reception timings coincide with each other or the difference is less than or equal to a specific value, it is preferable that the DU of the IAB node receives the uplink signals of the child links in which the difference in uplink reception timing is greater than a specific value through different time resources. In this case, the DU of the IAB node groups the MTs of the child node to receive the uplink channel/signal of the child links whose uplink reception timing is the same or the difference is less than or equal to a specific value through the same time resource, different, that is, MTs of child nodes having uplink reception timings with a difference greater than a specific value may transmit uplink channels/signals through different time resources. That is, there are a plurality of uplink reception timings from the viewpoint of the DU of a specific parent node, in a specific time resource, a specific uplink reception timing may be applied. For example, the DU of the IAB node performs an uplink reception operation by applying uplink reception timing 1 in time resource group 1, in time resource group 2, an uplink reception operation may be performed by applying uplink reception timing 2. In this case, by applying a specific uplink transmission timing, when the MT of the child node transmits an uplink signal to the DU of the IAB node, it may be necessary to perform uplink transmission only within a specific time resource group. When the MT of the child node wants to perform uplink transmission also through another time resource group, uplink transmission may need to be performed according to the uplink reception timing applied by the DU of the IAB node in the corresponding time resource group. In this case, the MT of the child node may perform uplink transmission by applying different uplink transmission timings according to time resources.

As described above, uplink transmission may be performed by applying different uplink transmission timings depending on the situation/time from the MT viewpoint of a specific IAB node. That is, when the MT of the IAB node sets its uplink transmission timing as (downlink reception timing−(TA+TAoffset)) or (downlink reception timing−TA), the MT of the IAB node may have a plurality of TA values and may perform uplink transmission by applying different TA values according to situations/times.

In the present specification, as described above, the MT of the IAB node has a plurality of (e.g., two) TA values, and depending on the situation/time point, a specific method for performing uplink transmission by applying different TA values is proposed.

Meanwhile, in the present specification, the TA may be extended and interpreted as a parameter that determines the transmission or reception timing of the IAB node.

First, the types of parameters that determine the TA or transmission/reception timing applied by the MT of the IAB node will be described.

A parameter for determining the TA or transmission/reception timing applied to determine/decide its own uplink transmission timing from the point of view of the MT of a specific IAB node may be a default TA (or default parameter) and a dedicated TA or dedicated parameter.

The default TA may mean a corresponding TA value when the IAB node sets uplink transmission timing like a legacy IAB node or a terminal. Alternatively, from the viewpoint of the DU of the parent node, it may mean a TA value set according to the reception timing of an uplink signal received from the MT of the access terminal/legacy IAB node. At this time, if MTs of different child nodes perform uplink transmission using their default TA, from the viewpoint of the DU of the IAB node, the uplink transmissions transmitted by the MTs of the child node may be received at the same timing.

The dedicated TA may mean a corresponding TA value when the IAB node sets uplink transmission timing in a different way from that of the legacy IAB node or the UE. Or, from the DU's point of view of the parent node, it may mean a TA value set according to an uplink reception timing different from the reception timing of an uplink signal received from the MT of the access terminal/legacy IAB node. At this time, when MTs of different child nodes perform uplink transmission using their own dedicated TAs, from the viewpoint of the DU of the IAB node, the uplink transmissions transmitted by the MTs of the child node may be received at the same or different timings.

The default TA and the dedicated TA may be independently configured through, for example, a MAC medium access control control element (MAC CE). At this time, from the MT viewpoint of the IAB node, the existing TA configuration is performed based on the default TA, and a dedicated TA may be additionally configured.

Characteristically, a plurality of dedicated TAs may be configured for the MT of one IAB node. In this case, one dedicated TA may be applied at a specific uplink transmission time.

Next, a method of applying TA to the uplink transmission of the MT of the IAB node will be described.

The MT of the IAB node proposes to perform uplink transmission by applying a default TA and a dedicated TA as follows. In order to determine the TA value used by the MT of the IAB node, one or more of the following may be applied. In the following description, the default TA and the dedicated TA may be interpreted as being replaced with TA values TA1 and TA2 that may have different values. Alternatively, in the following description, the default TA is a default parameter used when an IAB node sets uplink transmission timing like a legacy IAB node or a terminal, the dedicated TA may be interpreted as a dedicated parameter used by the IAB node when setting uplink transmission timing in a different way from that of the legacy IAB node or the terminal, respectively.

(Method 1-1) The MT of the IAB node initially accesses the DU/cell and performs uplink transmission using the default TA until a dedicated TA value is set. Thereafter, when the dedicated TA value is set, uplink transmission may be performed using the dedicated TA value.

When the MT of the IAB node is in RRC_INACTIVE and/or RRC_IDLE state, in this case, it is determined that the dedicated TA value is not valid, and uplink transmission can be performed by applying the default TA value. When transitioning from RRC_INACTIVE and/or RRC_IDLE state to RRC_CONNECTED state, a) Uplink transmission is performed using the latest dedicated TA value, or b) If a new dedicated TA value is set while applying the default TA value, uplink transmission may be performed using the corresponding dedicated TA value. Alternatively, when switching from RRC_INACTIVE state to RRC_CONNECTED state, uplink transmission is performed using the latest dedicated TA value, when the RRC_IDLE state is switched to the RRC_CONNECTED state, the default TA value is applied, and when a new dedicated TA value is set, uplink transmission can be performed using the corresponding dedicated TA value.

(Method 1-2) The TA value applied by the MT of the IAB node may be different depending on the type of channel/signal for performing uplink transmission.

In order for the DU of the parent node to manage the default TA value of the MT of the IAB node, transmission of a specific uplink signal may be performed using the default TA. The MT of the IAB node performs uplink transmission by applying a dedicated TA value, but transmission of a specific uplink signal/channel may be performed using a default TA. For example, the MT of the IAB node performs uplink transmission by applying a dedicated TA value, but as an exception, transmission of a sounding reference signal (SRS) may be performed using a default TA.

Alternatively, in the case of a semi-static uplink signal/channel configured as RRC and transmitted (e.g., SRS, scheduling request (SR), semi-persistent scheduling-physical uplink shared channel (SPS-PUSCH), physical random access channel (PRACH)), it is transmitted by applying the default TA, in the case of an uplink signal/channel that is dynamically scheduled and transmitted by DCI, etc., a dedicated TA may be applied and transmitted.

Characteristically, when configuring the transmission of a semi-static uplink signal/channel by RRC to the IAB node, TA information applied to the IAB node may be set together. For example, when configuring transmission of a semi-static uplink signal/channel to the IAB node by RRC, whether to perform transmission using a default TA or a dedicated TA value may be set together in the IAB node.

(Method 1-3) TA information applied to uplink transmission may be indicated together through DCI. For example, a field indicating whether transmission is performed using a default TA or a dedicated TA value may be included in the DCI. The MT of the IAB node may receive the DCI and apply TA information indicated through the DCI when performing uplink transmission scheduled by the DCI. When such TA information is included in an uplink grant, the MT of the IAB node may apply the corresponding TA value when transmitting the scheduled PUSCH. On the other hand, when such TA information is included in a downlink grant, the MT of the IAB node may apply the corresponding TA value when transmitting the PUCCH containing ACK/NACK (acknowledgement/negative-acknowledgement) information for the scheduled PDSCH.

(Method 1-4) A TA value applied to uplink transmission may be different depending on the type of DCI received by the MT of the IAB node.

According to whether the DCI received by the MT of the IAB node is a fallback DCI (i.e., DCI format 0_0, DCI format 1_0, etc.) or a non-fallback DCI (i.e., DCI format 0_1, DCI format 1_1), the applied TA value may be different. When the MT of the IAB node receives the fallback DCI, a default TA value may be applied to related uplink transmission (e.g., PUSCH and PUCCH). On the other hand, when the MT of the IAB node receives the non-fallback DCI, a dedicated TA value may be applied to related uplink transmission (e.g., PUSCH and PUCCH).

(Method 1-5) A TA value applied to uplink transmission may be different according to a resource through which the DCI received by the MT of the IAB node is transmitted.

The TA value applied to uplink transmission may be different according to the CORESET in which the DCI received by the MT of the IAB node is located. For example, in the case of DCI transmitted through a search space connected to CORESET 1, a default TA value is applied to related uplink transmissions (PUSCH and PUCCH), in the case of DCI transmitted through the search space connected to CORESET 2, a dedicated TA value may be applied to related uplink transmissions (PUSCH and PUCCH).

Alternatively, a TA value applied to uplink transmission may be different according to a search space in which the DCI received by the MT of the IAB node is located. For example, in the case of DCI transmitted through search space 1, a default TA value is applied to related uplink transmissions (PUSCH and PUCCH), in the case of DCI transmitted through search space 2, a dedicated TA value may be applied to related uplink transmission. As another example, in the case of DCI transmitted in a common search space (CSS), a default TA value is applied to related uplink transmission, in the case of DCI transmitted in a UE-specific search space (USS), a dedicated TA value may be applied to related uplink transmission.

(Method 1-6) A TA value applied by the MT of the IAB node may be different according to a time resource for performing uplink transmission.

The MT of the IAB node may receive time resource information operating as a dedicated TA from the DU of the parent node or from the CU/donor node. At this time, the MT of the IAB node performs uplink transmission to a dedicated TA in the set time resource, in the remaining resources, uplink transmission may be performed as a default TA.

Alternatively, the MT of the IAB node may receive time resource information operating as a default TA from the DU of the parent node or from the CU/donor node. In this case, the MT of the IAB node may perform uplink transmission as a default TA in the configured time resource, and may perform uplink transmission as a dedicated TA in the remaining resources.

Alternatively, the MT of the IAB node may receive time resource information operating as a default TA and time resource information operating as a dedicated TA from the DU of the parent node or from the CU/donor node, respectively. In this case, the MT of the IAB node may perform uplink transmission to the default TA in a time resource operating as a default TA, and may perform uplink transmission to a dedicated TA in a time resource operating as a dedicated TA.

Meanwhile, even when there are a plurality of types of TA values that the MT of the IAB node can apply for uplink transmission, the above contents may be extended and applied. In this case, different TA values may be applied when the MT of the IAB node performs uplink transmission according to the method/condition as described above.

Meanwhile, in relation to the above-described methods, the IAB node may receive DCI from its parent node and may receive RRC signaling from a donor node.

Hereinafter, priority between uplink transmissions transmitted by applying different TAs will be described.

When the MT of the IAB node transmits different uplink transmissions by applying different TA values, the time resources of the two uplink transmissions may overlap. Alternatively, a certain amount of time is consumed to change the TA value applied by the MT of the IAB node, so that sufficient time for changing the TA value may not be guaranteed even if time resources of different uplink transmissions do not overlap. For example, although 2 symbols are required for the MT of the IAB node to change the TA value, the PUSCH transmission symbol resource and the SRS transmission symbol resource of the MT of the IAB node may be continuously located. In this case, since the MT of the IAB node cannot completely perform both uplink transmissions, one of the two uplink transmissions may be performed preferentially. Below, we propose specific measures for this purpose.

(Method 2-1) Compared to semi-static uplink transmission (e.g., semi-statically configured uplink transmission through RRC configuration), dynamic uplink transmission (e.g., uplink transmission dynamically scheduled through DCI) may take priority.

(Method 2-2) The priority of uplink transmission may be determined according to a time point at which information/signal/message configuring uplink transmission is received. For example, transmission of uplink for which scheduling is set/indicated more recently may be prioritized. Alternatively, the reverse case is also possible.

(Method 2-3) The priority of uplink transmission may be determined according to a time point at which uplink transmission is performed. For example, an uplink transmission scheduled to be transmitted earlier may have priority. Alternatively, uplink transmission scheduled to be transmitted later may take precedence.

(Method 2-4) Priority may be determined according to a value of TA applied to uplink transmission. For example, uplink transmission transmitted using the default TA may have priority over uplink transmission transmitted using the dedicated TA. Alternatively, uplink transmission transmitted using the dedicated TA may have priority over uplink transmission transmitted using the default TA.

Meanwhile, in the above context, the phrase that the first transmission takes precedence over the second transmission may mean the following.

(Example a) The MT of the IAB node may not perform the first transmission and drop the second transmission.

(Example b) The MT of the IAB node performs the first transmission, and does not perform the second transmission by puncturing the second transmission resource that cannot perform the second transmission for the first transmission. In the second transmission resource capable of performing the second transmission resource, the second transmission is performed.

Based on the above-described methods, the following operation of the IAB node may be considered.

Figure 31:
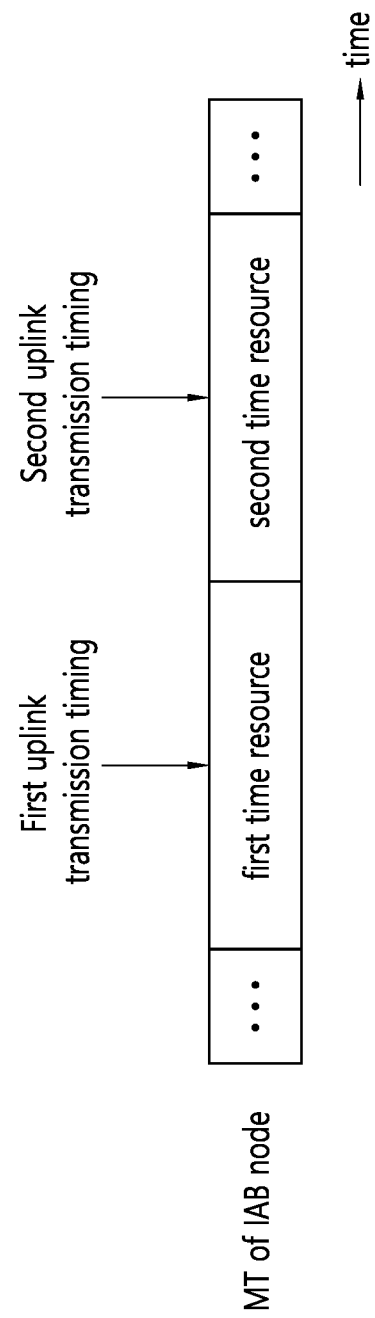
FIG. 31 is for explaining an example of uplink transmission of an IAB node MT in which a plurality of uplink transmission timings are set according to some implementations of the present specification.

FIG. 31 is for explaining an example of uplink transmission of an IAB node MT in which a plurality of uplink transmission timings are set according to some implementations of the present specification.

Referring to FIG. 31, the MT of the IAB node may receive a plurality of uplink transmission timings. The plurality of uplink transmission timings may be applied differently for each time resource or time interval. For example, when the MT of the IAB node receives two uplink transmission timings (i.e., the first uplink transmission timing and the second uplink transmission timing), the MT of the IAB node performs uplink transmission based on a first uplink transmission timing in a first time interval, uplink transmission may be performed based on the second uplink transmission timing in the second time interval. Here, as an example, the first uplink transmission timing may be an uplink transmission timing based on timing alignment case 6, the second uplink transmission timing may be an uplink transmission timing based on timing alignment case 1.

Meanwhile, in the above-described example, the first time interval and the second time interval may be configured as follows.

For example, the first time interval may be a time resource capable of performing simultaneous transmission between the DU and the MT of the IAB node. In addition, the second time interval may be a resource (for example, a resource capable of performing only a TDM-based operation for the DU and MT of the IAB node, and a time resource configured to perform a transmission operation on the MT of the IAB node) that cannot perform simultaneous transmission between the DU and the MT of the IAB node.

As another example, the second time interval may be a resource for transmitting SRS, SR, and/or PRACH. In addition, the first time period may be a time resource configured not to transmit the signal/channel According to the above operation, the IAB node may perform a transmission operation on the time resource for a parent node of the IAB node to receive a signal transmitted by the IAB node based on the first uplink transmission timing and the time resource for receiving a signal transmitted by the IAB node based on the second uplink transmission timing. In addition, according to the above operation, since the first uplink transmission timing is a timing at which transmission is performed according to the absolute reception timing of the DU of the parent node, in the signal transmitted based on the first uplink transmission timing, the DU of the parent node determines a change in propagation delay with the IAB node, it may be used to adjust the transmission timing for the DU of the IAB node based on the change. In addition, since the second uplink transmission timing is determined according to the transmission timing of the DU of the parent node, according to a change in the transmission timing of the DU of the parent node and the propagation delay of the DU of the parent node, the reception timing of the DU of the parent node may be changed together. In the signal transmitted based on the second uplink transmission timing, it may be difficult for the DU of the parent node to accurately determine the change in propagation delay with the IAB node, it may be relatively inappropriate to use for adjusting the transmission timing of the DU of the IAB node.

On the other hand, the operation of the above-described IAB node is only one embodiment according to some implementations of the present specification, and it is obvious that various methods/configurations proposed in the present specification may be implemented.

Figure 32:
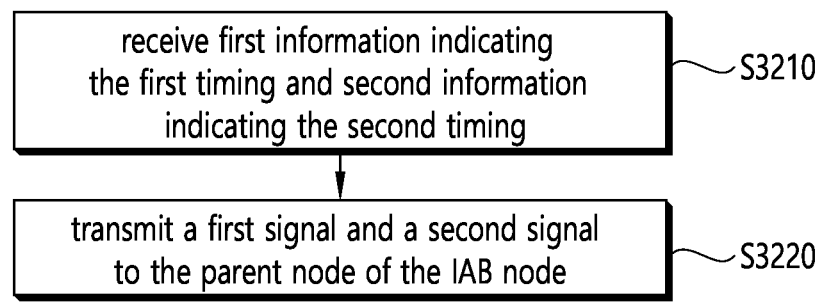
FIG. 32 is a flowchart of an example of a signal transmission method of an IAB node according to some implementations of the present specification.

FIG. 32 is a flowchart of an example of a signal transmission method of an IAB node according to some implementations of the present specification.

Referring to FIG. 32, the IAB node receives first information indicating the first timing and second information indicating the second timing (S3210).

Thereafter, the IAB node transmits a first signal and a second signal to the parent node of the IAB node (S3220).

Here, the first signal may be transmitted on a first resource, and the second signal may be transmitted on a second resource. Also, here, the first resource may be a time resource to which the first timing is applied, and the second resource may be a time resource to which the second timing is applied.

Figure 33:
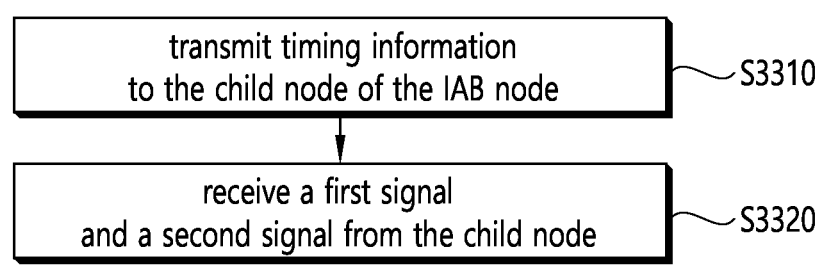
FIG. 33 is a flowchart of an example of a signal receiving method of an IAB node according to some implementations of the present specification.

FIG. 33 is a flowchart of an example of a signal receiving method of an IAB node according to some implementations of the present specification.

Referring to FIG. 33, the IAB node transmits timing information to the child node of the IAB node (S3310). Here, the timing information may inform a plurality of timings at which the child node performs transmission to the IAB node.

Thereafter, the IAB node receives a first signal and a second signal from the child node (S3320).

Here, each of the first signal and the second signal may be transmitted based on different timings among the plurality of timings. Also, here, the timing information may be transmitted through DCI.

Meanwhile, since it is obvious that the various methods/configurations proposed in the present specification can be extended and applied to the example of FIG. 33, a redundant description will be omitted.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

The methods proposed in this specification are, in addition to the IAB node, at least one computer readable medium including instructions based on being executed by at least one processor and one or more processors and one or more memories operably coupled by the one or more processors and storing instructions, the one or more processors execute the instructions to perform the methods proposed herein, it may also be performed by an apparatus (apparatus) configured to control the IAB node. In addition, it is obvious that, according to the methods proposed in the present specification, an operation by another IAB node corresponding to an operation performed by the IAB node may be considered.

Hereinafter, an example of a communication system to which the present disclosure is applied will be described.

Although not limited to this, various descriptions, functions, procedures, proposals, methods, and/or operation flowcharts of the present disclosure disclosed in this document may be applied to various fields requiring wireless communication/connection (e.g., 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 34:
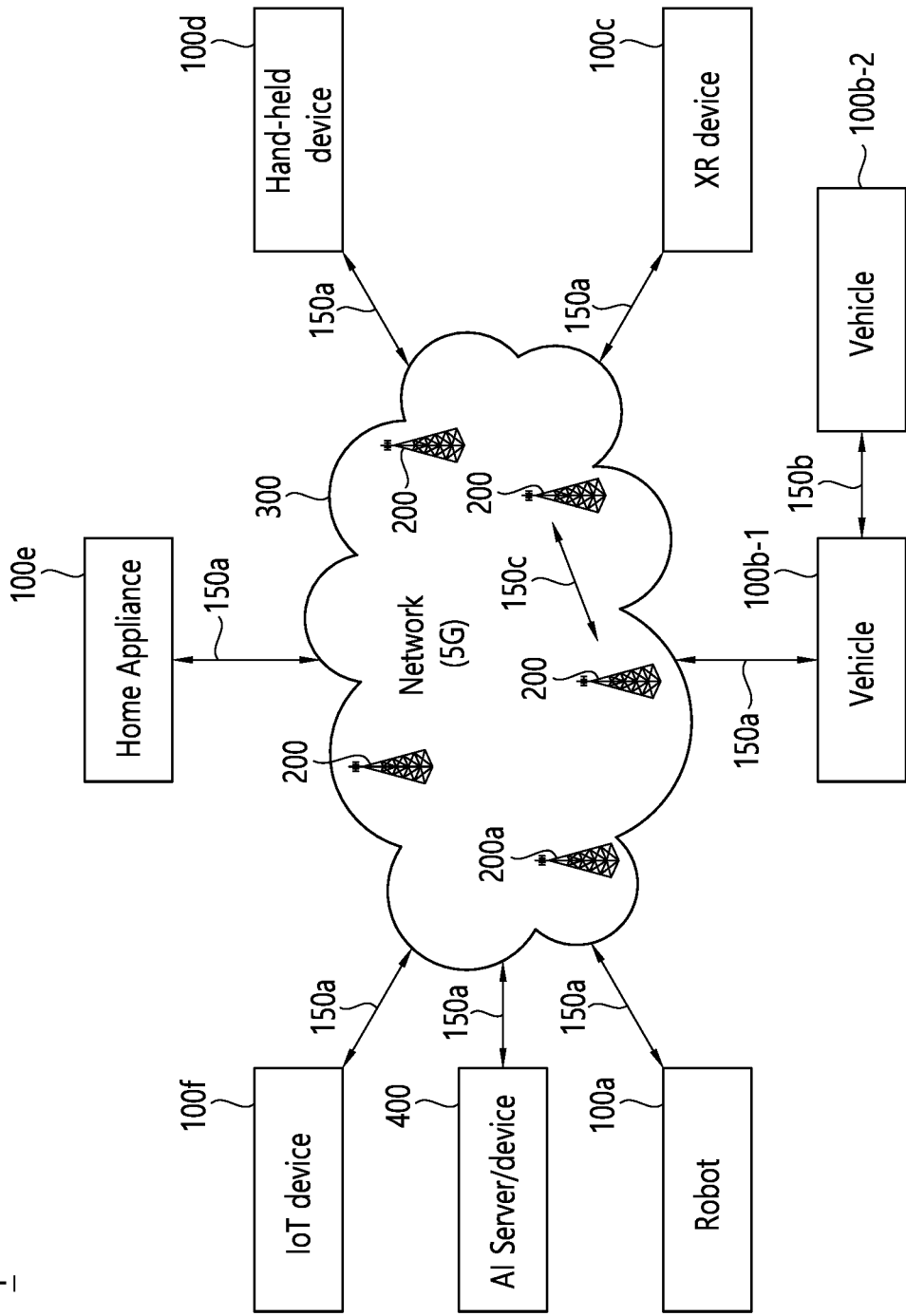
FIG. 34 illustrates a communication system 1 applied to the disclosure.

FIG. 34 illustrates a communication system 1 applied to the disclosure.

Referring to FIG. 34, the communication system 1 applied to the disclosure includes a wireless device, a base station, and a network. Here, the wireless device refers to a device that performs communication using a radio access technology (e.g., 5G new RAT (NR) or Long-Term Evolution (LTE)) and may be referred to as a communication/wireless/5G device. The wireless device may include, but limited to, a robot 100a, a vehicle 100b-1 and 100b-2, an extended reality (XR) device 100c, a hand-held device 100d, a home appliance 100e, an Internet of things (IoT) device 100f, and an AI device/server 400. For example, the vehicle may include a vehicle having a wireless communication function, an autonomous driving vehicle, a vehicle capable of inter-vehicle communication, or the like. Here, the vehicle may include an unmanned aerial vehicle (UAV) (e.g., a drone). The XR device may include augmented reality (AR)/virtual reality (VR)/mixed reality (MR) devices and may be configured as a head-mounted device (HMD), a vehicular head-up display (HUD), a television, a smartphone, a computer, a wearable device, a home appliance, digital signage, a vehicle, a robot, or the like. The hand-held device may include a smartphone, a smartpad, a wearable device (e.g., a smart watch or smart glasses), and a computer (e.g., a notebook). The home appliance may include a TV, a refrigerator, a washing machine, and the like. The IoT device may include a sensor, a smart meter, and the like. The base station and the network may be configured, for example, as wireless devices, and a specific wireless device 200a may operate as a base station/network node for other wireless devices.

Here, the wireless communication technology implemented in the wireless device of the present disclosure may include a narrowband Internet of Things for low-power communication as well as LTE, NR, and 6G. At this time, for example, NB-IoT technology may be an example of low power wide area network (LPWAN) technology, and may be implemented in standards such as LTE Cat NB1 and/or LTE Cat NB2, may be implemented in the standard of LTE Cat NB1 and/or LTE Cat NB2, and is not limited to the names mentioned above. Additionally or alternatively, the wireless communication technology implemented in the wireless device of the present disclosure may perform communication based on LTE-M technology. In this case, as an example, the LTE-M technology may be an example of an LPWAN technology, and may be called by various names such as enhanced machine type communication (eMTC). For example, LTE-M technology may be implemented by at least any one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the names described above. Additionally or alternatively, the wireless communication technology implemented in the wireless device of the present disclosure may include at least one of ZigBee, Bluetooth, and LPWAN considering low power communication and is not limited to the names described above. For example, the ZigBee technology may create personal area networks (PAN) related to small/low-power digital communication based on various standards such as IEEE 802.15.4, and may be called by various names.

The wireless devices 100a to 100f may be connected to the network 300 through the base station 200. Artificial intelligence (AI) technology may be applied to the wireless devices 100a to 100f, and the wireless devices 100a to 100f may be connected to an AI server 400 through the network 300. The network 300 may be configured using a 3G network, a 4G (e.g., LTE) network, or a 5G (e.g., NR) network. The wireless devices 100a to 100f may communicate with each other via the base station 200/network 300 and may also perform direct communication (e.g. sidelink communication) with each other without passing through the base station/network. For example, the vehicles 100b-1 and 100b-2 may perform direct communication (e.g. vehicle-to-vehicle (V2V)/vehicle-to-everything (V2X) communication). Further, the IoT device (e.g., a sensor) may directly communicate with another IoT device (e.g., a sensor) or another wireless device 100a to 100f.

Wireless communications/connections 150a, 150b, and 150c may be established between the wireless devices 100a to 100f and the base station 200 and between the base stations 200. Here, the wireless communications/connections may be established by various wireless access technologies (e.g., 5G NR), such as uplink/downlink communication 150a, sidelink communication 150b (or D2D communication), and inter-base station communication 150c (e.g., relay or integrated access backhaul (IAB)). The wireless devices and the base station/wireless devices, and the base stations may transmit/receive radio signals to/from each other through the wireless communications/connections 150a, 150b, and 150c. For example, the wireless communications/connections 150a, 150b, and 150c may transmit/receive signals over various physical channels. To this end, at least some of various configuration information setting processes, various signal processing processes (e.g., channel encoding/decoding, modulation/demodulation, resource mapping/demapping, and the like), and resource allocation processes may be performed on the basis of various proposals of the disclosure.

Figure 35:
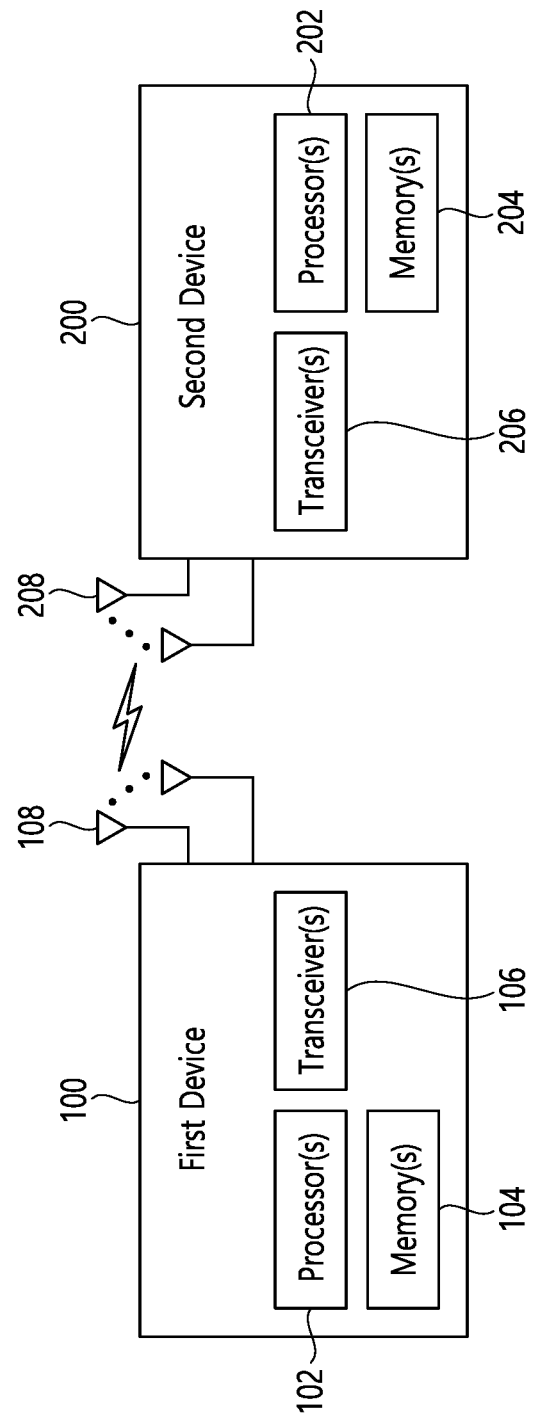
FIG. 35 illustrates a wireless device that is applicable to the disclosure.

FIG. 35 illustrates a wireless device that is applicable to the disclosure.

Referring to FIG. 35, a first wireless device 100 and a second wireless device 200 may transmit and receive radio signals through various radio access technologies (e.g., LTE and NR). Here, the first wireless device 100 and the second wireless device 200 may respectively correspond to a wireless device 100x and the base station 200 of FIG. 34 and/or may respectively correspond to a wireless device 100x and a wireless device 100x of FIG. 34.

The first wireless device 100 includes at least one processor 102 and at least one memory 104 and may further include at least one transceiver 106 and/or at least one antenna 108. The processor 102 may be configured to control the memory 104 and/or the transceiver 106 and to implement the descriptions, functions, procedures, proposals, methods, and/or operational flowcharts disclosed herein. For example, the processor 102 may process information in the memory 104 to generate first information/signal and may then transmit a radio signal including the first information/signal through the transceiver 106. In addition, the processor 102 may receive a radio signal including second information/signal through the transceiver 106 and may store information obtained from signal processing of the second information/signal in the memory 104. The memory 104 may be connected to the processor 102 and may store various pieces of information related to the operation of the processor 102. For example, the memory 104 may store a software code including instructions to perform some or all of processes controlled by the processor 102 or to perform the descriptions, functions, procedures, proposals, methods, and/or operational flowcharts disclosed herein. Here, the processor 102 and the memory 104 may be part of a communication modem/circuit/chip designed to implement a radio communication technology (e.g., LTE or NR). The transceiver 106 may be connected with the processor 102 and may transmit and/or receive a radio signal via the at least one antennas 108. The transceiver 106 may include a transmitter and/or a receiver. The transceiver 106 may be replaced with a radio frequency (RF) unit. In the disclosure, the wireless device may refer to a communication modem/circuit/chip.

The second wireless device 200 includes at least one processor 202 and at least one memory 204 and may further include at least one transceiver 206 and/or at least one antenna 208. The processor 202 may be configured to control the memory 204 and/or the transceiver 206 and to implement the descriptions, functions, procedures, proposals, methods, and/or operational flowcharts disclosed herein. For example, the processor 202 may process information in the memory 204 to generate third information/signal and may then transmit a radio signal including the third information/signal through the transceiver 206. In addition, the processor 202 may receive a radio signal including fourth information/signal through the transceiver 206 and may store information obtained from signal processing of the fourth information/signal in the memory 204. The memory 204 may be connected to the processor 202 and may store various pieces of information related to the operation of the processor 202. For example, the memory 204 may store a software code including instructions to perform some or all of processes controlled by the processor 202 or to perform the descriptions, functions, procedures, proposals, methods, and/or operational flowcharts disclosed herein. Here, the processor 202 and the memory 204 may be part of a communication modem/circuit/chip designed to implement a radio communication technology (e.g., LTE or NR). The transceiver 206 may be connected with the processor 202 and may transmit and/or receive a radio signal via the at least one antennas 208. The transceiver 206 may include a transmitter and/or a receiver. The transceiver 206 may be replaced with an RF unit. In the disclosure, the wireless device may refer to a communication modem/circuit/chip.

Hereinafter, hardware elements of the wireless devices 100 and 200 are described in detail. At least one protocol layer may be implemented, but limited to, by the at least one processor 102 and 202. For example, the at least one processor 102 and 202 may implement at least one layer (e.g., a functional layer, such as PHY, MAC, RLC, PDCP, RRC, and SDAP layers). The at least one processor 102 and 202 may generate at least one protocol data unit (PDU) and/or at least one service data unit (SDU) according to the descriptions, functions, procedures, proposals, methods, and/or operational flowcharts disclosed herein. The at least one processor 102 and 202 may generate a message, control information, data, or information according to the descriptions, functions, procedures, proposals, methods, and/or operational flowcharts disclosed herein. The at least one processor 102 and 202 may generate a signal (e.g., a baseband signal) including a PDU, an SDU, a message, control information, data, or information according to the functions, procedures, proposals, and/or methods disclosed herein and may provide the signal to the at least one transceiver 106 and 206. The at least one processor 102 and 202 may receive a signal (e.g., a baseband signal) from the at least one transceiver 106 and 206 and may obtain a PDU, an SDU, a message, control information, data, or information according to the descriptions, functions, procedures, proposals, methods, and/or operational flowcharts disclosed herein.

The at least one processor 102 and 202 may be referred to as a controller, a microcontroller, a microprocessor, or a microcomputer. The at least one processor 102 and 202 may be implemented by hardware, firmware, software, or a combination thereof. For example, at least one application-specific integrated circuit (ASIC), at least one digital signal processor (DSP), at least one digital signal processing devices (DSPD), at least one programmable logic devices (PLD), or at least one field programmable gate array (FPGA) may be included in the at least one processor 102 and 202. The descriptions, functions, procedures, proposals, methods, and/or operational flowcharts disclosed herein may be implemented using firmware or software, and the firmware or software may be configured to include modules, procedures, functions, and the like. The firmware or software configured to perform the descriptions, functions, procedures, proposals, methods, and/or operational flowcharts disclosed herein may be included in the at least one processor 102 and 202 or may be stored in the at least one memory 104 and 204 and may be executed by the at least one processor 102 and 202. The descriptions, functions, procedures, proposals, methods, and/or operational flowcharts disclosed herein may be implemented in the form of a code, an instruction, and/or a set of instructions using firmware or software.

The at least one memory 104 and 204 may be connected to the at least one processor 102 and 202 and may store various forms of data, signals, messages, information, programs, codes, indications, and/or commands. The at least one memory 104 and 204 may be configured as a ROM, a RAM, an EPROM, a flash memory, a hard drive, a register, a cache memory, a computer-readable storage medium, and/or a combinations thereof. The at least one memory 104 and 204 may be disposed inside and/or outside the at least one processor 102 and 202. In addition, the at least one memory 104 and 204 may be connected to the at least one processor 102 and 202 through various techniques, such as a wired or wireless connection.

The at least one transceiver 106 and 206 may transmit user data, control information, a radio signal/channel, or the like mentioned in the methods and/or operational flowcharts disclosed herein to at least one different device. The at least one transceiver 106 and 206 may receive user data, control information, a radio signal/channel, or the like mentioned in the descriptions, functions, procedures, proposals, methods, and/or operational flowcharts disclosed herein from at least one different device. For example, the at least one transceiver 106 and 206 may be connected to the at least one processor 102 and 202 and may transmit and receive a radio signal. For example, the at least one processor 102 and 202 may control the at least one transceiver 106 and 206 to transmit user data, control information, or a radio signal to at least one different device. In addition, the at least one processor 102 and 202 may control the at least one transceiver 106 and 206 to receive user data, control information, or a radio signal from at least one different device. The at least one transceiver 106 and 206 may be connected to the at least one antenna 108 and 208 and may be configured to transmit or receive user data, control information, a radio signal/channel, or the like mentioned in the descriptions, functions, procedures, proposals, methods, and/or operational flowcharts disclosed herein through the at least one antenna 108 and 208. In this document, the at least one antenna may be a plurality of physical antennas or may be a plurality of logical antennas (e.g., antenna ports). The at least one transceiver 106 and 206 may convert a received radio signal/channel from an RF band signal into a baseband signal in order to process received user data, control information, a radio signal/channel, or the like using the at least one processor 102 and 202. The at least one transceiver 106 and 206 may convert user data, control information, a radio signal/channel, or the like, processed using the at least one processor 102 and 202, from a baseband signal to an RF bad signal. To this end, the at least one transceiver 106 and 206 may include an (analog) oscillator and/or a filter.

Figure 36:
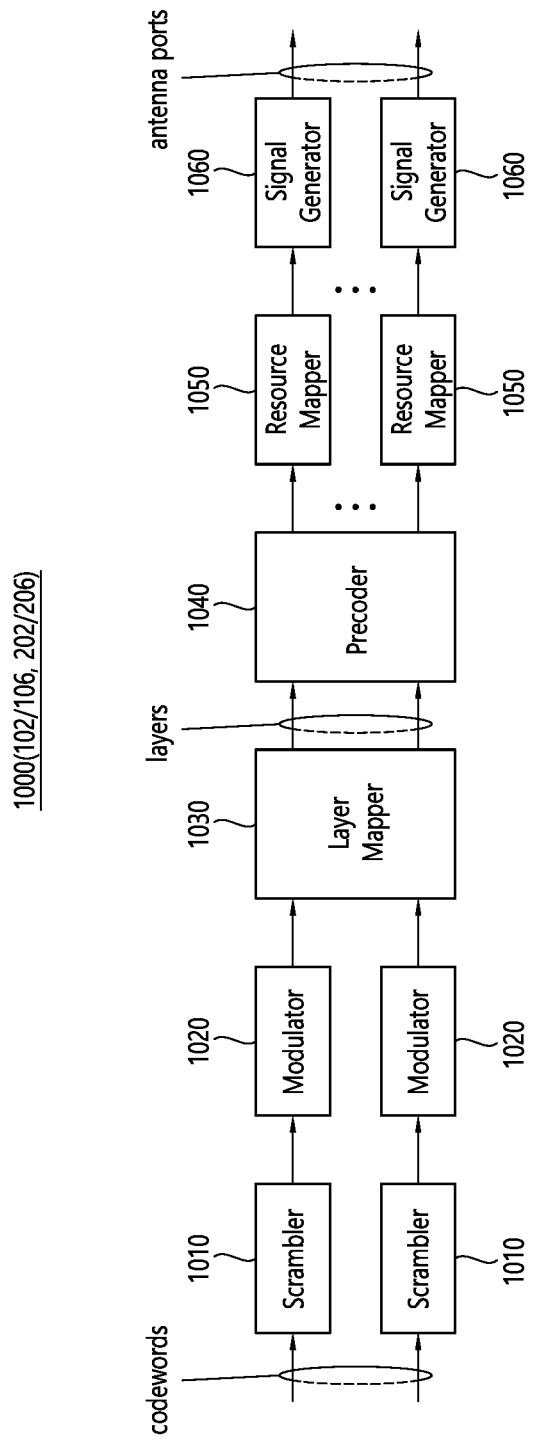
FIG. 36 illustrates a signal processing circuit for a transmission signal.

FIG. 36 illustrates a signal processing circuit for a transmission signal.

Referring to FIG. 36, the signal processing circuit 1000 may include a scrambler 1010, a modulator 1020, a layer mapper 1030, a precoder 1040, a resource mapper 1050, and a signal generator 1060. Operations/functions illustrated with reference to FIG. 36 may be performed, but not limited to, in the processor 102 and 202 and/or the transceiver 106 and 206 of FIG. 35. Hardware elements illustrated in FIG. 36 may be configured in the processor 102 and 202 and/or the transceiver 106 and 206 of FIG. 35. For example, blocks 1010 to 1060 may be configured in the processor 102 and 202 of FIG. 35. Alternatively, blocks 1010 to 1050 may be configured in the processor 102 and 202 of FIG. 35, and a block 1060 may be configured in the transceiver 106 and 206 of FIG. 35.

A codeword may be converted into a radio signal via the signal processing circuit 1000 of FIG. 36. Here, the codeword is an encoded bit sequence of an information block. The information block may include a transport block (e.g., a UL-SCH transport block and a DL-SCH transport block). The radio signal may be transmitted through various physical channels (e.g., a PUSCH or a PDSCH).

Specifically, the codeword may be converted into a scrambled bit sequence by the scrambler 1010. A scrambled sequence used for scrambling is generated on the basis of an initialization value, and the initialization value may include ID information about a wireless device. The scrambled bit sequence may be modulated into a modulation symbol sequence by the modulator 1020. A modulation scheme may include pi/2-binary phase shift keying (pi/2-BPSK), m-phase shift keying (m-PSK), m-quadrature amplitude modulation (m-QAM), and the like. A complex modulation symbol sequence may be mapped to at least one transport layer by the layer mapper 1030. Modulation symbols of each transport layer may be mapped to a corresponding antenna port(s) by the precoder 1040 (precoding). Output z from the precoder 1040 may be obtained by multiplying output y from the layer mapper 1030 by a precoding matrix W of N*M, where N is the number of antenna ports, and M is the number of transport layers. Here, the precoder 1040 may perform precoding after performing transform precoding (e.g., DFT transform) on complex modulation symbols. Alternatively, the precoder 1040 may perform precoding without performing transform precoding.

The resource mapper 1050 may map a modulation symbol of each antenna port to a time-frequency resource. The time-frequency resource may include a plurality of symbols (e.g., CP-OFDMA symbols or DFT-s-OFDMA symbols) in the time domain and may include a plurality of subcarriers in the frequency domain. The signal generator 1060 may generate a radio signal from mapped modulation symbols, and the generated radio signal may be transmitted to another device through each antenna. To this end, the signal generator 1060 may include an inverse fast Fourier transform (IFFT) module, a cyclic prefix (CP) inserter, a digital-to-analog converter (DAC), a frequency upconverter, and the like.

A signal processing procedure for a received signal in a wireless device may be performed in the reverse order of the signal processing procedure 1010 to 1060 of FIG. 36. For example, a wireless device (e.g., 100 and 200 of FIG. 35) may receive a radio signal from the outside through an antenna port/transceiver. The received radio signal may be converted into a baseband signal through a signal reconstructor. To this end, the signal reconstructor may include a frequency downconverter, an analog-to-digital converter (ADC), a CP remover, and a fast Fourier transform (FFT) module. The baseband signal may be reconstructed to a codeword through resource demapping, postcoding, demodulation, and descrambling. The codeword may be reconstructed to an original information block through decoding. Thus, a signal processing circuit (not shown) for a received signal may include a signal reconstructor, a resource demapper, a postcoder, a demodulator, a descrambler and a decoder.

Figure 37:
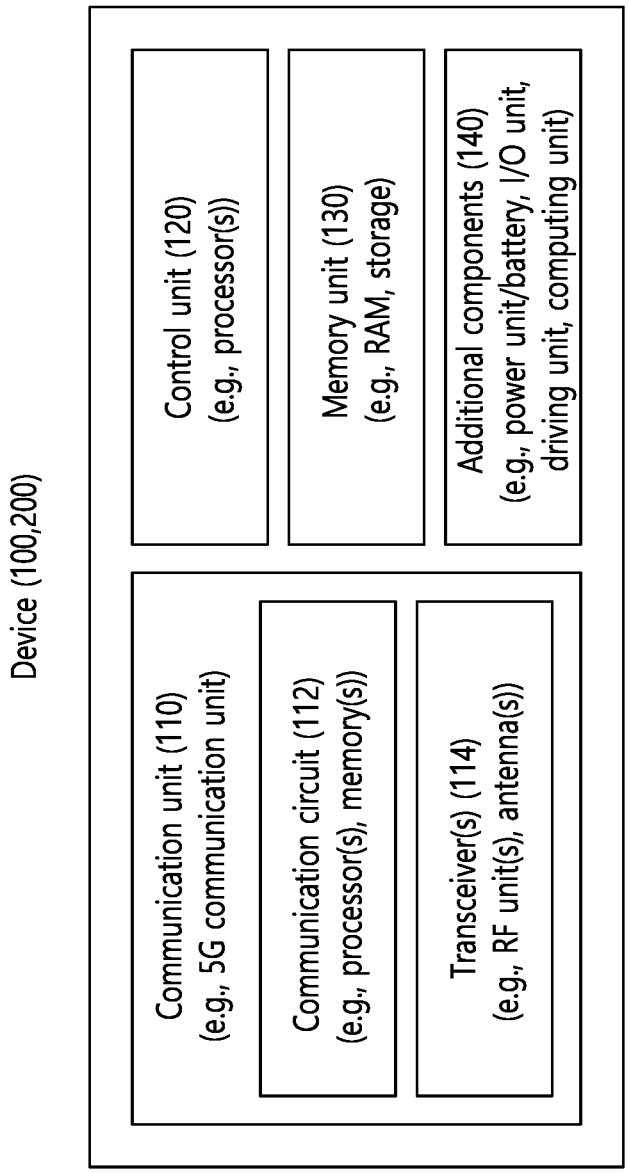
FIG. 37 illustrates another example of a wireless device applied to the disclosure.

FIG. 37 illustrates another example of a wireless device applied to the disclosure. The wireless device may be configured in various forms depending on usage/service.

Referring to FIG. 37, the wireless devices 100 and 200 may correspond to the wireless device 100 and 200 of FIG. 35 and may include various elements, components, units, and/or modules. For example, the wireless device 100 and 200 may include a communication unit 110, a control unit 120, a memory unit 130, and additional components 140. The communication unit may include a communication circuit 112 and a transceiver(s) 114. For example, the communication circuit 112 may include the at least one processor 102 and 202 and/or the at least one memory 104 and 204 of FIG. 35. For example, the transceiver(s) 114 may include the at least one transceiver 106 and 206 and/or the at least one antenna 108 and 208 of FIG. 35. The control unit 120 is electrically connected to the communication unit 110, the memory unit 130, and the additional components 140 and controls overall operations of the wireless device. For example, the control unit 120 may control electrical/mechanical operations of the wireless device on the basis of a program/code/command/information stored in the memory unit 130. In addition, the control unit 120 may transmit information stored in the memory unit 130 to the outside (e.g., a different communication device) through a wireless/wired interface via the communication unit 110 or may store, in the memory unit 130, information received from the outside (e.g., a different communication device) through the wireless/wired interface via the communication unit 110.

The additional components 140 may be configured variously depending on the type of the wireless device. For example, the additional components 140 may include at least one of a power unit/battery, an input/output (I/O) unit, a driving unit, and a computing unit. The wireless device may be configured, but not limited to, as a robot (100a in FIG. 34), a vehicle (100 b-1 or 100 b-2 in FIG. 34), an XR device (100 c in FIG. 34), a hand-held device (100 d in FIG. 34), a home appliance (100e in FIG. 34), an IoT device (100f in FIG. 34), a terminal for digital broadcasting, a hologram device, a public safety device, an MTC device, a medical device, a fintech device (or financial device), a security device, a climate/environmental device, an AI server/device (400 in FIG. 34), a base station (200 in FIG. 34), a network node, or the like. The wireless device may be mobile or may be used in a fixed place depending on usage/service.

In FIG. 37, all of the various elements, components, units, and/or modules in the wireless devices 100 and 200 may be connected to each other through a wired interface, or at least some thereof may be wirelessly connected through the communication unit 110. For example, the control unit 120 and the communication unit 110 may be connected via a cable in the wireless device 100 and 200, and the control unit 120 and a first unit (e.g., 130 and 140) may be wirelessly connected through the communication unit 110. In addition, each element, component, unit, and/or module in wireless device 100 and 200 may further include at least one element. For example, the control unit 120 may include at least one processor set. For example, the control unit 120 may be configured as a set of a communication control processor, an application processor, an electronic control unit (ECU), a graphics processing processor, a memory control processor, and the like. In another example, the memory unit 130 may include a random-access memory (RAM), a dynamic RAM (DRAM), a read-only memory (ROM), a flash memory, a volatile memory, a non-volatile memory, and/or a combination thereof.

Next, an illustrative configuration of FIG. 37 is described in detail with reference to the accompanying drawing.

Figure 38:
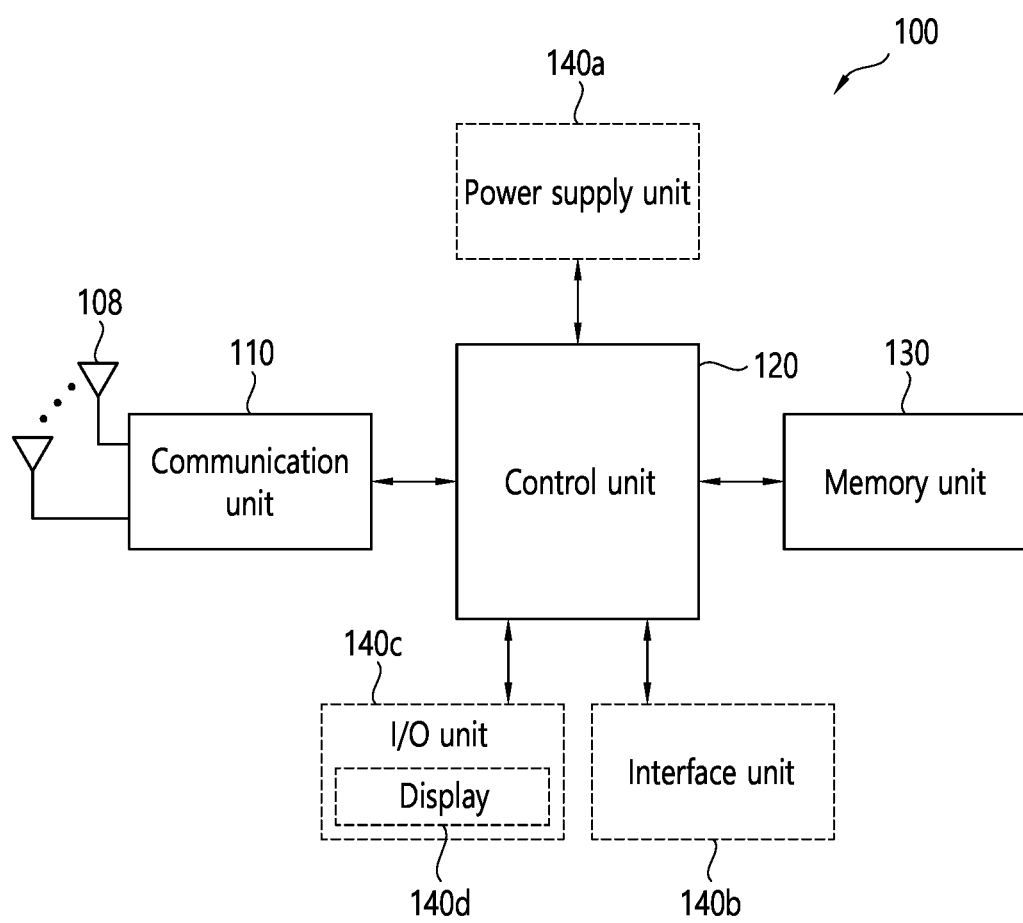
FIG. 38 illustrates a hand-held device applied to the disclosure.

FIG. 38 illustrates a hand-held device applied to the disclosure. The hand-held device may include a smartphone, a smartpad, a wearable device (e.g., a smart watch or smart glasses), and a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 38, the hand-held device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. Blocks 110 to 130/140a to 140c correspond to the blocks 110 to 130/140 in FIG. 37, respectively.

The communication unit 110 may transmit and receive a signal (e.g., data, a control signal, or the like) to and from other wireless devices and base stations. The control unit 120 may control various components of the hand-held device 100 to perform various operations. The control unit 120 may include an application processor (AP). The memory unit 130 may store data/parameter/program/code/command necessary to drive the hand-held device 100. Further, the memory unit 130 may store input/output data/information. The power supply unit 140a supplies power to the hand-held device 100 and may include a wired/wireless charging circuit, a battery, and the like. The interface unit 140b may support a connection between the hand-held device 100 and a different external device. The interface unit 140b may include various ports (e.g., an audio input/output port and a video input/output port) for connection to an external device. The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in data communication, the input/output unit 140c may obtain information/signal (e.g., a touch, text, voice, an image, and a video) input from the user, and the obtained information/signal may be stored in the memory unit 130. The communication unit 110 may convert information/signal stored in the memory unit into a radio signal and may transmit the converted radio signal directly to a different wireless device or to a base station. In addition, the communication unit 110 may receive a radio signal from a different wireless device or the base station and may reconstruct the received radio signal to original information/signal. The reconstructed information/signal may be stored in the memory unit 130 and may then be output in various forms (e.g., text, voice, an image, a video, and a haptic form) through the input/output unit 140c.

Figure 39:
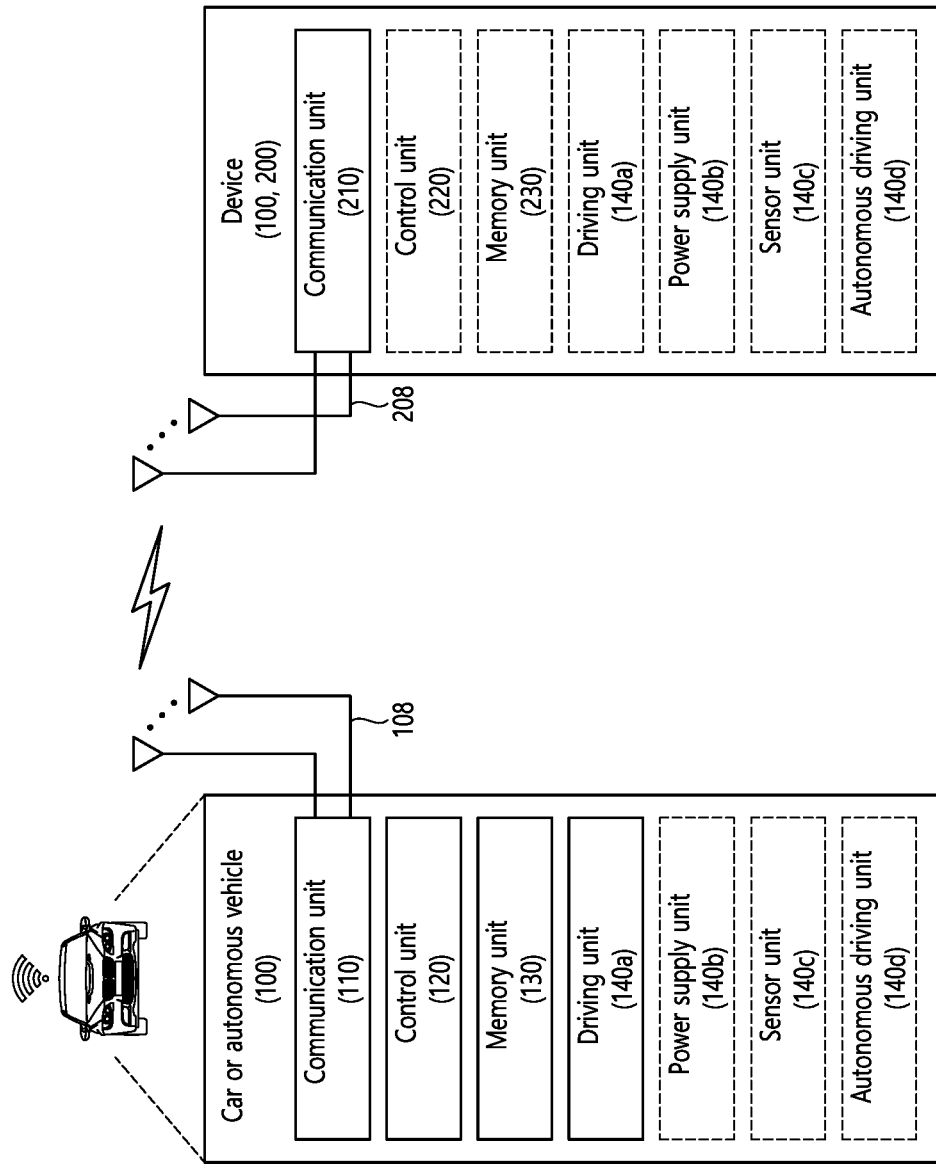
FIG. 39 illustrates a vehicle or an autonomous driving vehicle applied to the disclosure.

FIG. 39 illustrates a vehicle or an autonomous driving vehicle applied to the disclosure. The vehicle or the autonomous driving may be configured as a mobile robot, a car, a train, a manned/unmanned aerial vehicle (AV), a ship, or the like.

Referring to FIG. 39, the vehicle or the autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. Blocks 110/130/140a to 140d correspond to the blocks 110/130/140 in FIG. 37, respectively.

The communication unit 110 may transmit and receive a signal (e.g., data, a control signal, or the like) to and from external devices, such as a different vehicle, a base station (e.g. a base station, a road-side unit, or the like), and a server. The control unit 120 may control elements of the vehicle or the autonomous driving vehicle 100 to perform various operations. The control unit 120 may include an electronic control unit (ECU). The driving unit 140a may enable the vehicle or the autonomous driving vehicle 100 to run on the ground. The driving unit 140a may include an engine, a motor, a power train, wheels, a brake, a steering device, and the like. The power supply unit 140b supplies power to the vehicle or the autonomous driving vehicle 100 and may include a wired/wireless charging circuit, a battery, and the like. The sensor unit 140c may obtain a vehicle condition, environmental information, user information, and the like. The sensor unit 140c may include an inertial measurement unit (IMU) sensor, a collision sensor, a wheel sensor, a speed sensor, an inclination sensor, a weight sensor, a heading sensor, a position module, vehicular forward/backward vision sensors, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140d may implement a technology for maintaining a driving lane, a technology for automatically adjusting speed, such as adaptive cruise control, a technology for automatic driving along a set route, a technology for automatically setting a route and driving when a destination is set, and the like.

For example, the communication unit 110 may receive map data, traffic condition data, and the like from an external server. The autonomous driving unit 140d may generate an autonomous driving route and a driving plan on the basis of obtained data. The control unit 120 may control the driving unit 140a to move the vehicle or the autonomous driving vehicle 100 along the autonomous driving route according to the driving plan (e.g., speed/direction control). During autonomous driving, the communication unit 110 may aperiodically/periodically obtain updated traffic condition data from the external server and may obtain surrounding traffic condition data from a neighboring vehicle. Further, during autonomous driving, the sensor unit 140c may obtain a vehicle condition and environmental information. The autonomous driving unit 140d may update the autonomous driving route and the driving plan on the basis of newly obtained data/information. The communication unit 110 may transmit information about a vehicle location, an autonomous driving route, a driving plan, and the like to the external server. The external server may predict traffic condition data in advance using AI technology or the like on the basis of information collected from vehicles or autonomous driving vehicles and may provide the predicted traffic condition data to the vehicles or the autonomous driving vehicles.

Figure 40:
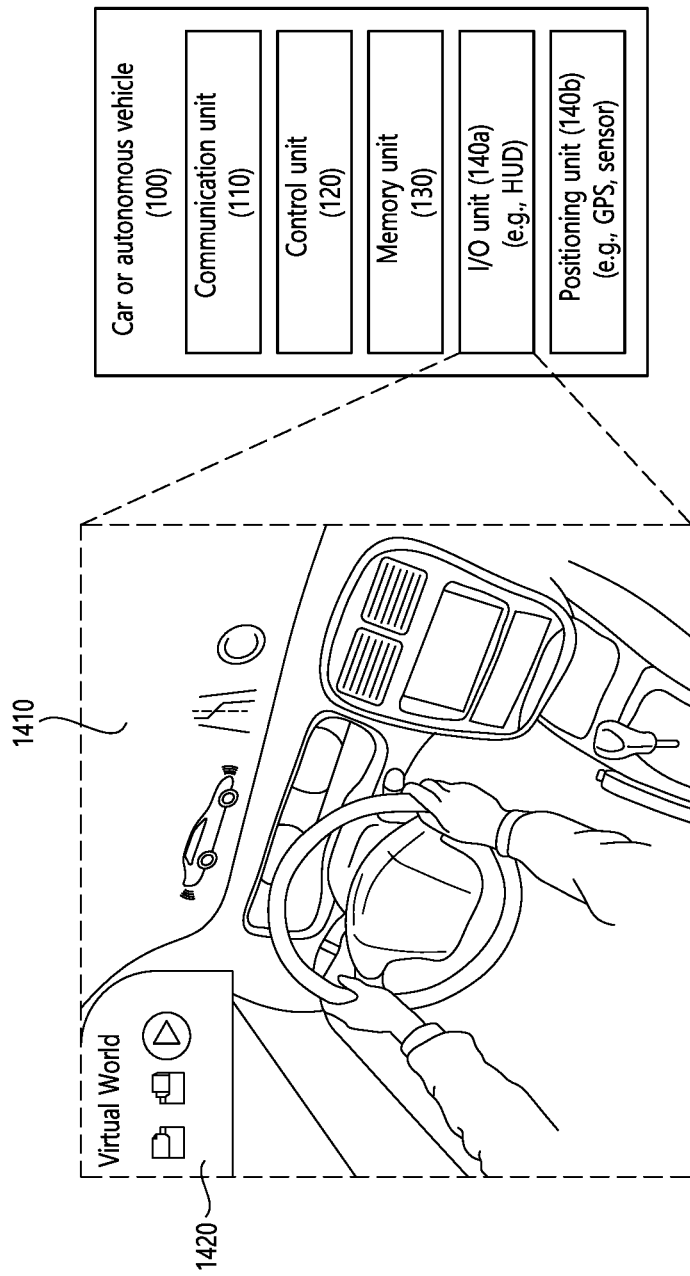
FIG. 40 illustrates a vehicle applied to the disclosure.

FIG. 40 illustrates a vehicle applied to the disclosure. The vehicle may be implemented as a means of transportation, a train, an air vehicle, a ship, and the like.

Referring to FIG. 40, the vehicle 100 may include a communication unit 110, a control unit 120, a memory unit 130, an input/output unit 140a, and a positioning unit 140b. Herein, blocks 110 to 130/140a to 140b correspond to block 110 to 130/140 of FIG. 37, respectively.

The communication unit 110 may transmit/receive signals (e.g., data, control signals, etc.) with other vehicles or external devices such as a base station. The control unit 120 may control components of the vehicle 100 to perform various operations. The memory unit 130 may store data/parameters/programs/codes/commands supporting various functions of the vehicle 100. The input/output unit 140a may output an AR/VR object based on information in the memory unit 130. The input/output unit 140a may include a HUD. The positioning unit 140b may acquire position information of the vehicle 100. The location information may include absolute location information of the vehicle 100, location information within a driving line, acceleration information, location information with a neighboring vehicle, and the like. The positioning unit 140b may include a GPS and various sensors.

For example, the communication unit 110 of the vehicle 100 may receive map information, traffic information, and the like from an external server and store it in the memory unit 130. The positioning unit 140b may obtain vehicle position information through GPS and various sensors and store it in the memory unit 130. The control unit 120 may generate a virtual object based on map information, traffic information, vehicle location information, and the like, and the input/output unit 140a may display the generated virtual object on a window inside the vehicle (1410 and 1420). In addition, the control unit 120 may determine whether the vehicle 100 is normally operating within the driving line based on the vehicle location information. When the vehicle 100 abnormally deviates from the driving line, the control unit 120 may display a warning on the windshield of the vehicle through the input/output unit 140a. Also, the control unit 120 may broadcast a warning message regarding the driving abnormality to surrounding vehicles through the communication unit 110. Depending on the situation, the control unit 120 may transmit the location information of the vehicle and information on driving/vehicle abnormality to the related organization through the communication unit 110.

Figure 41:
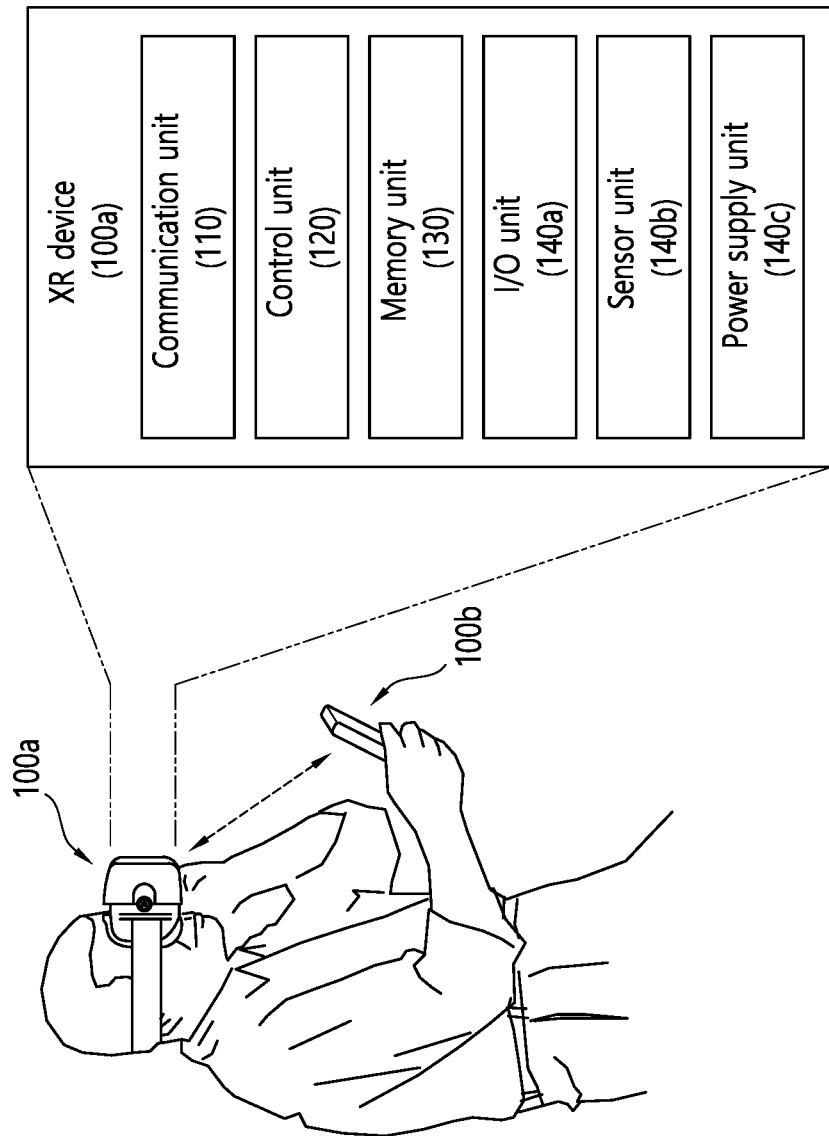
FIG. 41 illustrates a XR device applied to the disclosure.

FIG. 41 illustrates a XR device applied to the disclosure. The XR device may be implemented as an HMD, a head-up display (HUD) provided in a vehicle, a television, a smartphone, a computer, a wearable device, a home appliance, a digital signage, a vehicle, a robot, and the like.

Referring to FIG. 41, the XR device 100*a* may include a communication unit 110, a control unit 120, a memory unit 130, an input/output unit 140*a*, a sensor unit 140*b* and a power supply unit 140*c*. Herein, blocks 110 to 130/140*a* to 140*c* correspond to blocks 110 to 130/140 in FIG. 37.

The communication unit 110 may transmit/receive signals (e.g., media data, control signals, etc.) to/from external devices such as other wireless devices, portable devices, or media servers. Media data may include images, images, sounds, and the like. The control unit 120 may control the components of the XR device 100*a* to perform various operations. For example, the control unit 120 may be configured to control and/or perform procedures such as video/image acquisition, (video/image) encoding, and metadata generation and processing. The memory unit 130 may store data/parameters/programs/codes/commands necessary for driving the XR device 100*a*/creating an XR object. The input/output unit 140*a* may obtain control information, data, and the like from the outside, and may output the generated XR object. The input/output unit 140*a* may include a camera, a microphone, a user input unit, a display unit, a speaker, and/or a haptic module. The sensor unit 140*b* may obtain an XR device state, surrounding environment information, user information, and the like. The sensor unit 140*b* may include a proximity sensor, an illumination sensor, an acceleration sensor, a magnetic sensor, a gyro sensor, an inertial sensor, a RGB sensor, an IR sensor, a fingerprint recognition sensor, an ultrasonic sensor, an optical sensor, a microphone, and/or a radar. The power supply unit 140*c* supplies power to the XR device 100*a*, and may include a wired/wireless charging circuit, a battery, and the like.

For example, the memory unit 130 of the XR device 100*a* may include information (e.g., data, etc.) necessary for generating an XR object (e.g., AR/VR/MR object). The input/output unit 140*a* may obtain a command to operate the XR device 100*a* from the user, and the control unit 120 may drive the XR device 100*a* according to the user's driving command. For example, when the user wants to watch a movie or news through the XR device 100*a*, the control unit 120 transmits the content request information through the communication unit 130 to another device (e.g., the mobile device 100*b*) or can be sent to the media server. The communication unit 130 may download/stream contents such as movies and news from another device (e.g., the portable device 100*b*) or a media server to the memory unit 130. The control unit 120 controls and/or performs procedures such as video/image acquisition, (video/image) encoding, and metadata generation/processing for the content, and is acquired through the input/output unit 140*a*/the sensor unit 140*b* An XR object can be generated/output based on information about one surrounding space or a real object.

Also, the XR device 100*a* is wirelessly connected to the portable device 100*b* through the communication unit 110, and the operation of the XR device 100*a* may be controlled by the portable device 100*b*. For example, the portable device 100*b* may operate as a controller for the XR device 100*a*. To this end, the XR device 100*a* may obtain 3D location information of the portable device 100*b*, and then generate and output an XR object corresponding to the portable device 100*b*.

Figure 42:
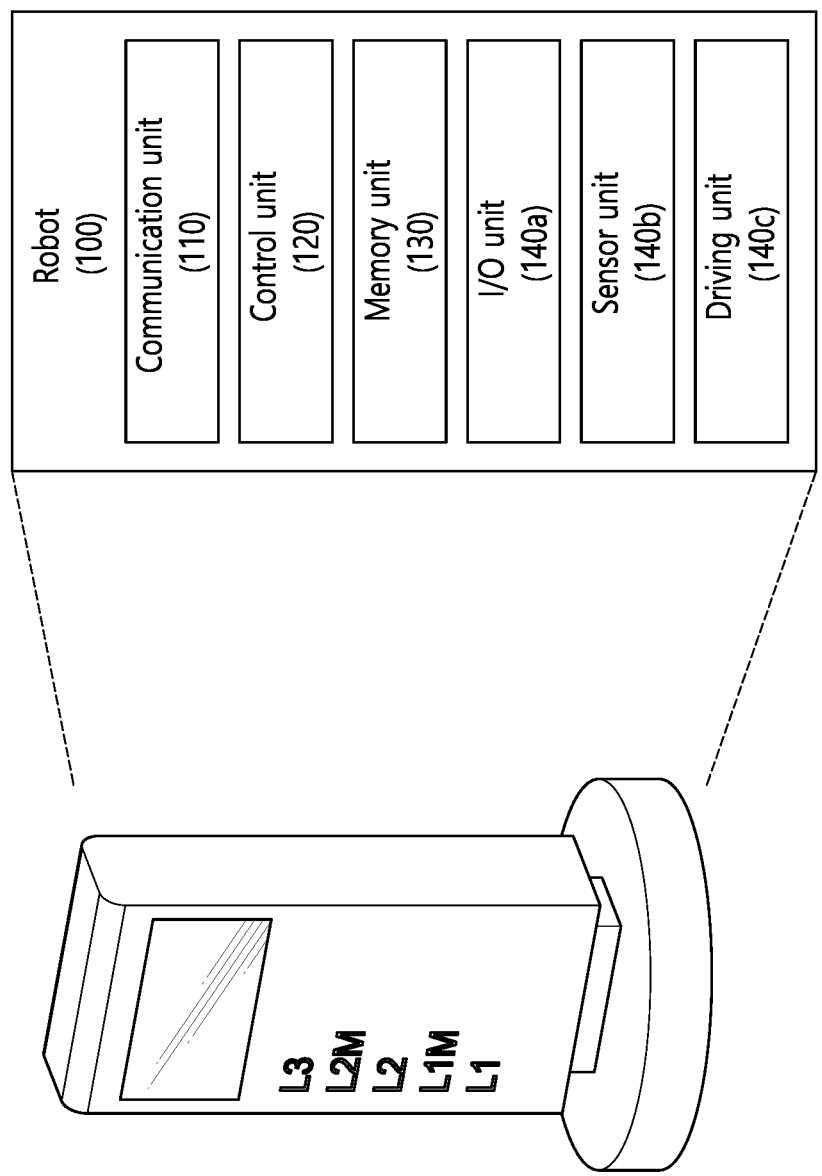
FIG. 42 illustrates a robot applied to the disclosure.

FIG. 42 illustrates a robot applied to the disclosure. The robot may be classified into industrial, medical, home, military, and the like depending on the purpose or field of use.

Referring to FIG. 42, the robot 100 may include a communication unit 110, a control unit 120, a memory unit 130, an input/output unit 140*a*, a sensor unit 140*b*, and a driving unit 140*c*. Herein, blocks 110 to 130/140*a* to 140*c* correspond to blocks 110 to 130/140 in FIG. 37.

The communication unit 110 may transmit/receive signals (e.g., driving information, control signal, etc.) to/from external device such as other wireless device, other robot, or a control server. The control unit 120 may perform various operations by controlling the components of the robot 100. The memory unit 130 may store data/parameters/programs/codes/commands supporting various functions of the robot 100. The input/output unit 140*a* may obtain information from the outside of the robot 100 and may output information to the outside of the robot 100. The input/output unit 140*a* may include a camera, a microphone, an user input unit, a display unit, a speaker, and/or a haptic module, etc. The sensor unit 140*b* may obtain internal information, surrounding environment information, user information and the like of the robot 100. The sensor unit may include a proximity sensor, an illumination sensor, an acceleration sensor, a magnetic sensor, a gyro sensor, an inertial sensor, an IR sensor, a fingerprint recognition sensor, an ultrasonic sensor, an optical sensor, a microphone, a radar, and the like. The driving unit 140*c* may perform various physical operations such as moving a robot joint. In addition, the driving unit 140*c* may make the robot 100 travel on the ground or fly in the air. The driving unit 140*c* may include an actuator, a motor, a wheel, a brake, a propeller, and the like.

Figure 43:
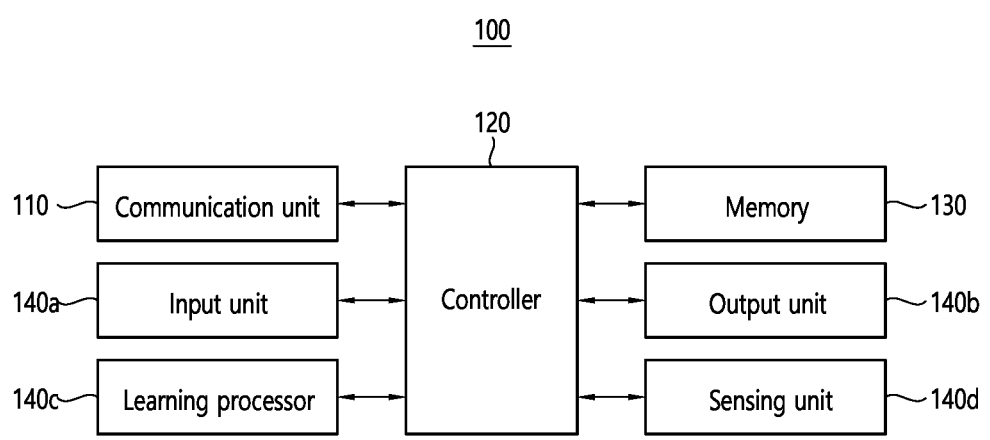
FIG. 43 illustrates an AI device applied to the disclosure.

FIG. 43 illustrates an AI device applied to the disclosure. The AI device may be implemented as a stationary device or a mobile device, such as a TV, a projector, a smartphone, a PC, a laptop, a digital broadcasting terminal, a tablet PC, a wearable device, a set-top box, a radio, a washing machine, a refrigerator, digital signage, a robot, and a vehicle.

Referring to FIG. 43, the AI device 100 may include a communication unit 110, a control unit 120, a memory unit 130, an input unit 140*a*, an output unit 140*b*, a learning processor unit 140*c*, and a sensor unit 140*d*. Blocks 110 to 130/140*a* to 140*d* correspond to the blocks 110 to 130/140 of FIG. 37, respectively.

The communication unit 110 may transmit and receive wired or wireless signals (e.g., sensor information, a user input, a learning mode, a control signal, or the like) to and from external devices, a different AI device (e.g., 100*x*, 200, or 400 in FIG. 34) or an AI server (e.g., 400 in FIG. 34) using wired or wireless communication technologies. To this end, the communication unit 110 may transmit information in the memory unit 130 to an external device or may transmit a signal received from the external device to the memory unit 130.

The control unit 120 may determine at least one executable operation of the AI device 100 on the basis of information determined or generated using a data analysis algorithm or a machine-learning algorithm. The control unit 120 may control components of the AI device 100 to perform the determined operation. For example, the control unit 120 may request, retrieve, receive, or utilize data of the learning processor unit 140c or the memory unit 130 and may control components of the AI device 100 to perform a predicted operation or an operation determined to be preferable among the at least one executable operation. The control unit 120 may collect history information including details about an operation of the AI device 100 or a user's feedback on the operation and may store the history information in the memory unit 130 or the learning processor unit 140c or may transmit the history information to an external device, such as the AI server (400 in FIG. 34). The collected history information may be used to update a learning model.

The memory unit 130 may store data for supporting various functions of the AI device 100. For example, the memory unit 130 may store data obtained from the input unit 140a, data obtained from the communication unit 110, output data from the learning processor unit 140c, and data obtained from the sensing unit 140. Further, the memory unit 130 may store control information and/or a software code necessary for the operation/execution of the control unit 120.

The input unit 140a may obtain various types of data from the outside of the AI device 100. For example, the input unit 140a may obtain learning data for model learning and input data to which a learning model is applied. The input unit 140a may include a camera, a microphone, and/or a user input unit. The output unit 140b may generate visual, auditory, or tactile output. The output unit 140b may include a display unit, a speaker, and/or a haptic module. The sensing unit 140 may obtain at least one of internal information about the AI device 100, environmental information about the AI device 100, and user information using various sensors. The sensing unit 140 may include a proximity sensor, an illuminance sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar.

The learning processor unit 140c may train a model including artificial neural networks using learning data. The learning processor unit 140c may perform AI processing together with a learning processor unit of an AI server (400 in FIG. 34). The learning processor unit 140c may process information received from an external device through the communication unit 110 and/or information stored in the memory unit 130. In addition, an output value from the learning processor unit 140c may be transmitted to an external device through the communication unit 110 and/or may be stored in the memory unit 130.

What is claimed is:

1. A method, comprising:
   receiving, by an integrated access and backhaul (IAB) node including a mobile termination (MT) and a distributed unit (DU), timing information related to slots; and
   applying, by the IAB node, the timing information in the slots,
   wherein the timing information is received through a medium access control-control element (MAC-CE), and
   wherein the timing information informs each timing alignment case applied to a MT transmission of the IAB node in each slot of the slots, and
   wherein the each timing alignment case is related to at least one of MT transmission time of the IAB node or DU transmission time of the IAB node, and
   wherein a first timing alignment case is applied to a first slot among the slots and a second timing alignment case is applied to a second slot among the slots based on the timing information, and
   wherein the each timing alignment case is one of a timing alignment case 1, a timing alignment case 6, and a timing alignment case 7, and
   wherein, in the timing alignment case 1, the MT transmission time of the IAB node is determined based on timing advance (TA) configuration information which is provided, and
   wherein, in the timing alignment case 6, the MT transmission time of the IAB node is determined based on the DU transmission time of the IAB node, and
   wherein, in the timing alignment case 7, the MT transmission time of the IAB node is determined based on additional TA configuration information which is provided.

2. The method of claim 1, wherein the IAB node receives the timing information from a parent node of the IAB node.

3. An integrated access and backhaul (IAB) node including a mobile termination (MT) and a distributed unit (DU), the IAB node comprising:
   at least one memory storing instructions;
   at least one transceiver; and
   at least one processor coupling the at least one memory and the at least one transceiver, wherein the at least one processor executes the instructions for:
   receiving timing information related to slots; and
   applying the timing information in the slots,
   wherein the timing information is received through a medium access control-control element (MAC-CE), and
   wherein the timing information informs each timing alignment case applied to a MT transmission of the IAB node in each slot of the slots, and
   wherein the each timing alignment case is related to at least one of MT transmission time of the IAB node or DU transmission time of the IAB node, and
   wherein a first timing alignment case is applied to a first slot among the slots and a second timing alignment case is applied to a second slot among the slots based on the timing information, and
   wherein the each timing alignment case is one of a timing alignment case 1, a timing alignment case 6, and a timing alignment case 7, and
   wherein, in the timing alignment case 1, the MT transmission time of the IAB node is determined based on timing advance (TA) configuration information which is provided, and
   wherein, in the timing alignment case 6, the MT transmission time of the IAB node is determined based on the DU transmission time of the IAB node, and
   wherein, in the timing alignment case 7, the MT transmission time of the IAB node is determined based on additional TA configuration information which is provided.

4. An apparatus configured to control an integrated access and backhaul (IAB) node including a mobile termination (MT) and a distributed unit (DU), the apparatus comprising:
   at least one processor; and
   at least one memory operably coupled by the at least one processor and storing instructions, wherein the at least one processor execute the instructions for
   receiving timing information related to slots; and
   applying the timing information in the slots,
   wherein the timing information is received through a medium access control-control element (MAC-CE), and wherein the timing information informs each timing alignment case applied to a MT transmission of the IAB node in each slot of the slots, and wherein the each timing alignment case is related to at least one of MT transmission time of the IAB node or DU transmission time of the IAB node, and wherein a first timing alignment case is applied to a first slot among the slots and a second timing alignment case is applied to a second slot among the slots based on the timing information, and wherein the each timing alignment case is one of a timing alignment case 1, a timing alignment case 6, and a timing alignment case 7, and wherein, in the timing alignment case 1, the MT transmission time of the IAB node is determined based on timing advance (TA) configuration information which is provided, and wherein, in the timing alignment case 6, the MT transmission time of the IAB node is determined based on the DU transmission time of the IAB node, and wherein, in the timing alignment case 7, the MT transmission time of the IAB node is determined based on additional TA configuration information which is provided.

* * * * *